United States Patent
Kuraoka et al.

(10) Patent No.: US 7,913,111 B2
(45) Date of Patent: Mar. 22, 2011

(54) RECORDING MEDIUM, RECORDING APPARATUS, REPRODUCTION APPARATUS, RECORDING METHOD AND REPRODUCTION METHOD

(75) Inventors: Tomotaka Kuraoka, Tokyo (JP); Shoei Kobayashi, Kanagawa (JP); Mitsutoshi Terada, Kanagawa (JP)

(73) Assignee: Sony Corporation, Tokyo (JP)

( * ) Notice: Subject to any disclaimer, the term of this patent is extended or adjusted under 35 U.S.C. 154(b) by 904 days.

(21) Appl. No.: 11/203,310

(22) Filed: Aug. 15, 2005

(65) Prior Publication Data

US 2006/0044979 A1   Mar. 2, 2006

(30) Foreign Application Priority Data

Aug. 16, 2004 (JP) ................................. 2004-236337
Sep. 17, 2004 (JP) ................................. 2004-271328

(51) Int. Cl.
  *G06F 11/00* (2006.01)
(52) U.S. Cl. ........................ 714/8; 369/47.22; 369/53.17
(58) Field of Classification Search .................. 714/7, 8; 369/47.22, 53.31, 53.17
See application file for complete search history.

(56) References Cited

U.S. PATENT DOCUMENTS

| | | | |
|---|---|---|---|
| 6,453,384 B1 * | 9/2002 | Park et al. ...................... | 711/112 |
| 6,581,167 B1 * | 6/2003 | Gotoh et al. ...................... | 714/7 |
| 7,283,454 B2 * | 10/2007 | Hwang et al. .............. | 369/275.3 |
| 7,330,407 B2 | 2/2008 | Ko et al. | |
| 2001/0042223 A1 * | 11/2001 | Hoskins ............................. | 714/8 |
| 2004/0114474 A1 | 6/2004 | Park et al. | |
| 2004/0120233 A1 | 6/2004 | Park et al. | |
| 2004/0158768 A1 * | 8/2004 | Park et al. ......................... | 714/7 |
| 2004/0240341 A1 | 12/2004 | Park et al. | |
| 2005/0030849 A1 | 2/2005 | Park | |
| 2009/0122668 A1 * | 5/2009 | Park ........................... | 369/47.14 |

FOREIGN PATENT DOCUMENTS

| | | |
|---|---|---|
| EP | 0 652 564 A1 | 5/1995 |
| JP | 63-124270 | 5/1988 |
| JP | 9-102173 | 4/1997 |

(Continued)

OTHER PUBLICATIONS

U.S. Appl. No. 11/560,249, filed Nov. 15, 2006, Terada et al.

*Primary Examiner* — Yolanda L Wilson
(74) *Attorney, Agent, or Firm* — Oblon, Spivak, McClelland, Maier & Neustadt, L.L.P.

(57) ABSTRACT

In a write-once media, by using a selected area such as an area starting from a postscript-recording point in the main data area as an alternate area, by determining whether or not an address specified in a request such as a write request is an address at which data has been recorded on the basis of information on a sequential recording range and by recording pieces of alternate-address management information for replacing defective locations on the media and for renewing data recorded on the media in a table by letting the pieces of information coexist in the table, defective locations on the media can be replaced with other locations and data already recorded on the media can thus be renewed even without providing pre-allocated alternate area on the media. In addition, if the media is provided with an alternate area and the alternate area becomes insufficient for alternate-address processing, a selected region in the main data area can be used as a region supplementary to the insufficient alternate area. An example of the region is an area starting from a postscript-recording point mentioned above.

30 Claims, 26 Drawing Sheets

FOREIGN PATENT DOCUMENTS

| | | |
|---|---|---|
| JP | 2000-357374 | 12/2000 |
| JP | 2002-312950 | 10/2002 |
| JP | 2004-171714 | 6/2004 |
| JP | 2005-129116 | 5/2005 |
| JP | 2005-190539 | 7/2005 |
| JP | 2005-535056 | 11/2005 |
| JP | 2005-538490 | 12/2005 |
| JP | 2006-510159 | 3/2006 |
| JP | 2006-510160 | 3/2006 |
| JP | 2007-528564 | 10/2007 |
| WO | WO 01/75879 A1 | 10/2001 |
| WO | WO 2004/025648 A1 | 3/2004 |
| WO | WO 2004/053872 A1 | 6/2004 |
| WO | WO 2004/053874 A1 | 6/2004 |
| WO | WO 2004/100156 A1 | 11/2004 |
| WO | WO 2005/004123 | 1/2005 |
| WO | WO 2005/006314 | 1/2005 |
| WO | WO 2005/006316 | 1/2005 |

\* cited by examiner

FIG. 3

DMA

| CLUSTER NUMBER | CONTENTS | CLUSTER COUNT |
|---|---|---|
| 1-4 | DDS (SAME DDS IS REPEATED 4 TIMES) | 4 |
| 5-8 | DFL#1 | 4 |
| 9-12 | DFL#2 (SAME CONTENTS AS DFL #1) | 4 |
| 13-16 | DFL#3 (SAME CONTENTS AS DFL #1) | 4 |
| 17-20 | DFL#4 (SAME CONTENTS AS DFL #1) | 4 |
| 21-24 | DFL#5 (SAME CONTENTS AS DFL #1) | 4 |
| 25-28 | DFL#6 (SAME CONTENTS AS DFL #1) | 4 |
| 29-32 | DFL#7 (SAME CONTENTS AS DFL #1) | 4 |

32 CLUSTERS

FIG. 4

DDS (DISC DEFINITION STRUCTURE)

| DATA-FRAME NUMBER | BYTE POSITION | CONTENTS | BYTE COUNT |
|---|---|---|---|
| 0 | 0 | DDS IDENTIFIER = "DS" | 2 |
| 0 | 2 | DDS FORMAT NUMBER | 1 |
| 0 | 3 | RESERVED (00h) | 1 |
| 0 | 4 | DDS-UPDATING COUNT (=SEQUENCE NUMBER OF LAST TDDS) | 4 |
| 0 | 8 | RESERVED (00h) | 8 |
| 0 | 16 | DRIVE-AREA START PHYSICAL SECTOR ADDRESS (AD_DRV) IN DMA | 4 |
| 0 | 20 | RESERVED (00h) | 4 |
| 0 | 24 | DEFECT-LIST START PHYSICAL SECTOR ADDRESS (AD_DFL) IN DMA | 4 |
| 0 | 28 | RESERVED (00h) | 4 |
| 0 | 32 | START PHYSICAL SECTOR ADDRESS OF USER-DATA AREA | 4 |
| 0 | 36 | END LOGICAL SECTOR ADDRESS OF USER-DATA AREA | 4 |
| 0 | 40 | SIZE OF FIRST LAYER ALTERNATE AREA (ISA 0) ON INNER-SIDE CIRCUMFERENCE | 4 |
| 0 | 44 | SIZE OF ALTERNATE AREA (OSA 0 OR OSA 1) ON OUTER-SIDE CIRCUMFERENCE | 4 |
| 0 | 48 | SIZE OF SECOND LAYER ALTERNATE AREA (ISA 1) ON INNER-SIDE CIRCUMFERENCE | 4 |
| 0 | 52 | SPARE AREA FULL FLAGS | 1 |
| 0 | 53 | RESERVED (00h) | 1 |
| 0 | 54 | DISK CERTIFICATION FLAG | 1 |
| 0 | 55 | RESERVED (00h) | 1 |
| 0 | 56 | LAST VERIFIED ADDRESS POINTER | 4 |
| 0 ... 31 | 60 ... 2047 | RESERVED (00h) | |

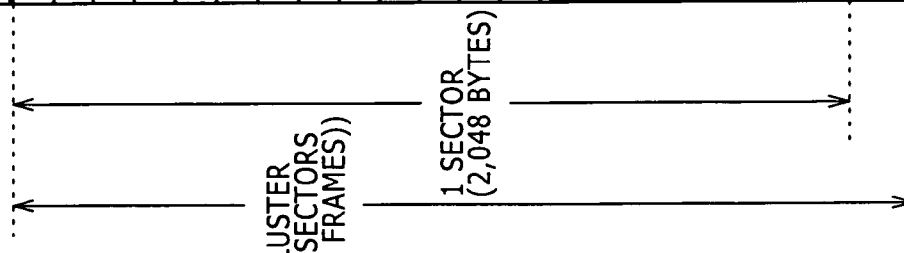

1 CLUSTER (32 SECTORS (32 FRAMES))

1 SECTOR (2,048 BYTES)

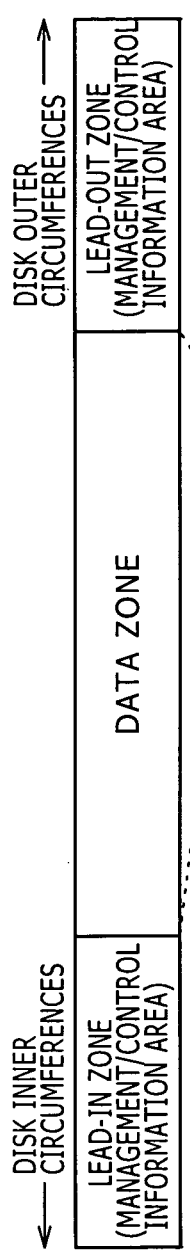

FIG. 6A
SRRI+TDDS

| CLUSTER | DATA FRAME | CONTENTS |
|---|---|---|
| ONE CLUSTER | 0~(30-M) | SET TO 00h |
| | (31-M)~30 | SRRI (M SECTORS) |
| | 31 | TDDS (1 SECTOR) |

FIG. 6B
TDFL+TDDS

| CLUSTER | DATA FRAME | CONTENTS |
|---|---|---|
| 0 | 0~31 | TDFL (N SECTORS) |
| ... | | |
| K | 0~(x-1) | |
| | x~30 | SET TO 00h |
| | 31 | TDDS (1 SECTOR) |

FIG. 6C
TDMS UPDATA UNIT LAYOUT

TDFL+SRRI+TDDS

| CLUSTER | DATA FRAME | CONTENTS |
|---|---|---|
| 0 | 0~31 | TDFL (N SECTORS) |
| ... | | |
| K-1 | 0~(x-1) | |
| | x~30 | SET TO 00h (<31 SECTORS) |
| K | 0~(30-M) | |
| | (31-M)~30 | SRRI (M SECTORS) |
| | 31 | TDDS (1 SECTOR) |

[K : NUMBER OF CLUSTER
x : MOD (N/32)-1]

FIG. 8

TDDS(TEMPORARY DISC DEFINITION STRUCTURE)

| DATA-FRAME NUMBER | BYTE POSITION | CONTENTS | BYTE COUNT |
|---|---|---|---|
| 31 | 0 : 52 | THE SAME CONTENTS AS BYTE POSITIONS 0 TO 53 OF FRAME 0 OF DDS | |
| 31 | 53 | RESERVED (00h) | 971 |
| 31 | 1024 | RECORDING MODE | 1 |
| | | OMITTED | |
| 31 | 1032 | LAST RECORDED ADDRESS IN USER-DATA AREA (LAST RECORDED PSN) | 4 |
| | | OMITTED | |
| 31 | 1040 | ATDMA SIZE | 4 |
| | | OMITTED | |
| 31 | 1120 | FIRST PSN OF TDFL | 4 |
| 31 | 1124 | SECOND PSN OF TDFL | 4 |
| 31 | 1128 | THIRD PSN OF TDFL | 4 |
| 31 | 1132 | FOURTH PSN OF TDFL | 4 |
| 31 | 1136 | FIFTH PSN OF TDFL | 4 |
| 31 | 1140 | SIXTH PSN OF TDFL | 4 |
| 31 | 1144 | SEVENTH PSN OF TDFL | 4 |
| 31 | 1148 | EIGHTH PSN OF TDFL | 4 |
| | | OMITTED | |
| 31 | 1184 | FIRST PSN OF SRRI | 4 |
| | | OMITTED | |
| 31 | 1216 | NEXT WRITE ADDRESS (PSN) OF ISA | 4 |
| 31 | 1220 | NEXT WRITE ADDRESS (PSN) OF OSA | 4 |
| | | OMITTED | |
| 31 | 1920 : 2047 | DRIVE ID | |

FIG. 9

TDFL

| CLUSTER (DATA FRAME) NUMBER | BYTE POSITION IN DATA FRAME | CONTENTS | BYTE COUNT |
|---|---|---|---|
| 0 / 0 | 0 | TEMPORARY DEFECT LIST HEADER | 64 |
| 0 / 0 | 64 | TEMPORARY LIST OF DEFECTS (DOW ENTRY / DFL ENTRY) | N×8 |
| ... | ... | ... | |
| m / n | k | TEMPORARY DEFECT LIST TERMINATOR | 8 |
| ... / 31 | k+8 | RESERVED (00h) | ... |

N: ENTRY COUNT m: ip ((64+N×8)/65536)
n: ip (mod((64+N×8)/65536)/2048)
k: mod(mod((64+N×8)65536)/2048)

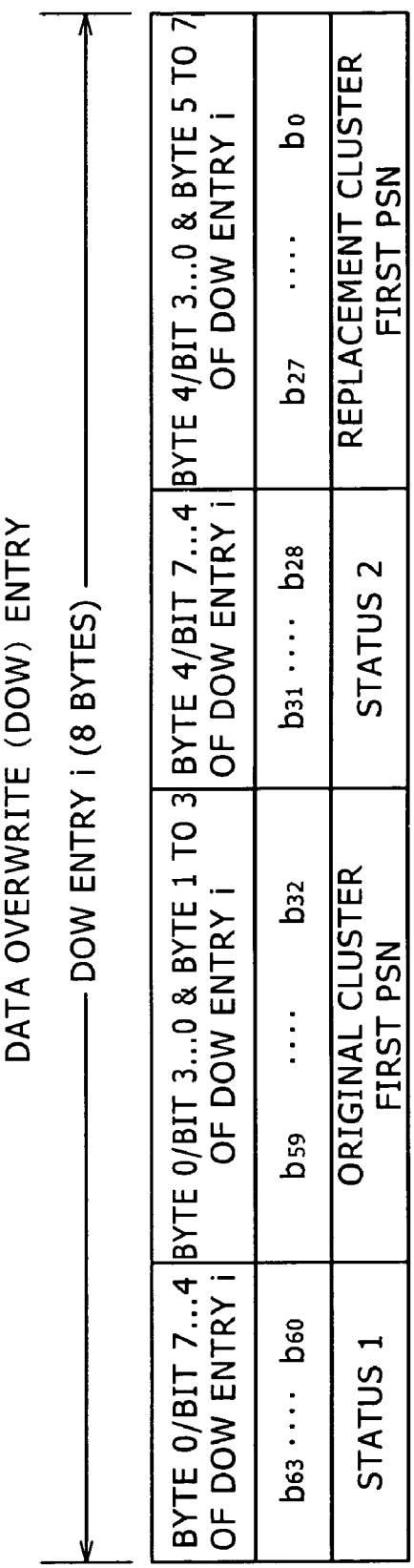

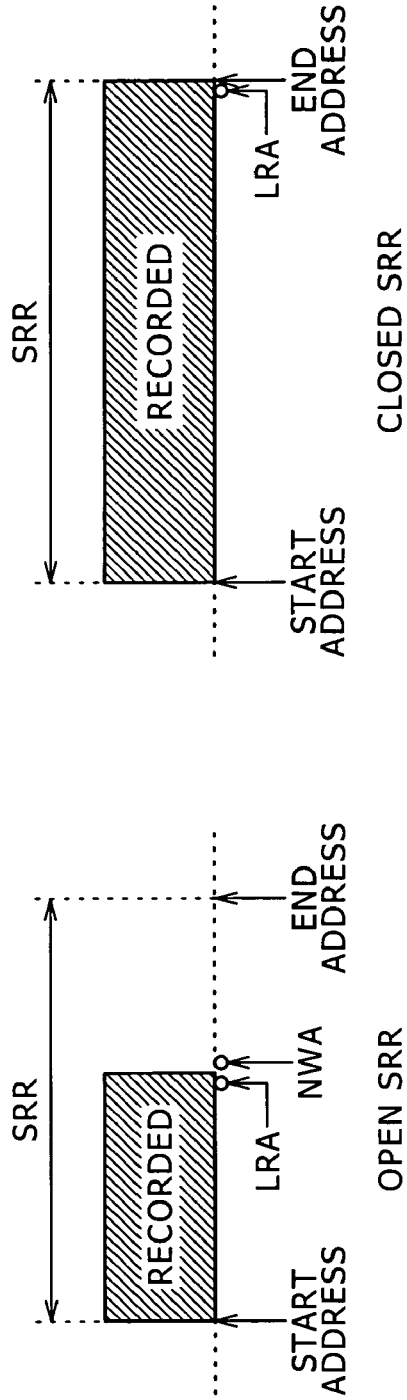
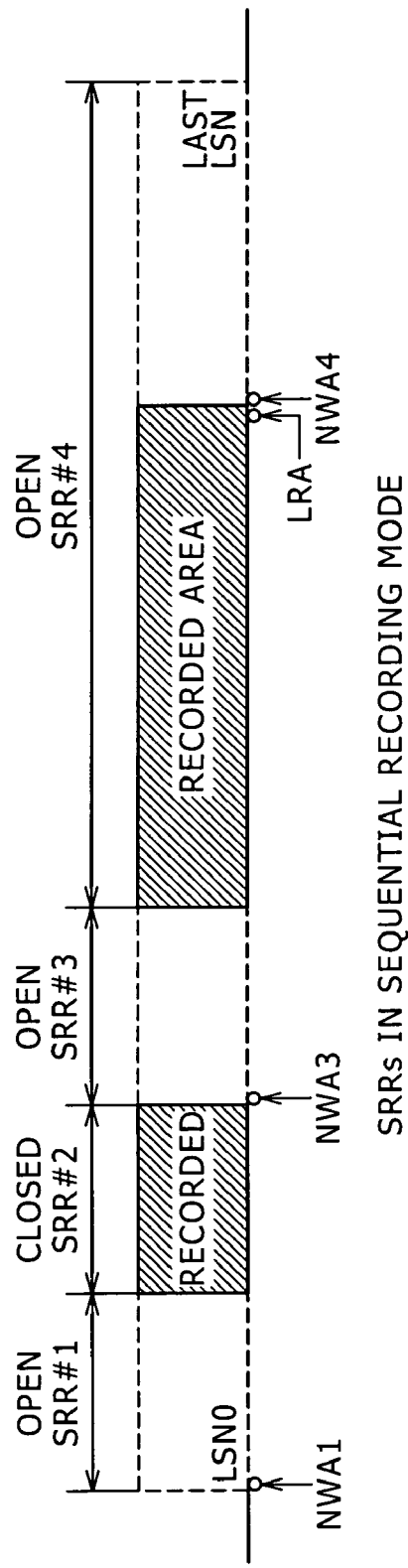

FIG. 12

SRRI (SEQUENTIAL RECORDING RANGE INFORMATION)

| RELATIVE DATA-FRAME NUMBER | BYTE POSITION IN DATA FRAME | CONTENTS | BYTE COUNT |
|---|---|---|---|
| 31-M | 0 | SRRI HEADER | 64 |
| 31-M | 64 | LIST OF SRR ENTRIES | N_SRR×8 |
| ⋮ | ⋮ | ⋮ | ⋮ |
| 30 | 64+(N_SRR×8) | SRRI TERMINATOR | 8 |
| (31) | 64+(N_SRR+1)×8 | RESERVED (00h) | ⋮ |
|  |  | (TDDS) |  |

M: NUMBER OF SECTORS COMPOSING SRRI
N_SRR: SRRI-ENTRY COUNT

FIG. 13A

SRRI HEADER

| RELATIVE DATA-FRAME NUMBER | BYTE POSITION IN DATA FRAME | CONTENTS | BYTE COUNT |
|---|---|---|---|
| 31-M | 0 | SRRI IDENTIFIER = "SR" | 2 |
| 31-M | 2 | SRRI FORMAT = 00h | 1 |
| 31-M | 3 | RESERVED (00h) | 1 |
| 31-M | 4 | SRRI UPDATA COUNT | 4 |
| 31-M | 8 | RESERVED (00h) | 4 |
| 31-M | 12 | NUMBER OF SRR ENTRIES | 4 |
| 31-M | 16 | NUMBER OF OPEN SRRs | 1 |
| 31-M | 17 | RESERVED (00h) | 3 |
| 31-M | 20 | LIST OF OPEN SRR NUMBERS | 16×2 |
| 31-M | 52 | RESERVED (00h) | 12 |

M: NUMBER OF SECTORS COMPOSING SRRI

FIG. 13B

LIST OF OPEN SRR NUMBERS

| 31-M | 20 | 1ST OPEN SRR NUMBER | 2 |
|---|---|---|---|
| 31-M | 22 | 2ND OPEN SRR NUMBER | 2 |
| 31-M | | ⋮ | ⋮ |
| 31-M | 50 | 16TH OPEN SRR NUMBER | 2 |

FIG. 17

TDMA INFORMATION

| BYTE POSITION IN DATA FRAME | CONTENTS | BYTE COUNT |
|---|---|---|
| 0 | TDDS IDENTIFIER = "DS" | 2 |
| 2 | TDDS FORMAT = 00h | 1 |
| .. | .. | .. |
| 32 | LOCATION OF LSN 0 OF USER DATA AREA | 4 |
| 36 | LAST LSN OF USER DATA AREA | 4 |
| 40 | INNER SPARE AREA SIZE = 0 | 4 |
| 44 | OUTER SPARE AREA SIZE = ATDMA SIZE/256 | 4 |
| .. | .. | .. |
| 1040 | SIZE OF TDMA IN OUTER SPARE AREA = ATDMA SIZE | 4 |
| .. | .. | .. |
| 2048 | | |

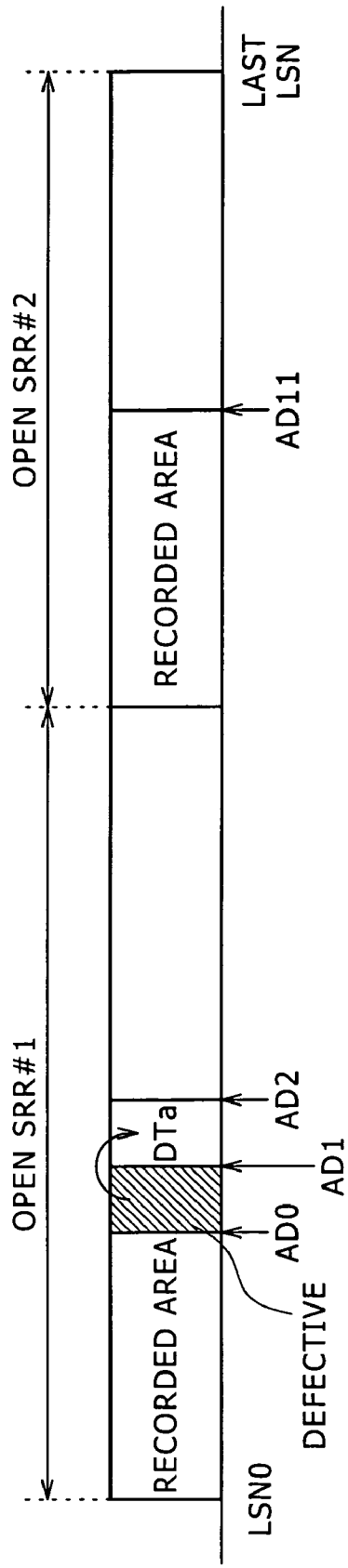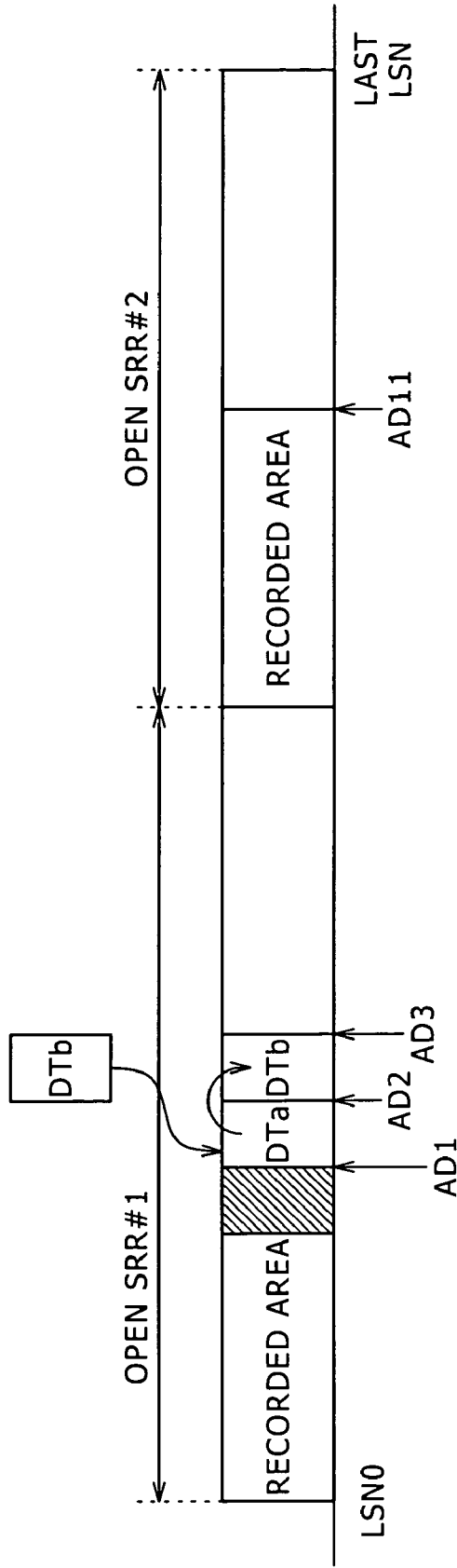

FIG. 24 PROCESSING TO CHECK ATDMA OF DISK WITHOUT SPARE AREAS

RECORDING MEDIUM, RECORDING APPARATUS, REPRODUCTION APPARATUS, RECORDING METHOD AND REPRODUCTION METHOD

BACKGROUND OF THE INVENTION

The present invention relates to a recording medium such as an optical recording medium used particularly as write-once recording media as well as relates to a recording apparatus, a recording method, a reproduction apparatus and a reproduction method, which are provided for the recording medium.

As a technology for recording and reproducing digital data, there is known a data-recording technology for using optical disks including magneto-optical disks as recording media. Examples of the optical disks are a CD (Compact Disk), an MD (Mini-Disk) and a DVD (Digital Versatile Disk). The optical disk is the generic name of recording media, which is a metallic thin plate protected by plastic. When a laser beam is radiated to the optical disk, the optical disk emits a reflected signal, from which changes can be read out as changes representing information recorded on the optical disk.

The optical disks can be classified into a read-only category including a CD, a CD-ROM and a DVD-ROM, which the user is already familiar with, and a writable category allowing data to be written therein as is generally known. The writable category includes an MD, a CD-R, a CD-RW, a DVD-R, a DVD-RW, a DVD+RW and a DVD-RAM. By adopting a magneto-optical recording method, a phase-change recording-method or a pigmented-coat change recording-method for the writable category, data can be recorded onto a disk of this category. The pigmented-coat change recording-method is also referred to as a write-once recording-method. Since this pigmented-coat change recording-method allows data recording once and inhibits renewal of data onto the optical disk, the optical disk is good for data-saving applications or the like. On the other hand, the magneto-optical recording method and the phase-change recording-method are adopted in a variety of applications allowing renewal of data. The applications allowing renewal of data include mainly an application of recording various kinds of content data including musical data, movies, games and application programs.

In addition, in recent years, a high-density optical disk called a blue-ray disc has been developed in an effort to produce the product on a very large scale.

Typically, data is recorded onto a high-density optical disk and read out from the optical disk under a condition requiring a combination of a laser with a wavelength of 405 nm and an objective lens with an NA of 0.85 to be reproduced. The laser required in this condition is the so-called blue laser. With the optical disk having a track pitch of 0.32 μm, a line density of 0.12 μm/bit, a formatting efficiency of about 82% and a diameter of 12 cm, data of the amount of up to 23.3 GB (gigabytes) can be recorded onto and reproduced from the optical disk in recording/reproduction units, which are each a data block of 64 KB (kilobytes).

There are also two types of optical disk having such a high density, i.e., optical disks of a write-once type and optical disks of a rewritable type.

In addition, in the case of recording media usable as media for recording these kinds of data or not as reproduction-only media, there is known a technology for changing a data-recording location on the optical disk by providing an alternate area. That is to say, this technology is a defect management technology whereby an alternate recording-area is provided so that, if a location improper for recording data exists on the optical disk due to a defective damage on the optical disk, the alternate recording-area can be used as an area serving as a substitute for the defective location to allow proper recording and reproduction operations to be carried out.

For example, the defect management technology is disclosed in U.S. Pat. No. 6,782,488 (hereinafter referred to as Patent Document 1).

By the way, it is naturally impossible to record data into an already recorded area in a write-once optical recording medium, that is, an area in which data has been recorded before. Examples of the write-once optical recording medium are a CD-R, a DVD-R and a high-density recording medium, which function as a write-once disk.

Specifications of most file systems to be recorded on an optical recording medium are defined by assuming the use of the optical recording medium as a ROM-type disk or a RAM-type disk. The ROM-type disk is a reproduction-only medium and the RAM-type disk is a rewritable optical disk. Specifications of a file system for a write-once recording medium allowing data to be stored therein only once limit functions of the ordinary file system and include special functions.

The specifications of a file system for a write-once recording medium are a reason why the file system does not become widely popular. On the other hand, a FAT file system capable of keeping up with a variety of OSes of an information-processing apparatus and other file systems cannot be applied to write-once media as they are.

Write-once media is widely used typically in applications of preserving data. If the write-once media can also be used for the FAT file system by keeping the general specifications of the file system as they are, the usability of the write-once media can be further enhanced.

In order to allow a widely used file system such as the FAT file system and a file system for RAMs or hard disks to be applied to write-once media as it is, however, a function to write data into the same address as that of existing data is required. That is to say, a capability of renewing data is required. Of course, one of characteristics of the write-once media is that data cannot be rewritten onto the media for the second time. Thus, it is impossible to use a file system for such a rewritable recording medium as it is in the first place.

In order to compensate for the above shortcomings, as disclosed in the Patent Document 1 described above, in the case of write-once media such as an optical disk with an alternate area existing thereon, there have been proposed technologies for implementing a data overwrite function using alternate-address information and the alternate area.

By introducing such technologies, a file system provided for RAMs and ROMs can be used without the need to limit and add functions and, from the application point of view, it is no longer necessary to be aware of differences in recording technique among different kinds of media.

However, these technologies allowing data on write-once media to be renewed absolutely require that an alternate area be set on each of disks. In addition, the proper sizes of the alternate areas cannot be set at a uniform value if it is necessary to consider, among others, the compatibility of the application with the media as well as the compatibility of the apparatus with the media.

For the reasons described above, it is necessary to allocate as many alternate areas as possible or more alternate areas than actually required from the beginning at a formatting time, and a large number of alternate areas has an effect on a method of utilizing user-data areas with a high degree of efficiency.

SUMMARY OF THE INVENTION

The present invention provides methods for implementing defect alternate-address processing and data renewal processing for a write-once disk having a management area for managing alternate-address information but no pre-allocated alternate area for the defect alternate-address processing and the data renewal processing.

The present invention also provides methods for implementing the defect alternate-address processing and the data renewal processing also for a write-once disk having a management area for managing alternate-address information and a pre-allocated alternate area for the defect alternate-address processing and the data renewal processing and, at the same time, avoiding inefficiencies of the pre-allocation of the alternate area.

In accordance with an embodiment of the present invention, there is provided a data-recording method for recording write data onto a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area, the data-recording method capable of recording the write data onto the recording medium without providing a pre-allocated alternate area in the write-once recording area in advance by execution of the steps of:

carrying out alternate-address processing to set a write-target area, which is identified by an address specified in a data write request as a partial area included in the write-once recording area, as an alternate-object original area, and set an alternate area selected among partial areas existing in the main data area as an alternate-object replacement area in case data has already been recorded in the write-target area;

recording the write data, which is to be recorded in accordance with the data write request, into the alternate-object replacement area; and updating the alternate-address management information so as to include information in the alternate-address management information as information showing the alternate-address processing.

In accordance with the data-recording method according to the embodiment of the present invention, also in case the write-target area in the write-once recording area is a defective area:

at the step of carrying out alternate-address processing, defective-area alternate-address processing is carried out to set the defective write-target area as an alternate-object original area, and set an alternate area selected among partial areas existing in the main data area as an alternate-object replacement area; and at the step of updating the alternate-address management information, the alternate-address management information is updated to include information showing the defective-area alternate-address processing.

In accordance with the data-recording method according to the present invention, the alternate-address management information includes sequential recording range information on a sequential recording range of main data recorded in the main data area and, at the step of carrying out alternate-address processing, an alternate-object replacement area in the main data area is selected by using the sequential recording range information.

In accordance with the data-recording method according to the present invention, at the step of carrying out alternate-address processing, an alternate-object replacement area in the main data area is selected by using postscript-recording point information included in the sequential recording range information.

In accordance with the data-recording method according to the present invention, at the step of carrying out alternate-address processing, an alternate-object replacement area in the main data area is selected on the basis of the postscript-recording point information on a postscript-recording point existing in a sequential recording range including the alternative-object original area involved in the alternate-address processing.

In accordance with the data-recording method according to the embodiment of the present invention, at the step of carrying out alternate-address processing, an alternate-object replacement area in the main data area is selected on the basis of specific postscript-recording point information representing a largest address among pieces of postscript-recording point information on postscript-recording points existing in a sequential recording range or a plurality of sequential recording ranges.

In accordance with the data-recording method according to the present invention, at the step of carrying out alternate-address processing, an alternate-object replacement area in the main data area is selected on the basis of the postscript-recording point information on a postscript-recording point existing in a sequential recording range other than a sequential recording range including the alternative-object original area involved in the alternate-address processing.

In accordance with the data-recording method according to the present invention, the data-recording method further includes the step of setting an additional alternate-address management information area, which is used for incrementally recording the alternate-address management information, in the main data area.

In accordance with another embodiment of the present invention, there is provided a data-recording apparatus for recording write data onto a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area, the data-recording apparatus including:

a data-writing section for writing the write data onto the recording medium;

an address verification section for producing a result of determination as to whether or not data has been recorded at an address specified in a data write request to write the write data into the main data area;

an information determination section for producing a result of determination as to whether or not the alternate-address management information can be updated; and a control section for:

controlling the data-writing section to record the write data at an address specified in a data write request if the address verification section produces a determination result indicating that no data has been recorded at the address; and carrying out alternate-address processing to set a write-target area, which is identified by an address specified in a data write request as a partial area included in the write-once recording area, as an alternate-object original area, and set an alternate area selected among partial areas existing in the main data area as an alternate-object replacement area, controlling the data-writing section to record the write data, which is to be recorded in accordance with the data write request, into the alternate-object replacement area, and updating the alternate-address management information so as to include information in the alternate-address management information as information showing the alternate-address processing if the address verification section produces a determination result indicating that data has been recorded at the address and the information determination section produces a determination result indicating that the alternate-address management information can be updated.

In accordance with the data-recording apparatus according to the present invention, in case the write-target area in the write-once recording area is a defective area, the control section carries out defective-area alternate-address processing to set the defective write-target area as an alternate-object original area, and set an alternate area selected among partial areas existing in the main data area as an alternate-object replacement area; and updates the alternate-address management information to include information showing the defective-area alternate-address processing.

In accordance with the data-recording apparatus according to the embodiment of the present invention, the alternate-address management information includes sequential recording range information on a sequential recording range of main data recorded in the main data area and the control section selects an alternate-object replacement area for the alternate-address processing in the main data area by using the sequential recording range information.

In accordance with the data-recording apparatus according to the present invention, the control section selects an alternate-object replacement area for the alternate-address processing in the main data area by using postscript-recording point information included in the sequential recording range information.

In accordance with the data-recording apparatus according to the present invention, the control section selects an alternate-object replacement area for the alternate-address processing in the main data area on the basis of the postscript-recording point information on a postscript-recording point existing in a sequential recording range including the alternative-object original area involved in the alternate-address processing.

In accordance with the data-recording apparatus according to the present invention, the control section selects an alternate-object replacement area for the alternate-address processing in the main data area on the basis of specific postscript-recording point information representing a largest address among pieces of postscript-recording point information on postscript-recording points existing in a sequential recording range or a plurality of sequential recording ranges.

In accordance with the data-recording apparatus according to the present invention, the control section selects an alternate-object replacement area for the alternate-address processing in the main data area on the basis of the postscript-recording point information on a postscript-recording point existing in a sequential recording range other than a sequential recording range including the alternative-object original area involved in the alternate-address processing.

In accordance with the data-recording apparatus according to the present invention, the control section sets an additional alternate-address management information area, which is used for incrementally recording the alternate-address management information, in the main data area.

The data-recording method and the data-recording apparatus according to the present invention are provided for a write-once recording medium having an alternate-address management information area used for incrementally recording alternate-address management information in order to update already recorded alternate-address management information as described above, but having no pre-allocated interface area. For a write-once recording medium having a pre-allocated interface area, the present invention also provides a data-recording method and a data-recording apparatus as follows.

In accordance with a further embodiment of the present invention, there is provided a data-recording method for recording write data onto a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area, the data-recording method including the steps of:

setting an alternate area in the write-once recording area;

carrying out first alternate-address processing to set a write-target area, which is identified by an address specified in a data write request as a partial area included in the write-once recording area, as an alternate-object original area, and set a partial area selected among partial areas existing in the alternate area as an alternate-object replacement area if data has already been recorded in the write-target area and the selected partial area is usable for the first alternate-address processing;

carrying out second alternate-address processing to set a write-target area, which is identified by an address specified in a data write request as a portion included in the write-once recording area, as an alternate-object original area, and set a partial area selected among partial areas existing in the main data area as an alternate-object replacement area if data has already been recorded in the write-target area and no area usable for the second alternate-address processing exists in the alternate area;

recording the write data, which is to be recorded in accordance with the data write request, into the alternate-object replacement area; and updating the alternate-address management information so as to include information in the alternate-address management information as information showing the first or second alternate-address processing.

In accordance with the data-recording method according to the present invention, in case the write-target area in the write-once recording area is a defective area:

at the step of carrying out the first alternate-address processing, first defective-area alternate-address processing is carried out to set the defective write-target area as an alternate-object original area, and set a partial area selected among partial areas existing in the alternate area as an alternate-object replacement area; and at the step of carrying out the second alternate-address processing, second defective-area alternate-address processing is carried out to set the defective write-target area as an alternate-object original area, and set a partial area selected among partial areas existing in the main data area as an alternate-object replacement area.

In accordance with the data-recording method according to the present invention, the alternate-address management information includes sequential recording range information on a sequential recording range of main data recorded in the main data area and wherein, at the step of carrying out the second alternate-address processing, an alternate-object replacement area in the main data area is selected by using the sequential recording range information.

In accordance with the data-recording method according to the present invention, at the step of carrying out the second alternate-address processing, an alternate-object replacement area in the main data area is selected by using postscript-recording point information included in the sequential recording range information.

In accordance with the data-recording method according to the present invention, at the step of carrying out the second alternate-address processing, an alternate-object replacement area in the main data area is selected on the basis of the postscript-recording point information on a postscript-recording point existing in a sequential recording range including the alternative-object original area involved in the second alternate-address processing.

In accordance with the data-recording method according to the present invention, at the step of carrying out the second alternate-address processing, an alternate-object replacement area in the main data area is selected on the basis of specific postscript-recording point information representing a largest address among pieces of postscript-recording point information on postscript-recording points existing in a sequential recording range or a plurality of sequential recording ranges.

In accordance with the data-recording method according to the present invention, at the step of carrying out the second alternate-address processing, an alternate-object replacement area in the main data area is selected on the basis of the postscript-recording point information on a postscript-recording point existing in a sequential recording range other than a sequential recording range including the alternative-object original area involved in the second alternate-address processing.

In accordance with the data-recording method according to the present invention, the data-recording method further includes the step of setting an additional alternate-address management information area, which is used for incrementally recording the alternate-address management information, in the alternate area.

In accordance with a further embodiment of the present invention, there is provided a data-recording apparatus for recording write data onto a recording medium having a write-once recording area that allows data to be recorded therein only once and includes:

a main data area, which data is to be recorded into and to be reproduced from;

an alternate area; and an alternate-address management information area used for incrementally recording alternate-address management information in order to update already recorded alternate-address management information used for managing alternate-address processing carried out on the write-once recording area, the data-recording apparatus including:

a data-writing section for writing the write data onto the recording medium;

an address verification section for producing a result of determination as to whether or not data has been recorded at an address specified in a data write request to write the write data into the main data area;

an information determination section for producing a result of determination as to whether or not the alternate-address management information can be updated as well as a result of determination as to whether or not an area usable for alternate-address processing exists in the alternate area; and a control section for:

controlling the data-writing section to record the write data at an address specified in a data write request if the address verification section produces a determination result indicating that no data has been recorded at the address;

carrying out alternate-address processing to set a write-target area, which is identified by an address specified in a data write request as a partial area included in the write-once recording area, as an alternate-object original area, and set a partial area selected among partial areas existing in the alternate area as an alternate-object replacement area, controlling the data-writing section to record the write data, which is to be recorded in accordance with the data write request, into the alternate-object replacement area and updating the alternate-address management information so as to include information in the alternate-address management information as information showing the alternate-address processing if the address verification section produces a determination result indicating that data has been recorded at the address and the information determination section produces a determination result indicating that the alternate-address management information can be updated as well as a result of determination indicating that an area usable for alternate-address processing exists in the alternate area; and carrying out alternate-address processing to set a write-target area, which is identified by an address specified in a data write request as a partial area included in the write-once recording area, as an alternate-object original area, and set a partial area selected among partial areas existing in the main data area as an alternate-object replacement area, controlling the data-writing section to record the write data, which is to be recorded in accordance with the data write request, into the alternate-object replacement area and updating the alternate-address management information so as to include information in the alternate-address management information as information showing the alternate-address processing if the address verification section produces a determination result indicating that data has been recorded at the address and the information determination section produces a determination result indicating that the alternate-address management information can be updated as well as a result of determination indicating that no area usable for alternate-address processing exists in the alternate area.

In accordance with the data-recording apparatus according to the present invention, in case the write-target area in the write-once recording area is a defective area, the control section:

carries out defective-area alternate-address processing to set the defective write-target area as an alternate-object original area and set a partial area selected among partial areas existing in the alternate area as an alternate-object replacement area, updating the alternate-address management information to include information showing the defective-area alternate-address processing if the information determination section produces a determination result indicating that the alternate-address management information can be updated as well as a determination result indicating that an area usable for the defective-area alternate-address processing exists in the alternate area; and carries out defective-area alternate-address processing to set the defective write-target area as an alternate-object original area and set a partial area selected among partial areas existing in the main data area as an alternate-object replacement area, updating the alternate-address management information to include information showing the defective-area alternate-address processing if the information determination section produces a determination result indicating that the alternate-address management information can be updated as well as a determination result indicating that no area usable for the defective-area alternate-address processing exists in the alternate area.

In accordance with the data-recording apparatus according to the present invention, the alternate-address management information includes sequential recording range information on a sequential recording range of main data recorded in the main data area and the control section selects an alternate-object replacement area in the main data area in the defective-area alternate-address processing by using the sequential recording range information.

In accordance with the data-recording apparatus according to the present invention, the control section selects an alternate-object replacement area in the main data area in the defective-area alternate-address processing by using postscript-recording point information included in the sequential recording range information.

In accordance with the data-recording apparatus according to the present invention, the control section selects an alternate-object replacement area in the main data area in the defective-area alternate-address processing on the basis of the postscript-recording point information on a postscript-recording point existing in a sequential recording range including the alternative-object original area involved in the defective-area alternate-address processing.

In accordance with the data-recording apparatus according to the present invention, the control section selects an alternate-object replacement area in the main data area in the defective-area alternate-address processing on the basis of specific postscript-recording point information representing a largest address among pieces of postscript-recording point information on postscript-recording points existing in a sequential recording range or a plurality of sequential recording ranges.

In accordance with the data-recording apparatus according to the present invention, the control section selects an alternate-object replacement area in the main data area in the defective-area alternate-address processing on the basis of the postscript-recording point information on a postscript-recording point existing in a sequential recording range other than a sequential recording range including the alternative-object original area involved in the defective-area alternate-address processing.

In accordance with the data-recording apparatus according to the present invention, the control section sets an additional alternate-address management information area, which is used for incrementally recording the alternate-address management information, in the main data area in the defective-area alternate-address processing.

In addition to the data-recording methods and the data-recording apparatus, the present invention also provides a data reproduction method and a data reproduction apparatus.

In accordance with still further embodiment of the present invention, there is provided a data reproduction method for reproducing data from a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area wherein the alternate-address management information includes sequential recording range information on a sequential recording range of main data recorded in the main data area, the data reproduction method including the steps of:

producing a result of recording-status determination as to whether or not data has been recorded at an address specified in a data read request by reference to the sequential recording range information when receiving the data read request to read out the data from the main data area;

producing a result of alternate-status determination as to whether or not the address specified in the data read request is managed as an alternate-object original address by using the alternate-address management information due to the fact that the address has been specified in a previous data write request if the result of the recording-status determination indicates that the data has been recorded at the address;

reading out the data from the address specified in the data read request if the result of the alternate-status determination indicates that the address is not managed as an alternate-object original address by using the alternate-address management information; and reading out the data from an alternate-object replacement address managed as a substitute for the alternate-object original address by using the alternate-address management information if the result of the alternate-status determination indicates that the address specified in the data read request is managed as the alternate-object original address by using the alternate-address management information.

In accordance with the embodiment of the present invention, there is provided a data reproduction apparatus for reproducing data from a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area wherein the alternate-address management information includes sequential recording range information on a sequential recording range of main data recorded in the main data area, the data reproduction apparatus including:

a data reading section for reading data from the recording medium;

a first address verification section for producing a result of recording-status determination as to whether or not data has been recorded at an address, which is specified in a data read request to reproduce the data from the main data area, with reference to the alternate-address management information;

a second address verification section for producing a result of alternate-status determination as to whether or not an address specified in a data read request to reproduce the data from the main data area is managed by using the alternate-address management information as an alternate-object original address due to the fact that the address has been specified in a previous data write request;

a control section for controlling the data reading section to reproduce the data from: an alternate-object replacement address managed by using the alternate-address management information as a substitute for the alternate-object original address if the first address verification section produces the result of the recording-status determination as a result indicating that the data has been recorded at the address, and the second address verification section produces the result of the alternate-status determination as a result indicating that the address is an address managed by using the alternate-address management information as the alternate-object original address; and the address if the first address verification section produces the result of the recording-status determination as a result indicating that the data has been recorded at the address, and the second address verification section produces the result of the alternate-status determination as a result indicating that the address is not an address managed by using the alternate-address management information as the alternate-object original address.

In accordance with the present invention, there is provided a recording medium having a write-once recording area that allows data to be recorded therein only once and includes:

a main data area, which data is to be recorded into and to be reproduced from; and an alternate-address management information area used for incrementally recording alternate-address management information in order to update already recorded alternate-address management information used for managing alternate-address processing carried out on the write-once recording area.

In accordance with the recording medium according to the present invention, the main data area includes an additional alternate-address management information area used for incrementally recording the alternate-address management information.

In accordance with a still further embodiment of the present invention, there is provided a recording medium having a write-once recording area that allows data to be recorded therein only once and includes:

a main data area, which data is to be recorded into and to be reproduced from;

an alternate-address management information area used for incrementally recording alternate-address management information in order to update already recorded alternate-address management information used for managing alternate-address processing carried out on the write-once recording area; and an alternate area, wherein the main data area and the alternate area are each used as an area for the alternate-address processing.

In accordance with the recording medium according to the present invention, the main alternate area includes an additional alternate-address management information area used for incrementally recording said alternate-address management information.

In accordance with the present invention described above, a recording medium such as a disk of the write-once type has an alternate-address management area used for managing alternate-address information but may not include a pre-allocated alternate area. In this case, in order to implement defect alternate-address processing and data renewal processing, the following techniques are adopted.

Alternate-address information used for managing data renewal processing is provided in a format identical with that of already existing alternate-address information used for managing defect alternate-address processing and, in addition, both the alternate-address information used for managing data renewal processing and the alternate-address information used for managing defect alternate-address processing coexist in the alternate-address management area.

As an alternate-object replacement area for defect alternate-address processing and data renewal processing, a location selected in a main data area (or a user-data area) on the recording medium is used. An example of such a location is a postscript-recording point in a sequential recording range (or a track). The alternate-object replacement area serves as a substitute for a target area in defect alternate-address processing and data renewal processing.

In order for a recording/reproduction apparatus to produce a result of determination as to whether or not data has been recorded at an address on the recording medium, track information (or information on a sequential recording range) provided for a postscript-recording technique is utilized. That is to say, on the assumption that the postscript-recording technique (a packet write technique or an incremental-recording technique) provided generally for the CD and the DVD is adopted as a recording method, track information (or information on a sequential recording range) used by the recording/reproduction apparatus to manage states of the recording medium adopting the postscript-recording method is used in producing a result of determination as to whether or not data has been recorded at an address. In general, the information on a track or the information on a sequential recording range includes only the start address, end address and postscript-recording point of the sequential recording range. In the case of such a postscript-recording method, data has been recorded in an area between the start address and an address immediately preceding the postscript-recording point. On the other hand, no data has been recorded in an area between the postscript-recording point and the end address. Thus, mapping of the recorded and unrecorded status of the recording medium onto the information on tracks can be established, making the recording/reproduction apparatus capable of producing a result of determination as to whether or not data has been recorded at a target address.

In addition, in accordance with the present invention, a recording medium such as a disk of the write-once type may have an alternate-address management area used for managing alternate-address information as well as a pre-allocated alternate area. In this case, in order to implement defect alternate-address processing and data renewal processing, the following techniques are adopted.

Alternate-address information used for managing data renewal processing is provided in a format identical to that of already existing alternate-address information used for managing defect alternate-address processing and, in addition, both the alternate-address information used for managing data renewal processing and the alternate-address information used for managing defect alternate-address processing coexist in the alternate-address management area in the same way as a recording medium including no pre-allocated alternate area.

As an alternate-object replacement area for defect alternate-address processing and data renewal processing, a location selected among locations in the pre-allocated alternate area is used. As no available area is left in the pre-allocated alternate area, that is, as all the pre-allocated alternate area is used up in defect alternate-address processing and data renewal processing, a location in a main data area (or a user-data area) on the recording medium is selected as an alternate-object replacement location. An example of such a location is a postscript-recording point in a sequential recording range (or a track).

The recording/reproduction apparatus uses track information (or information on sequential recording ranges) in the postscript-recording method in producing a result of determination as to whether or not data has been recorded at an address on the recording medium in the same way as a recording medium including no pre-allocated alternate area.

As described above, in accordance with the present invention, a recording medium such as a disk of the write-once type may have an alternate-address management area used for managing alternate-address information but may not include a pre-allocated alternate area. Even in this case, defect alternate-address processing and data renewal processing can be carried out. That is to say, defect alternate-address processing and data renewal processing can be carried out without the need to pre-allocate an alternate area by:

using a selected area in the main data area such as a postscript-recording point in the main data area as an alternate-object replacement area;

using information on tracks (or information on sequential recording ranges) in producing a result of determination as to whether or not data has been recorded at an address specified in a data write request or the like; and mixing alternate-address information used for managing defect alternate-address processing and alternate-address information used for managing data renewal processing in the common alternate-address information area.

As a result, the following effects can be obtained.

In the first place, it is no longer necessary to estimate a suitable size of the alternate area in advance in the application or the like. The fact that it is no longer necessary to allocate an alternate area implies efficient utilization of the main data area or the user-data area.

In the second place, with a recording operation carried out by using a general file system, in considering operations to record a file on the disk and renew management information of the file, the seek distance of the pickup can be shortened to a value small enough for compensating for the alternate-address operation to move the pickup to the alternate-object replacement area. As an alternative, the management information of the file can be recorded into an area following the data. Thus, the recording performance can be improved. This technique is specially effective for a case in which the alternate-object replacement address is a postscript-recording point located at a position separated from the present position of the pickup in backward direction. That is to say, the alternate-object replacement address is a largest one among the addresses of a plurality of postscript-recording points.

In addition, even if data must be read out from an alternate-object replacement address corresponding to an address specified in a previous data write request due to the fact that a defect has been detected at the address in the previous write request, the reproduction performance is improved because of the shorter seek distance of the pickup. This technique is specially effective for a case in which the alternate-object replacement address is a postscript-recording point located in the same sequential recording range (or the same track) as the specified address.

On top of that, if an alternate-object replacement address of alternate-address processing is selected on the basis of information on a postscript-recording point in a sequential recording range other than the sequential recording range including an alternate-object original address representing an address specified in a data write process, it is possible to get rid of a problem of needlessly adding alternate-address management information in order to update existing alternate-address management information due to generation of consecutive unnecessary data renewals initiated by the application in a certain circumstance.

Furthermore, a write-once disk including no alternate area is capable of implementing the data renewal function while maintaining recording and reproduction compatibility with the ordinary write-once recording medium and the recording mediums of the RAM and ROM types as it is. Thus, the file system generally provided for typically the RAM-type disk and the ROM-type disk can also be used for an optical disk of the write-once type without the need to modify the hardware and the physical format.

Moreover, in accordance with the present invention described above, a recording medium such as a disk of the write-once type may have an alternate-address management area used for managing alternate-address information as well as a pre-allocated alternate area. In this case, defect alternate-address processing and data renewal processing can be carried out even if the size of an area left in the a pre-allocated alternate area becomes insufficient for the processing.

As no available area is left in the pre-allocated alternate area, that is, as all the pre-allocated alternate area is used up in defect alternate-address processing and data renewal processing, a location in a main data area (or a user-data area) on the recording medium is selected as an alternate-object replacement location. Thus, it is no longer necessary for an application or the like to estimate a proper size of the alternate area.

In addition, it is also no longer necessary to allocate an excessively large size of the alternate area in accordance with speculation on many extra data renewals. Thus, the main data area can be utilized with a high degree of efficiency.

On top of that, by selecting an alternate-object replacement area on the basis of a postscript point in alternate-address processing carried out using the main data area, the same effect of performance improvement as the disk having no alternate area as described above can be obtained.

It is needless to say that, also in this case, a write-once disk including an alternate area is capable of implementing the data renewal function while maintaining recording and reproduction compatibility with the ordinary write-once recording medium and the recording mediums of the RAM and ROM types as it is. Thus, the file system generally provided for typically the RAM-type disk and the ROM-type disk can also be used for an optical disk of the write-once type without the need to modify the hardware and the physical format.

BRIEF DESCRIPTION OF THE DRAWINGS

These and other objects and features of the present invention will become clear from the following description of the preferred embodiments given with reference to the accompanying diagrams, in which:

FIG. 3 is an explanatory diagram showing a DMA of a disk provided by the embodiment;

FIG. 4 is an explanatory diagram showing the contents of a DDS of a disk provided by the embodiment;

FIGS. 5A to 5D are explanatory diagrams showing the structure of a TDMA;

FIGS. 6A to 6C are explanatory diagrams showing a TDMS update unit provided by the embodiment;

FIG. 8 is an explanatory diagram showing a TDDS of a disk provided by the embodiment;

FIG. 9 is an explanatory diagram showing a TDFL of a disk provided by the embodiment;

FIGS. 10A and 10B are explanatory diagrams showing a DOW entry of a disk provided by the embodiment;

FIGS. 11A to 11C are explanatory diagrams showing SRRs on a disk provided by the embodiment;

FIG. 12 is an explanatory diagram showing SRRI of a disk provided by the embodiment;

FIGS. 13A and 13B are explanatory diagrams showing an SRRI header of a disk provided by the embodiment;

FIG. 17 is an explanatory diagram showing TDMA information of a disk provided by the embodiment;

FIGS. 20A and 20B are explanatory diagrams showing an application and shifted NWAs;

DETAILED DESCRIPTION OF THE PREFERRED EMBODIMENT

The following description explains an embodiment provided by the present invention as an embodiment implementing an optical disk and a disk drive employed in a recording apparatus and/or a reproduction apparatus as a disk drive designed for the optical disk. The description includes chapters arranged in the following order:

1: Disk Structure
2: DMA
3: TDMA
　3-1: TDMA Structure and TDMS Update Unit
　3-2: TDDS
　3-3: TDFL
　3-4: SRR and SRRI
　3-5: Alternate-Address Processing for Format with Alternate Areas
　3-6: TDMA and ATDMA in Format without Alternate Areas
4: Disk Drive Configuration
5: Data Recording/Reproduction Processing without Alternate Areas
　5-1: First Example of Data-Writing Processing
　5-2: Second Example of Data-Writing Processing
　5-3: Data-Reading Processing
　5-4: ATDMA-Checking Processing
6: Data Recording/Reproduction Processing Involving Alternate Areas
　6-1: First Example of Data-Writing Processing
　6-2: Second Example of Data-Writing Processing
　6-3: Data-Reading Processing
7: Effects of the Embodiment
1: Disk Structure First of all, an optical disk provided by the embodiment is explained. The optical disk can be implemented by a write-once optical disk referred to as the so-called blue-ray disk. The blue-ray disk pertains to the category of high-density optical disks.

Typical physical parameters of the high-density optical disk provided by the embodiment are explained as follows.

The of the optical disk provided by the embodiment is expressed in terms of a diameter of 120 mm and a disk thickness of 1.2 mm. That is to say, from the external-appearance point of view, the optical disk provided by the embodiment is similar to a disk of a CD (Compact Disk) system and a disk of a DVD (Digital Versatile Disk) system.

As a recording/reproduction laser, the so-called blue laser is used. By using an optical system having a high NA of typically 0.85, setting the track pitch at a small value of typically 0.32 microns, and setting the line density at a high value of typically 0.12 microns per bit, it is possible to implement a user-data storage capacity of about 23 Gbyte to 25 Gbyte for an optical disk with a diameter of 12 cm.

In addition, a two-layer disk is also developed. A two-layer disk is an optical disk having two recording layers. In the case of a two-layer disk, a user-data capacity of about 50 G can be achieved.

Figure 1:
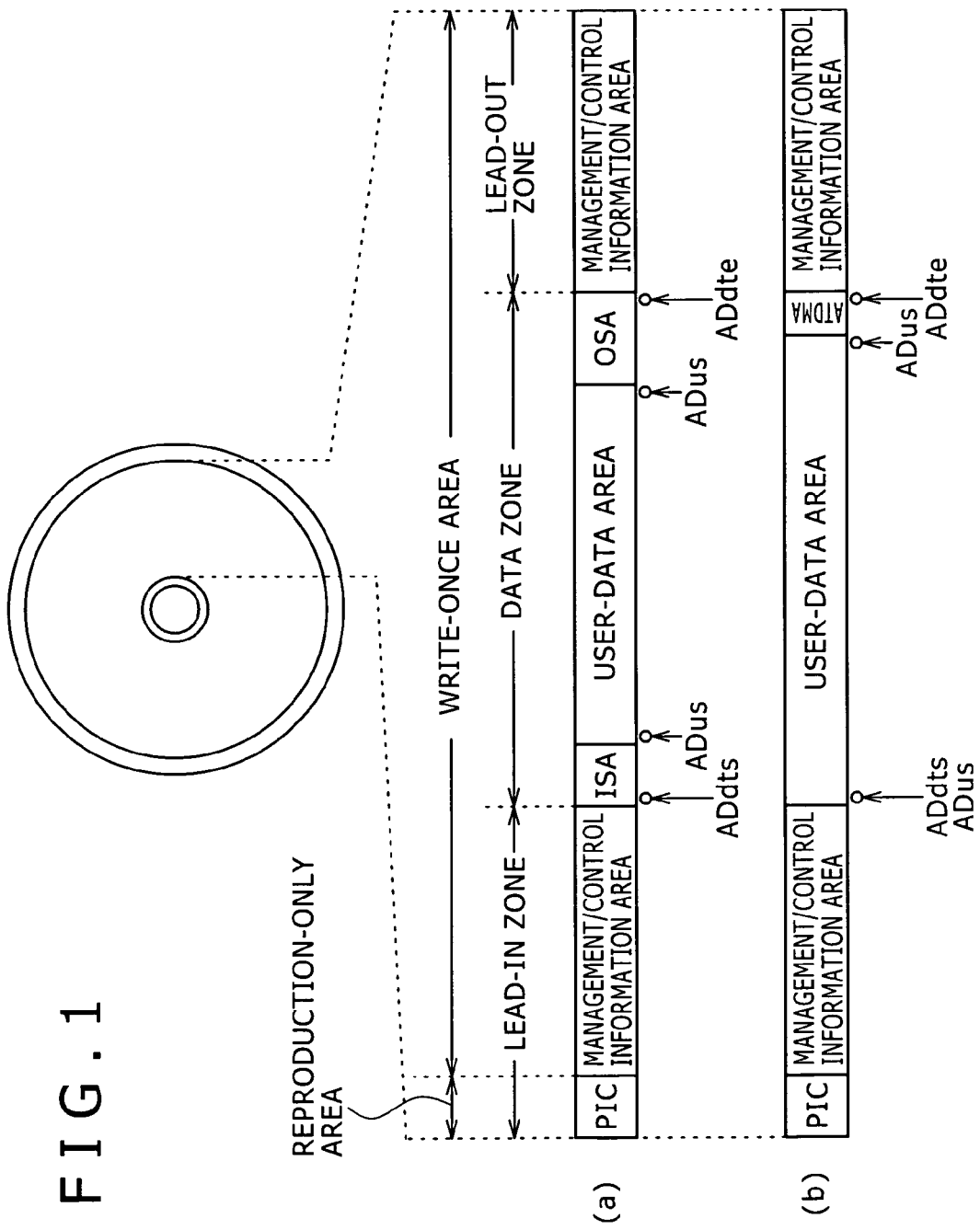
FIG. 1 is an explanatory diagram showing the area structure of a disk provided by an embodiment of the present invention.

FIG. 1 is an explanatory diagram showing the layout (or the area structure) of the entire disk.

It is to be noted that, in the typical system, a formatting process can be carried out to selectively implement a layout shown in (a) of FIG. 1 or a layout shown in (b) of FIG. 1.

In either case, the recording area of the optical disk 1 includes a lead-in zone on the innermost circumference, a data zone on a middle circumference and a lead-out zone on the outermost circumference.

The lead-in zone, the data zone and the lead-out zone serve as recording and reproduction areas as follows. A prerecorded information area PIC on the innermost side of the lead-in zone is a reproduction-only area. An area starting with a management/control information area of the lead-in zone and ending with the lead-out zone is used as a write-once area allowing data to be written therein only once.

In the reproduction-only area and the write-once area, a spiral recording track is created as a wobbling groove. The wobbling groove serves as a tracking guide in a tracing processing using a laser spot. The wobbling groove is thus a recording track, which data is recorded onto or read out from.

It is to be noted that, this embodiment assumes an optical disk allowing data to be recorded on the groove. However, the scope of the present invention is not limited to the optical disk with such a recording track. For example, the present invention can also be applied to an optical disk adopting a land recording-technique whereby data is recorded on a land between two adjacent grooves. In addition, the present invention can also be applied to an optical disk adopting a land/groove recording-technique whereby data is recorded on a land and a groove.

In addition, the groove used as a recording track in an optical disk has a shape wobbled by a wobbling signal. Thus, a disk drive for such an optical disk detects both edge positions of the groove from a reflected light beam of a laser spot radiated to the groove. Then, by extracting components fluctuating in the radial direction of the optical disk 1 as fluctuations of both the edge positions in a processing to move the laser spot along the recording track, the wobble signal can be reproduced.

This wobble signal is modulated by information on addresses of recording locations on the recording track. The information on addresses includes physical addresses and other additional information. Thus, by demodulating the wobble signal to produce the information on addresses, the disk drive is capable of controlling addresses, at which data are to be recorded or reproduced.

The lead-in zone shown in FIG. 1 is an area on the inner side of a typical radius of 24 mm.

An area between a circumference with a radius of 22.2 mm and a circumference with a radius of 23.1 mm in the lead-in zone is the prerecorded information area PIC.

The prerecorded information area PIC is used for storing reproduction-only information as the wobbling state of the groove. The reproduction-only information includes disk information such as recording/reproduction power conditions, information on areas on the optical disk 1 and information used for copy protection. It is to be noted that these pieces of information can also be recorded on the optical disk 1 as emboss pits or the like.

A BCA (Burst Cutting Area) not shown in the figure may be provided on the inner side of the prerecorded information area PIC in some cases. In the BCA, a unique ID peculiar to the optical disk 1 is stored by burning off a recording layer. The unique ID is recorded marks created in a concentric-circle shape to form recorded data in a bar-code format.

An area between a circumference with a radius of 23.1 mm and a circumference with a radius of 24.0 mm in the lead-in zone is a management/control information area.

The management/control information area has a predetermined area format to include a control data area, a DMA (Defect Management Area), a TDMA (Temporary Defect Management Area), a test write area (OPC) and a buffer area.

The control data area included in the management/control information area is used for recording management/control information such as a disk type, a disk size, a disk version, a layer structure, a channel-bit length, BCA information, a transfer rate, data-zone position information, a recording line speed and recording/reproduction laser power information.

The test write area (OPC) included in the management/control information area is used for a trial writing process carried out in setting data recording/reproduction conditions such as a laser power to be used in recording/reproduction processing. That is, the test write area is a region for adjusting the recording/reproduction conditions.

In the case of an ordinary optical disk, the DMA included in the management/control information area is used for recording alternate-address management information for managing defects. In the field of a disk system, the DMA is referred to as a Defect Management Area. In the case of a write-once optical disk provided by the embodiment, however, the DMA is used for recording not only the alternate-address management information of defects but also manage-ment/control information for implementing data renewals in the optical disk. Thus, the DMA has a function of the Disc Management Area.

In addition, in order to make renewal of data possible by making use of an alternate-address process, the contents of the DMA must also be updated when data is renewed. For updating the contents of the DMA, the TDMA is provided.

Alternate-address management information is added and/or recorded in the TDMA and updated from time to time. Last (most recent) alternate-address management information recorded in the TDMA is eventually transferred to the DMA.

The DMA and the TDMA will be described later in detail.

The area on the circumferences with radii in the range 24.0 to 58.0 mm external to the lead-in zone is used as a data zone. User data is actually recorded into and reproduced from the data zone. The start address ADdts and end address ADdte of the data zone are included in the data zone position information recorded in the control data area described earlier.

In (a) of FIG. 1, is a diagram showing a format in which alternate areas (or spare areas) are provided in the data zone. In this case, the alternate areas are provided as an ISA (Inner Spare Area) on the innermost circumference of the data zone and an OSA (Outer Spare Area) on the outermost circumference of the data zone. That is to say, the ISA and the OSA are each an alternate area used in alternate-address processing to treat a defect and alternate-address processing to renew data already recorded on the optical disk.

The ISA is an area having a size of a predetermined number of clusters starting from the start position in the data zone. The size of 1 cluster is 65,536 bytes.

On the other hand, the OSA is an area having a size of a predetermined number of clusters from the last position to the inner side in the data zone. The sizes of the ISA and the OSA are recorded in the DMA described above.

A region existing in the middle of the data zone as a region sandwiched by the ISA and the OSA is used as a user-data area. User data is to be normally recorded into and to be normally read out from the user-data.

Also recorded in the DMA described above, the location of the user-data area is expressed in terms of a start address ADus and end address ADue of the user-data area.

On the other hand, in (b) of FIG. 1, is a diagram showing a format in which an alternate area (or a spare area) is not provided in the data zone. In this case, the all but entire area of the data zone is used as a user-data area. However, an ATDMA (Additional TDMA) can be created on the end edge of the data zone. It is to be noted that, in the case of the layout shown in (a) of FIG. 1, an ATDMA may be created in the OSA.

The ATDMA is an area provided additionally to the TDMA in the management/control information area. If the TDMA is used up for updating alternate-address management information, the ATDMA can be used for updating the alternate-address management information as a continuation of the TDMA.

In the case of the format shown in (b) of FIG. 1, an ISA and an OSA are not provided. Thus, the sizes of the ISA and the OSA are both set at 0 in the DMA described above.

The location of the user-data area, that is, the start address ADus, coincides with the start address ADdts of the data zone. If an ATDMA is not provided, the end address ADue of the user-data zone coincides with the end address ADdte of the data zone. If an ATDMA is provided, on the other hand, the end address ADue of the user-data zone coincides with an address immediately preceding the ATDMA.

In the case of either the format shown in (a) of FIG. 1 or the format shown in (b) of FIG. 1, the area on the circumferences with radii in the range 58.0 to 58.5 mm external to the data zone is the lead-out zone. The lead-out zone is a management/control information area having a predetermined format to include a control data area, a DMA and a buffer area. Much like the control data area included in the lead-in zone, the control data area of the lead-out zone is used for storing various kinds of management/control information. By the same token, much like the DMA included in the lead-in zone, the DMA of the lead-out zone is used as an area for recording management information of the ISA and management information of the OSA.

Figure 2:
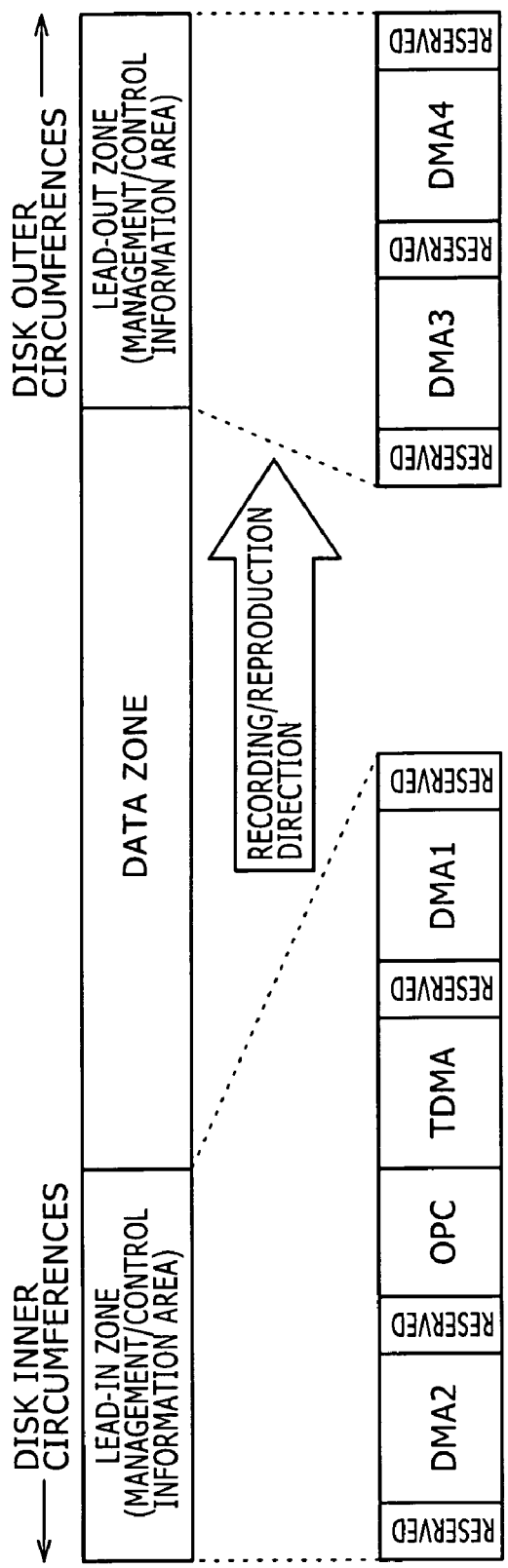
FIG. 2 is an explanatory diagram showing management/control information areas on a disk according to the embodiment.

FIG. 2 is a diagram showing a typical structure of the management/control information area.

As shown in the figure, in addition to undefined segments (reserved segments), the lead-in zone includes a variety of areas such as DMA 2, an OPC (a test write area), a TDMA and DMA 1. On the other hand, in addition to undefined segments (reserved segments), the lead-out zone includes a variety of areas such as DMA 3 and DMA 4.

It is to be noted that the control data area described above is not shown in the figure. This is because, in actuality, a portion of the control data area is used as a DMA for example. Since the structure of a DMA is an essential of the present invention, the control data area is not shown in the figure.

As described above, the lead-in and lead-out zones include four DMAs, i.e., DMA 1 to DMA 4. DMA 1 to DMA 4 are each used as an area for recording the same alternate-address management information.

However, a TDMA is provided as an area used for temporarily recording alternate-address management information and, every time an alternate-address process is carried out due to renewal of data or due to a defect, new alternate-address management information is incrementally recorded in the TDMA (or the ATDMA if the TDMA has been used up) to update the information already recorded therein.

Thus, till the optical disk 1 is finalized, for example, the DMAs are not used. Instead, the alternate-address management is carried out and new alternate-address management information is added to the TDMA (or the ATDMA and/or recorded in the TDMA (or the ATDMA if the TDMA has been used up). As the optical disk 1 is finalized, alternate-address management information recorded on the TDMA (or the ATDMA) most recently is transferred to the DMAs so that the alternate-address process based on the DMA can be carried out.

2: DMA

FIG. 3 is a diagram showing the structure of a DMA recorded in the lead-in zone and the lead-out zone.

The figure shows a typical DMA with a size of 32 clusters. However, the size of a DMA is not limited to 32 clusters.

It is to be noted that 1 cluster is 65,536 bytes as described earlier. A cluster is the smallest unit of processing to record data onto a disk. A sector or a data frame is another unit having a size of 2,048 bytes. Thus, a cluster is composed of 32 sectors or 32 data frames. In expressing the size of user data, the sector is equivalent to the data frame. However, the sector is a physical data unit while a data frame is a logical data unit.

An address is assigned to every sector. A physical sector address is referred to as a PSN (Physical Sector Number) while a logical sector address is referred to as a LSN (Logical Sector Number).

In the typical structure shown in FIG. 3, cluster numbers in the range 1 to 32 are assigned to every 4 clusters of the 32 clusters as numbers indicating the location of each data in the DMA. The size of each data is expressed in terms of clusters. In this case, each data has a size of 4 clusters.

In the DMA, cluster numbers 1 to 4 identify four clusters forming a segment for recording a DDS (Disc Definition Structure), which describes the disc in detail.

The contents of the DDS will be described later by referring to FIG. 4. In actually, since the size of the DDS is one cluster, four identical DDSes are recorded in the segment.

Cluster numbers 5 to 8 identify four clusters forming a segment for recording DFL #1, which is the first recording area of a DFL (defect list). The size of data stored in the defect list is four clusters forming a list of information on alternate addresses. The information on alternate addresses is referred to as DOW entries or DFL entries. These entries will be described later.

Cluster numbers 9 to 12 identify four clusters forming a segment for recording DFL #2, which is the second recording area of the defect list.

The second recording area is followed by the third and subsequent recording areas DFL #3 to DFL #6, which each have a size of four clusters. The four-cluster segment DFL #7 used as the seventh recording area of the defect list is identified by cluster numbers 29 to 32.

As is obvious from the above description, the DMA having a size of 32 clusters includes seven recording areas of the defect list, i.e., DFL #1 to DFL #7.

In a write-once optical disk allowing data to be recorded therein once as is the case with the optical disk 1 provided by the embodiment, in order to record contents of a DMA, it is necessary to carry out a process referred to as 'finalize'. In this case, the same contents are recorded in seven recording areas DFL #1 to DFL #7.

Since the structure of the defect list DFL is all but identical with that of the TDFL (Temporary DFL) in the TDMA to be described later, explanation of the structure of the defect list DFL is omitted.

FIG. 4 is a diagram showing the data structure of the contents of the DDS recorded at the beginning of the DMA shown in FIG. 3.

As described above, the DDS has a size of one cluster (=65,536 bytes).

In the data structure shown in FIG. 4, byte 0 is the position of the beginning of the DDS having a size of 65,536 bytes. A byte-count column shows the number of bytes included in each data content.

Two bytes indicated by byte positions 0 to 1 are used as bytes for recording "DS", which is a DDS identifier indicating that this cluster is the DDS.

One byte indicated by byte position 2 is used as a byte for recording a DDS format number of the version of the DDS format.

Four bytes indicated by byte positions 4 to 7 are used as bytes for recording the number of times the DDS has been updated. The number of times the DDS has been updated is referred to as a DDS Update Count. It is to be noted that, in this embodiment, in the finalize process, alternate-address management information is additionally written into the DMA itself instead of being used for updating the DMA. The alternate-address management information is stored in the TDMA before being written into the DMA in the finalize process. Thus, when the finalize process is eventually carried out, a TDDS (temporary DDS) of the TDMA contains the number of times the TDDS has been updated. The aforementioned number of times the DDS has been updated is the number of times the TDDS has been updated.

Four bytes indicated by byte positions 16 to 19 are used as bytes for recording AD_DRV, which is the start physical sector address of a drive area in the DMA.

Four bytes indicated by byte positions 24 to 27 are used as bytes for recording AD_DFL, which is the start physical sector address of a defect list DFL in the DMA.

Four bytes indicated by byte positions 32 to 35 are used as bytes for recording a PSN (Physical Sector Number or a Physical Sector Address) of the start position of the user-data area in the data zone. The start position of the user-data area in the data zone is A Dus shown in FIG. 1. That is to say, the four bytes are used as bytes for recording a PSN (Physical Sector Number) indicating the position with an LSN (Logical Sector Number) of 0.

Four bytes indicated by byte positions 36 to 39 are used as bytes for recording an LSN of the end position of the user-data area in the data zone. The end position of the user-data area in the data zone is A Due shown in FIG. 1.

Four bytes indicated by byte positions 40 to 43 are used as bytes for recording the size of the ISA in the data zone. In the case of the format shown in (b) of FIG. 1, the size of the ISA is set at 0.

Four bytes indicated by byte positions 44 to 47 are used as bytes for recording the size of each OSA in the data zone. In the case of the format shown in (b) of FIG. 1, the size of the OSA is set at 0.

Four bytes indicated by byte positions 48 to 51 are used as bytes for recording the size of the ISA in the data zone. The ISA is the ISA on the second layer of a two-layer disk.

One byte indicated by byte position 52 is used as a byte for recording a spare area full flag showing whether or not data can be renewed by using an ISA or an OSA. That is to say, the spare area full flag is used to indicate that the ISA and the OSA have been used up entirely.

One byte indicated by byte position 54 is used as a byte for recording a disc certification flag. Thus, this byte is authentication status of the optical disk 1.

Four bytes indicated by byte positions 56 to 59 are used as bytes for recording a last verified address pointer.

Byte positions other than the byte positions described above are reserved (or undefined) and all filled with codes of 00h.

In the DMA, information on alternate-address management is recorded in a data structure like the one described above. As explained above, however, these kinds of information are recorded in a process to finalize the optical disk 1. In this process, most recent information on alternate-address management is transferred from the TDMA to the DMA.

Information on defect processing and information on alternate-address management carried out due to renewal of data are recorded in the TDMA described below and updated from time to time.

3: TDMA 3-1: TDMA Structure and TDMS Update Unit

The following description explains a TDMA provided in the management/control information area, which is shown in FIG. 1, as shown in FIG. 2. Much like the DMA, the TDMA (Temporary DMA) is an area for storing information on alternate-address management. The TDMA is updated by incrementally recording additional information on alternate-address management when an alternate-address process is carried out at renewal of data or defection of a defect.

FIGS. 5A to 5D are diagrams showing the structure of the TDMA. As shown in FIGS. 5A and 5B, a typical size of a TDMA provided in the management/control area is 2,048 clusters.

FIG. 5C is a diagram showing the structure of the TDMA having a size of 2,048 clusters. However, the structure shown in FIG. 5C corresponds to a format including the alternate areas ISA and OSA as shown in (a) of FIG. 1. The TDMA structure corresponding to the format shown in (b) of FIG. 1 will be described later by referring to FIG. 16.

The first 2 clusters at the beginning of the TDMA, i.e., clusters CL0 and CL1, have the functions of TDMA indicators.

Cluster CL1 is an ATDMA indicator, which is used for recording a structure including a most recent TDDS (Temporary Disk Definition Structure) to be described later when information is recorded in the ATDMA (Additional TDMA) for the first time.

Cluster CL0 is a DMA indicator, which is used for recording necessary information read in the form shown in FIG. 3 from a most recent TDMS (Temporary Disk Management Structure) to be described later when data is recorded in the DMA.

With a structure already recorded in cluster CL1, this cluster indicates that the most recent TDMS can be read from the ATDMA. With necessary information already recorded in cluster CL0, this cluster indicates that the optical disk 1 has been finalized, being put in a write-protect state and the most recent information on the optical disk 1 can be read from the DMA.

Clusters CL2 to CL2047 are used for updating information on the optical disk 1 and information on alternate-address management.

A structure including the information on the optical disk 1 and the information on alternate-address management, which are recorded in cluster CL2 and subsequent clusters, is referred to as a TDMS (Temporary Disk Management Structure).

The TDMS is updated by incrementally recording additional information into the TDMS in TDMS update units each having a size in the range 1 to N clusters. In a sequential recording mode, the value of N is set at 4. In the case of a 2-layer disk, the value of N is set at 8.

In the case of the TDMS shown in FIG. 5D, for example, a first TDMS update unit having a size of 1 cluster is recorded initially in cluster CL2. Then, a second TDMS update unit having a size of 1 cluster is recorded in cluster CL3. Subsequently, a third TDMS update unit having a size of 2 clusters is recorded in cluster CL4.

Since the information on the optical disk 1 and the information on alternate-address management must be updated, the TDMS is continuously updated from time to time by incrementally recording additional TDMS update units into subsequent clusters as described above. A most recent TDMS update unit is recorded into a cluster immediately following the cluster in which the immediately preceding TDMS update unit has been recorded.

If a sequential recording mode is set as the recording mode of the write-once disk according to the embodiment, the TDMS is composed of three elements, i.e., a TDDS (Temporary Disc Definition Structure), a TDFL (Temporary Defect List) and SRRI (Sequential Recording Range Information). These elements are always recorded in the same TDMA.

As will be described in detail later, the TDDS is a structure for mainly recording information for management of the TDMS, and the TDFL is a list showing DOW and DFL entries representing actual alternate-address information. On the other hand, the SRRI is SRR (Sequential Recording Range) management information recorded in the user-data area. The sequential recording range in this case corresponds to a track referred to as, among others, a CD and a DVD.

FIGS. 6A to 6C are diagrams each showing the structure of a TDMS update unit. Each TDMS update unit includes a TDDS having a size of 1 sector. The TDDS is placed in the last sector (or the last data frame) of the clusters composing the TDMS update unit.

If the TDMS update unit includes a TDFL, the TDFL occupies as many sectors (or as many data frames) at the beginning of the TDMS update unit as required.

If the TDMS update unit includes SRRI, the SRRI is placed at the end of the TDMS update unit at sectors. To be more specific, the SRRI occupies as many sectors (or as many data frames) immediately preceding the TDDS as required.

FIG. 6A is a diagram showing a typical TDMS update unit including SRRI and a TDDS. This typical TDMS update unit has a typical size of 1 cluster with the last sector (or the last data frame 31) used for recording the TDDS. The SRRI has a size of M sectors. That is to say, M sectors immediately preceding the TDDS are used for recording the SRRI. These M sectors begin with data frame (31-M) and end with data frame 30.

Since this typical TDMS update unit does not include a TDFL, data frame 0 to data frame (30-M) are filled up with zero data of 00h.

FIG. 6B is a diagram showing a typical TDMS update unit including a TDFL and a TDDS. This typical TDMS update unit has a typical size of K clusters with the last sector used for recording the TDDS. In this case, the last sector is data frame 31 of cluster K. If the TDFL has a size of N sectors, the N sectors at the start of the TDMS update unit are used for storing the TDFL. These N sectors are data frames ranging data frame 0 of cluster 0 to data frame (x−1) of cluster K where notation x is an integer satisfying the following equation:

$$x = mod(N/32) - 1.$$

Since this typical TDMS update unit does not include SRRI, data frame x to data frame 30 are filled up with zero data of 00h.

FIG. 6C is a diagram showing a typical TDMS update unit including a TDFL, SRRI and a TDDS. This typical TDMS update unit has a typical size of K clusters with the last sector used for recording the TDDS. In this case, the last sector is data frame 31 of cluster K. If the TDFL has a size of N sectors, the N sectors at the start of the TDMS update unit are used for storing the TDFL. These N sectors are data frames ranging from data frame 0 of cluster 0 to data frame (x−1) of cluster (K−1).

The SRRI has a size of M sectors. That is to say, M sectors immediately preceding the TDDS are used for recording the SRRI. These M sectors begin with data frame (31-M) and end with data frame 30 of cluster K.

If an area is left between the TDFL and the SRRI as shown in the figure, the area is filled up with zero data of 00h.

It is to be noted that the number of clusters composing the TDMS update unit varies in dependence on the sizes of the TDFL and the SRRI.

Figure 7:
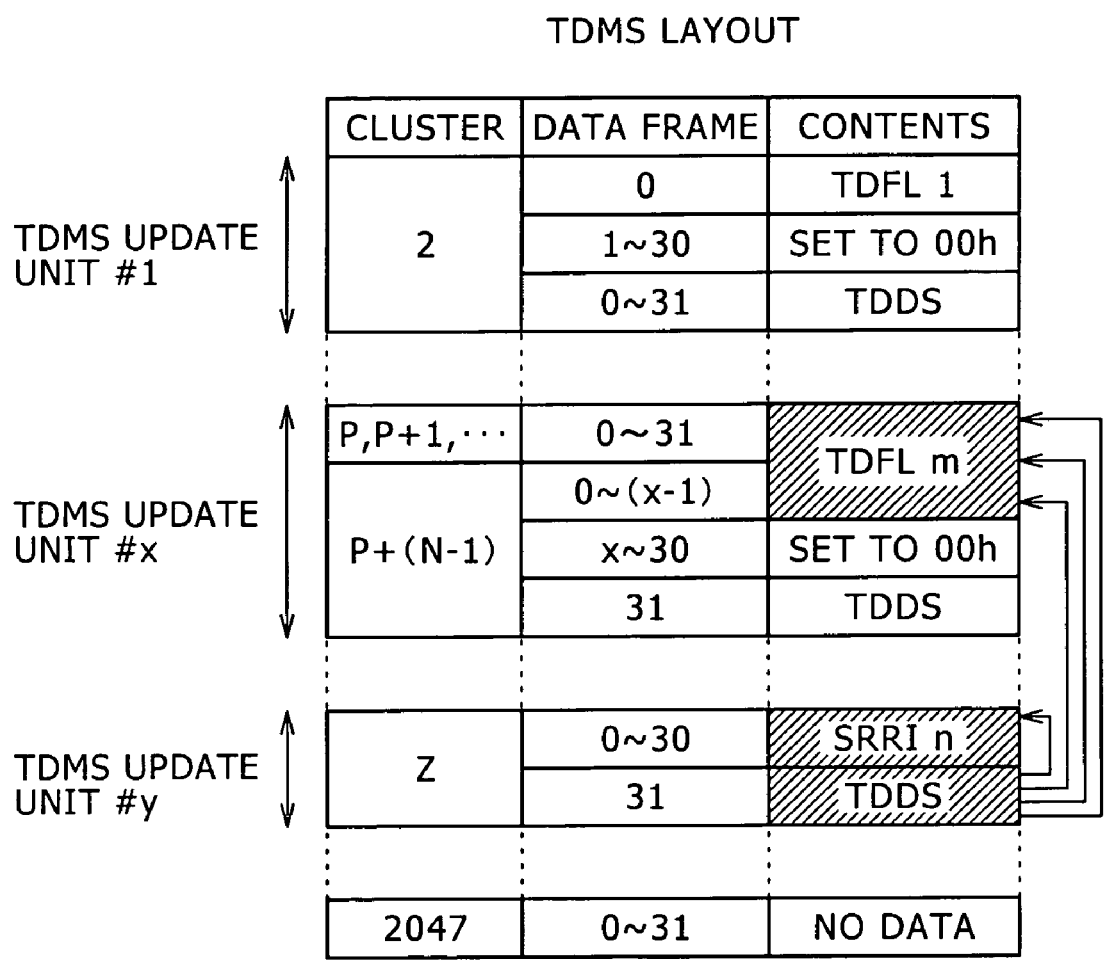
FIG. 7 is an explanatory diagram showing a state of incrementally recording TDMS update units provided by the embodiment.

FIG. 7 is a diagram showing a state in which additional TDMS update units have been incrementally recorded. For example, first of all, additional TDMS update unit #1 having a size of 2 clusters is incrementally recorded. Then, additional TDMS update units #2, #3 . . . #x . . . #y are incrementally added.

Assume for example that it is necessary to update a TDFL, SRRI or both a TDFL and SRRI. In order to update a TDFL, an additional TDMS update unit having the structure shown in FIG. 6B is recorded incrementally. In order to update SRRI, an additional TDMS update unit having the structure shown in FIG. 6A is recorded incrementally. In order to update both a TDFL and SRRI, an additional TDMS update unit having the structure shown in FIG. 6C is recorded incrementally. If it is necessary to update SRRI but not a TDFL, for example, the incrementally recorded additional TDMS unit has a format like one shown in FIG. 6A.

In the state shown in FIG. 7, TDMS update unit #y is the most recent TDMS update unit. As also shown in this figure, a TDMS update unit always includes a TDDS. Thus, the TDDS included in TDMS update unit #y is the effective most recent TDDS.

This most recent TDDS points to effective SRRI and an effective TDFL.

TDMS update unit #y in this example is incrementally recorded to update SRRI. Thus, the most recent TDDS included in TDMS update unit #y makes the SRRIn included in TDMS update unit #y effective SRRI.

In addition, if the TDFLm included in TDMS update unit #x is a valid TDFL, the most recent TDDS included in TDMS update unit #y makes the TDFLm included in TDMS update unit #x an effective TDFL.

That is to say, in TDMS update units incrementally recorded from time to time in cluster CL2 and subsequent clusters in the TDMA shown in FIGS. 5A to 5D, the TDDS included in the most recent TDMS update unit is the effective most recent TDDS, pointing to effective SRRI and an effective TDFL.

3-2: TDDS

FIG. 8 is a diagram showing the structure of a TDDS (Temporary Disc Definition Structure) recorded in the last sector of a TDMS update unit as described above.

That is to say, the TDDS has a size of 1 sector equivalent to 2,048 bytes. The DDS has contents similar to the contents of the DDS in a DMA described before by referring to FIG. 4. It is to be noted that, even though the DDS has a size of 1 cluster equivalent to 65,536 bytes, as explained earlier by referring to FIG. 4, only byte positions 0 to 59 of data frame 0 are defined as the actual contents of the DDS. That is to say, the actual contents of the DDS are recorded in the first sector (or the first data frame) of the cluster. For this reason, even though the TDDS has a size of only 1 sector, the actual contents of the DDS can be accommodated in the TDDS.

As described above, the TDDS is in the last sector of the last cluster of a TDMS update unit. Thus, as shown in FIG. 8, the TDDS is recorded at byte positions 0 to 2,047 of data frame 31.

Byte positions 0 to 53 of the TDDS are the same as those of the DDS. That is to say, when a DDS is recorded at a finalization time, the contents of byte positions 0 to 53 of the most recent TDDS are reflected in the recorded DDS.

It is to be noted that byte positions 4 to 7 in byte positions 0 to 53 of the DDS and the TDDS are used for storing a DDS-updating count as explained earlier by referring to FIG. 4. In the case of the TDDS, however, information stored in byte positions 4 to 7 is a TDDS creation count. In addition, the defect-list start PSN recorded at byte positions 24 to 27 is maintained at 0 till close processing of the optical disk 1 is carried out. The close processing is processing to inhibit the incrementally recording processing described above.

In the close processing, the TDDS creation count recorded at byte positions 4 to 7 and the defect-list start PSN recorded at byte positions 24 to 27 are copied from the most recent TDDS at a finalization point to respectively byte positions 4 to 7 and byte positions 24 to 27 of the DDS written into the DMA.

Byte positions 1,024 and subsequent byte positions in the TDDS are used for recording information not recorded in the DDS. It is to be noted that, in the TDDS shown in FIG. 8, some of contents of byte positions 1,024 and subsequent byte positions are eliminated and only contents relevant to explained processing of the embodiment are shown.

One byte at byte position 1,024 is used for recording the recording mode of the optical disk 1.

Four bytes at byte positions 1,032 to 1,035 are used for recording the last physical-sector address PSN of the user-data area in which data has been recorded.

Four bytes at byte positions 1,040 to 1,043 are used for recording the size of the ATDMA.

Four bytes at byte positions 1,120 to 1,123 are used for recording the first PSN of the first cluster of the TDFL.

Every 4 bytes thereafter are used for storing the first PSN of each of the second to eighth clusters of the TDFL.

The first PSN of the first cluster of the TDFL to the first PSN of the eighth cluster of the TDFL are used as the pointers to their respective clusters of the TDFL. As shown in FIG. 7, the pointers are used for indicating an effective TDFL.

Four bytes at byte positions 1,184 to 1,187 are used for recording the first PSN of the SRRI. The first PSN of the SRRI points to the SRRI and is used for indicating the effective SRRI as shown in FIG. 7.

Four bytes at byte positions 1,216 to 1,219 are used for recording the next available PSN of ISA.

Four bytes at byte positions 1,220 to 1,223 are used for recording the next available PSN of OSA.

After the ISA or the OSA is used in alternate-address processing, the PSN of the next available sector in the ISA or the OSA respectively is stored in the 4 bytes at byte positions 1,220 to 1,223 or the 4 bytes at byte positions 1,220 to 1,223 as an update.

Bytes at byte positions 1,920 to 2,048 are used for storing the drive ID.

3-3: TDFL

Next, the structure of a TDFL (Temporary DFL) is explained. As described above, the TDFL is updated by including a new TDFL in an additional TDMS update unit.

In the TDFL structure shown FIG. 9, the cluster number/the data-frame number is the number of a cluster in the TDFL and the number of a 2,048-byte sector in the cluster identified by the cluster number. A data-frame byte position is the byte position in a data frame identified by the data-frame number.

Sixty-four bytes starting with a byte at byte position 0 are used for storing a TDFL (Temporary Defect List) header describing management information of the TDFL.

The TDFL management information included in the TDFL header includes information indicating that the clusters are TDFL clusters, a version number, a TDFL-updating count (or a TDFL-recording/updating count) and an entry count indicating the number of entries in an information block of the TDFL. The entries are DOW (Data Overwrite) and DFL entries.

Bytes at byte position 64 and subsequent byte positions are used for storing a temporary list of defects. The temporary list of defects includes a plurality of information blocks, which each have a size of 8 bytes. If N information blocks are included in the temporary list of defects, the size of the list is thus N×8 bytes.

An information block with a size of 8 bytes is a piece of alternate-address information, serving as a DOW or DFL entry.

Essentially, a DOW entry is the same alternate-address information as a DFL entry. In order to make the explanation convenient, a DFL entry is alternate-address information of a defective area while a DOW entry is alternate-address information used for renewing data.

Since DOW and DFL entries are processed in virtually the same alternate-address processing, these entries may coexist as information blocks in the temporary list of defects.

The temporary list of defects is thus a collection of a plurality of DFL and DOW entries. The maximum number of DFL and DOW entries is 32,759 in the case of a one-layer disk.

The temporary list of defects is immediately followed by a temporary defect list terminator also having a size of 8 blocks. The temporary defect list terminator indicates the end of the temporary list of defects. The area in the same cluster as the temporary defect list terminator is filled up with data of 0 to the end of the cluster.

FIG. 10A is a diagram showing the structure of the 8-byte DOW entry serving as an information block. It is to be noted that the DFL entry has the same format as the DOW entry.

Thus, the DOW entry has a size of 64 bits. Four bits b63 to b60 are used for recording status 1.

Twenty-eight bits b59 to b32 are used for recording an alternate-object original address, that is, the first PSN of the alternate-object original cluster. The alternate-object original address is an address, at which data is supposed to be recorded originally, but is replaced with the address of another location in alternate-address processing. The address used as a substitute for an alternate-object original address is referred to as an alternate-object replacement address.

Four bits b31 to b28 are used for recording status 2.

Twenty-eight bits b27 to b0 are used for recording an alternate-object replacement address, that is, the first PSN of the alternate-object replacement cluster.

The meanings of statuses 1 and 2 are explained by referring to FIG. 10B as follows.

Statuses 1 and 2 both set at '0000' indicate that the DOW entry (or the DFL entry) is ordinary alternate-address information.

In the case of ordinary alternate-address information, the entry corresponds to alternate-address processing carried out to process a cluster on the basis of an alternate-object original address and an alternate-object replacement address, which are recorded in the entry of the alternate-address information. That is to say, the entry corresponds to alternate-address processing carried out to renew data or alternate-address processing based on detection of a defect.

In the case of a format including a set alternate area as shown in (a) of FIG. 1, the alternate-object replacement address is basically an address in an ISA or an OSA. In the case of a format including no alternate area as shown in (b) of FIG. 1, on the other hand, the alternate-object replacement address is an address selected in the user-data area.

It is to be noted that, as will be described later, even for a format including a set alternate area as shown in (a) of FIG. 1, alternate-address processing may be carried out by using a region in the user-data area in some cases. In such cases, the alternate-object replacement address is an address selected in the user-data area.

Statuses 1 and 2 set at '0000' and '0001' respectively indicate that the entry includes start addresses used in burst-block alternate-address processing. Statuses 1 and 2 set at '0000' and '0010' respectively indicate that the entry includes end addresses used in burst-block alternate-address processing. The processing is alternate-address processing carried out on a plurality of physically continuous clusters treated collectively.

That is to say, an entry with statuses 1 and 2 set at '0000' and '0001' respectively includes the first PSN of the first cluster of a plurality of physically continuous clusters treated collectively as one alternate-object original cluster and the first PSN of the first cluster of a plurality of physically continuous clusters treated collectively as one alternate-object replacement cluster.

An entry with statuses 1 and 2 set at '0000' and '0010' respectively includes the first PSN of the last cluster of a plurality of physically continuous clusters treated collectively as one alternate-object original cluster and the first PSN of the last cluster of a plurality of physically continuous clusters treated collectively as one alternate-object replacement cluster.

By using the above two entries, i.e., an entry with statuses 1 and 2 set at '0000' and '0001' respectively and an entry with statuses 1 and 2 set at '0000' and '0010' respectively, it is possible to carry out alternate-address processing on a plurality of physically continuous clusters treated collectively as each one of alternate-object original and replacement clusters. That is to say, in order to carry out alternate-address processing on a plurality of physically continuous clusters treated collectively as each one of alternate-object original and replacement clusters, it is not necessary to provide an entry for each pair of alternate-object original and alternate-object replacement cluster. Instead, it is necessary to provide only an alternate-address information entry for the first alternate-object original and replacement clusters and another alternate-address information entry for the last alternate-object original and replacement clusters.

The DOW and DFL entries coexist on the TDFL in the same format. When the optical disk 1 according to the embodiment is mounted on an apparatus having no data alternate-address processing power, however, the DOW and DFL entries are all interpreted as DFL entries so that, since a cluster read out at a reproduction time is subjected to alternate-address processing normally, reproduction compatibility is sustained.

In addition, it is necessary to consider an apparatus having no burst-block alternate-address processing function. Thus, when a DMA is written at a finalization time, that is, when the contents of the most recent TDFL are written into the DFL at a finalization time, it is necessary to reconstruct the DFL by representing a plurality of clusters completing the burst-block alternate-address processing in terms of their individual ordinary alternate-address information entries. By representing a plurality of clusters completing the burst-block alternate-address processing in terms of their individual ordinary alternate-address information entries, all alternate-address information clusters each describe ordinary alternate-address information of a cluster so that reproduction compatibility can be assured even in the case of an apparatus having no burst-block alternate-address processing function.

3-4: SRR and SRRI

Next, an SRR (Sequential Recording Range) and SRRI (Sequential Recording Range Information) are explained.

FIGS. 11A to 11C are diagrams showing the structure of the SRR. The SRR is a write area (or a contiguous recording range), which is used when a sequential recording mode is adopted in a write-once disk according to the embodiment. The SRR has following characteristics <1> to <5> similar to those of a track on a CD.
<1> Data is recorded onto the SRR in an increasing address direction. In addition, the SRR can have only a recordable-data address referred to as a postscript-recording point. The address used as the postscript-recording point is also referred to as an NWA (Next Writable Address) or a next writable PSN. The postscript-recording point of an SRR is thus the start address of an area left in the SRR as an area into which data can be recorded.

As shown in FIG. 11A, an LRA (Last Recorded Address or last PSN) is the last recorded address in the SRR. In the following description, a recorded address means an address at which data has been recorded. In this case, the NWA can be expressed as follows:

$NWA = (ip(LRA/32)+1)*32+1)$ (For $LRA \neq 0$)

$NWA =$ Start PSN of the SRR (For $LRA = 0$)

where ip (N) is a largest integer smaller than N.

That is to say, if data is being recorded into the SRR, the NWA is the start address (PSN) of a cluster immediately following a cluster that includes the LRA. If no data is not being recorded into the SRR, on the other hand, the NWA is set at the start address (PSN) of the SRR.

<2> The SRR can have one of two kinds of status, that is, either open status or closed status.

FIG. 11A is a diagram showing an open SRR, which is a writable SRR or an SRR having an NWA. On the other hand, FIG. 11B is a diagram showing a closed SRR, which is an unwritable SRR or an SRR having no NWA.

<3> A process to allocate an open SRR on a disk is referred to as a processing to reserve an SRR. On the other hand, a process to change the status of an open SRR to the closed status is referred to as a processing to close the SRR.

<4> A plurality of SRRs up to a maximum of 7,927 may exist on a disk. The SRRs existing on a disk may include up to 16 SRRs each having the open status.

<5> An SRR into which data is to be written may be selected arbitrarily in any order.

In accordance with an actual method of using an SRR, an open SRR is reserved by allocating a management area of the file system in the forward direction of file data and recording management information of the file system into the management area after recording file data onto the optical disk 1.

FIG. 11 (c) is a diagram showing a sample layout of a disk on which data is recorded in the sequential recording mode.

On the optical disk 1, 4 SRRs, i.e., SRR #1 to SRR #4, exist. SRR #1, SRR #3 and SRR #4 are each an open SRR while SRR #2 is a closed SRR.

Thus, additional data can be incrementally recorded onto the optical disk 1 at either of the next writable addresses NWA1, NWA3 and NWA4 of SRR #1, SRR #3 and SRR #4 respectively.

A TDMS update unit described above is incrementally recorded to store additional SRRI as information for managing such SRRs.

FIG. 12 is a diagram showing the structure of SRRI.

As shown in the figure, SRRI has a size in the range 1 to 31 data frames.

A relative data frame number in the structure shown in FIG. 12 is a number identifying a data frame in the cluster. As described earlier, the SRRI is placed in a TDMS update unit at a location immediately preceding the TDDS recorded in the last data frame 31 of the unit. Let us assume for example that the SRRI has a size of M sectors. In this case, the SRRI is placed at data frames (31-M) to 30. A byte position in a data frame is the position of a byte in the data frame.

64 bytes starting with the byte at the beginning of the SRRI are used as an SRRI header for describing management information of the SRRI.

The SRRI management information included in the SRRI header includes information indicating that the cluster is the cluster of SRRI, a version number, an SRRI-updating count (or an SRRI-recording/updating count) and an entry count indicating the total number of SRR entries, which are each a block of SRR information, in the SRRI.

Bytes at byte position 64 and subsequent byte positions are used for storing a list of SRR entries. The list of SRR entries includes a plurality of SRR information blocks, which each have a size of 8 bytes. If N information blocks are included in the list of SRR entries, the size of the list is thus N×8 bytes.

The temporary list of SRR entries is immediately followed by an SRRI list terminator also having a size of 8 bytes. An area following the SRRI list terminator up to the end of the cluster is filled up with data of 0.

FIG. 13A is a diagram showing the structure of the SRRI header.

2 bytes at byte positions 0 and 1 are used for recording an SRRI-ID (an SRRI identifier) used as management information of the SRRI.

1 byte at byte position 2 is used for recording an SRRI format expressed as the number of version of the SRRI.

4 bytes at byte positions 4 to 7 are used for recording an SRRI update count representing the number of times the SRRI has been updated so far.

4 bytes at byte positions 12 to 15 are used for recording an SRR entry count representing the total number of SRR entries in the SRRI.

1 byte at byte position 16 is used for recording an open SRR count representing the number of open SRRs each having open status in the SRRI.

Bytes starting with a byte at position 20 are used for recording a list of open SRR numbers as a collection of the numbers of all open SRRs in the SRRI.

FIG. 13B is a diagram showing the structure of the list of open SRR numbers. Each of the open SRR numbers has a size of 2 bytes. Since the list of open SRR numbers can include up to 16 open SRR numbers, the list has a size of 32 bytes. If the number of open SRRs is smaller than 16, an area unoccupied by open SRR numbers as the remaining area of the list is filled up with data of 0. Open SRR numbers on the list are sorted in a decreasing order. When the number of open SRRs increases or decreases, the contents of the list is adjusted accordingly.

Figure 14:
FIG. 14 is an explanatory diagram showing an SRR entry of a disk provided by the embodiment.

Such an SRRI header is followed in the SRRI by the list of SRR entries as shown in FIG. 12. FIG. 14 is a diagram showing the structure of an SRR entry. Symbol i shown in the figure is a number assigned to the SRR entry, which corresponds to an SRR.

An SRR entry of an SRR showing information on the SRR has a size of 8 bytes or 64 bits, which are described as follows.

4 bits b63 to b60 are reserved or undefined bits.

28 bits b59 to b32 are used for recording the start address of SRR #i existing in the user-data area, that is, the PSN of the beginning of the start cluster of SRR #i.

Bit b31 is used for recording a session start bit indicating whether or not the SRR is the initial SRR of a session. To be more specific, bit b31 set at 1 indicates that the SRR is the initial SRR of a session. That is to say, the session is started from this SRR.

3 bits b30 to b28 are reserved or undefined bits.

28 bits b27 to b0 are used for recording the LRA (last recorded address) of SRR #i existing in the user-data area, that is, the PSN of the end of SRRI #i as shown in FIG. 11.

The SRRI including an SRRI header and SRR entries as described above is used for managing every SRR existing in the user-data area, the number of SRRs, the address of each SRR and the LRA of every SRR. In addition, as described above, the NWA (Next Writable Address) of an open SRR can be computed from the LRA (Last Recorded Address) recorded in an SRR entry provided for the SRR.

If it is necessary to update management status of an SRR for example when an SRR is reserved, data is incrementally recorded into an area starting from the NWA of an SRR or an SRR is closed, the SRRI is used to update the status by including the SRRI in an incrementally recorded TDMS update unit.

3-5: Alternate-Address Processing for Format with Alternate Areas

The following description explains basic alternate-address processing for a format including pre-allocated alternate areas in the form of an ISA and/or an OSA as shown in FIG. 1 (a).

Figure 15:
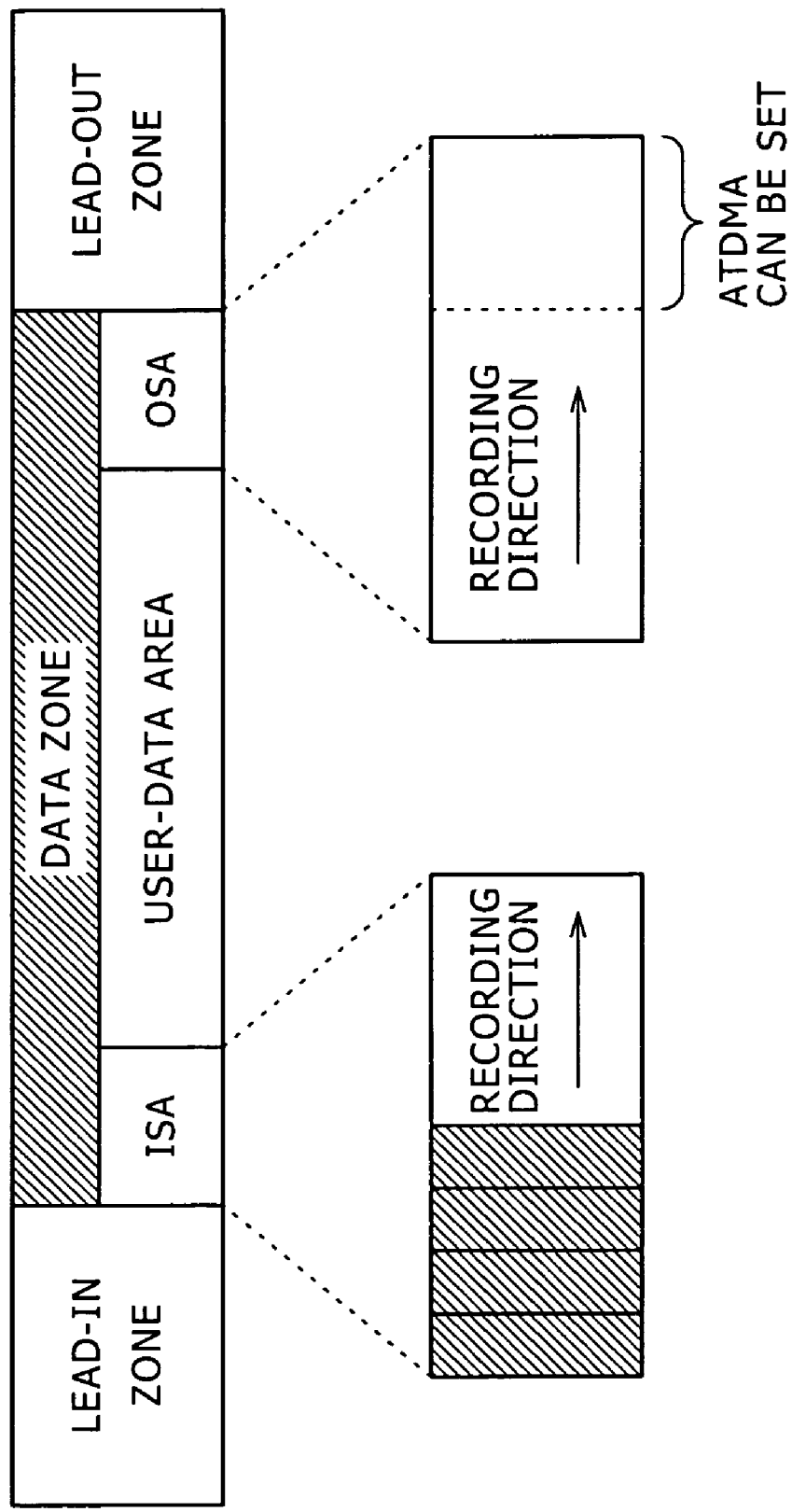
FIG. 15 is an explanatory diagram showing a format including an ISA and an OSA.

As shown in FIG. 15, an ISA (Inner Spare Area) and/or an OSA (Outer Spare Area) are allocated on respectively the inner and outer sides in the data zone as alternate areas used for carrying out alternate-address processing for defective clusters.

In addition, when there is a request for a processing to write data into an already recorded address, that is, a request for a renewal of recorded data, an ISA and/or an OSA are also each used as an alternate area for actually recording data to be written into the target address. An already recorded address is an address at which data has been recorded whereas an unrecorded address is an address at which no data has been recorded.

The sizes of an ISA and an OSA are defined in the DDS and the TDDS, which have been described above.

The size of the ISA is determined at an initialization time and remains unchanged thereafter.

The alternate-address processing using the ISA and the OSA is carried out as follows. A renewal of data is given as an example. Let us assume for example that there is a request for a processing to write data into an already recorded address in a cluster of the user-data area, that is, a request for a renewal of data recorded in the cluster. In this case, since the optical disk 1 is a write-once disk, data cannot be written into such a cluster on the optical disk 1. Thus, the data to be written into an already recorded address is actually recorded in clusters in the ISA or the OSA. The processing to actually record data into an already recorded address is referred to as alternate-address processing.

The alternate-address processing is managed as a DOW entry described above. That is to say, the address of a cluster in which data has been already recorded is cataloged in the DOW entry as an alternate-object original address and the address of a cluster included in the ISA or the OSA as a cluster in which data has actually been written is cataloged in the same DOW entry as an alternate-object replacement address.

That is to say, in the case of a data renewal, data for replacing already recorded data is actually written into the ISA or the OSA and the alternate-object original and replacement locations for the data renewal are managed as a DOW entry recorded on a TDFL in the TDMA. In this way, data recorded on the optical disk 1 can be virtually renewed even though the optical disk 1 is a write-once disk, that is, the processing to renew the data appears realizable to the OS or file system of the host system or the file system or the like.

The alternate-address processing described above can also be carried out also for the purpose of managing a defect. When a defective area is detected on an optical disk, data to be written into the defective area is actually stored into a cluster of an ISA or an OSA in alternate-address processing. Then, for the purpose of alternate-address processing management, one DFL entry is cataloged.

In alternate-address processing, data is actually recorded in clusters of the ISA starting with a cluster at the lowest address in the increasing-address direction. As all the clusters of the ISA are used up, the alternate-address processing is continued to clusters of the OSA as shown in FIG. 15. The ISA and OSA clusters in which data is actually written in alternate-address processing are referred to as alternate-object replacement locations.

By the way, in such a format, a portion or entire area of the OSA can be utilized as an ATDMA (additional TDMA).

It is to be noted that, in the case of this preferred embodiment, in the format including alternate areas as described above, alternate-address processing can be carried out by using the user-data area even after the alternate areas are all used up as will be described later.

3-6: TDMA and ATDMA in Format without Alternate Areas

Figure 16:
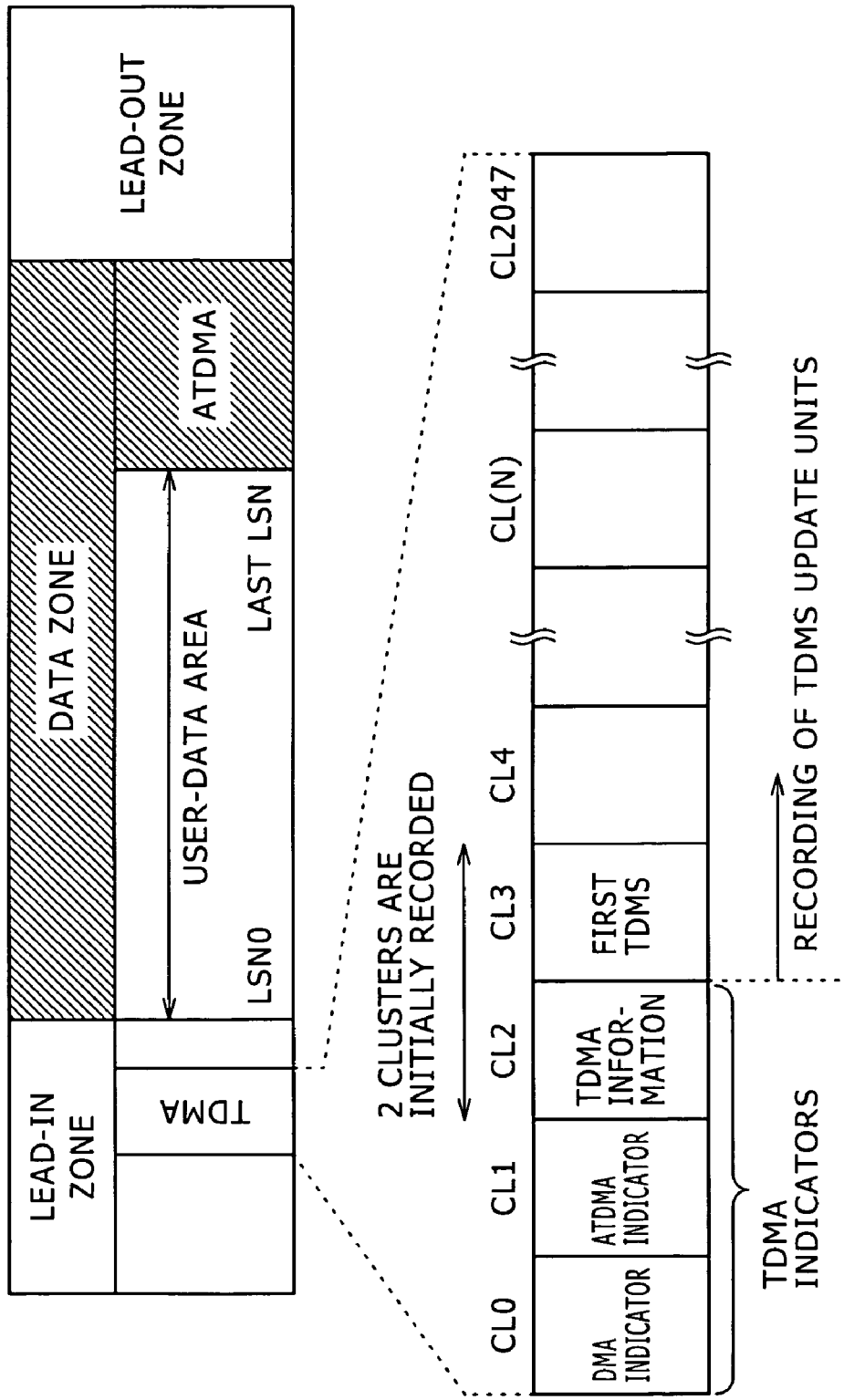
FIG. 16 is an explanatory block diagram showing a format including no alternate areas in accordance with the embodiment.

FIG. 16 is a diagram showing a disk layout including neither ISA nor OSA.

A special format command is used to create a disk including no alternate areas. Since the optical disk 1 does not include an ordinary alternate area, the parameter of this command is set to specify a largest storage capacity to which addresses can be assigned. By explicitly setting the parameter at a value smaller than the maximum storage capacity a little, the function of the disk drive serving as a recording/reproduction apparatus can be extended so as to leave a region at the end of the user-data area as a region with no address assigned thereto. In this embodiment, such a region is referred to as a spare management area usable as an ATDMA.

In the case of a format including alternate areas, as simultaneous TDMA indicators provided at the beginning of the TDMA, 2 clusters CL0 and CL1 are used as shown in FIG. 5. In the case of a format including no alternate areas, on the other hand, another cluster is added to the TDMA indicators to give 3 clusters CL0, CL1 and CL2. Cluster CL2 is referred to as a TDMA information cluster.

In an initial recording processing of the TDMA, first of all, an information block is recorded in cluster CL2 as TDMA information. Then, a first TDMS is recorded in cluster CL3 following the TDMA information block.

As the entire area of the TDMA is used up for recording management information and additional information must be recorded in the ATDMA serving as the continuation of the TDMA, also in cluster CL1 used as an ATDMA indicator, the contents of the TDMA information cluster are recorded.

FIG. 17 is a diagram showing the format of the TDMA information.

As shown in the figure, the TDMA information has a size of 2,048 bytes forming a structure for recording information on the ATDMA.

In cluster CL2 used as a TDMA information cluster in the TDMA, the TDMA information having a size of 2,048 bytes (=1 data frame) is recorded repeatedly 32 times.

The basic structure of the TDMA information is the same as that of the TDDS, which is shown in FIG. 8 and similar to the DDS shown in FIG. 4. It is necessary, however, to set some parameters at values different from the actual parameters of the TDDS. That is to say, in the case of the TDMA information, some of the parameters are set as follows.

4 bytes starting with a byte at position 40 as bytes to be used for recording the size of the ISA (Inner Spare Area) are set at 0.

4 bytes starting with a byte at position 44 as bytes to be used for recording the size of the OSA (Outer Spare Area) are set actually at a value obtained as a result of dividing the ATDMA size expressed in terms cluster units by 256.

4 bytes starting with a byte at position 1040 as bytes to be used for recording the size of the TDMA in the OSA are set at the ATDMA size expressed in terms of cluster units.

By providing cluster CL2 as a TDMA information cluster used for recording such TDMA information as described above, the recording/reproduction apparatus is capable of reading the TDMA information cluster when checking a disk mounted on the apparatus in order to determine whether or not an ATDMA exists on the optical disk 1 and knowing the size of the ATDMA if the ATDMA exists thereon.

4: Configuration of the Disk Drive

The following description explains a recording/reproduction apparatus serving as a disk drive for the write-once optical disks described above.

The disk drive provided by the embodiment is capable of forming a layout of a write-once optical disk in a state explained earlier by referring to FIGS. 1 (a) and 1 (b) by formatting the optical disk 1 in a state wherein, typically, only the prerecorded information area PIC shown in FIG. 1 has been created but no write-once area has been formed. In addition, the disk drive records data into the user-data area of the optical disk 1 formatted in this way and reproduces data from the user-data area. If necessary, the disk drives also updates a TDMA or an ATDMA.

Figure 18:
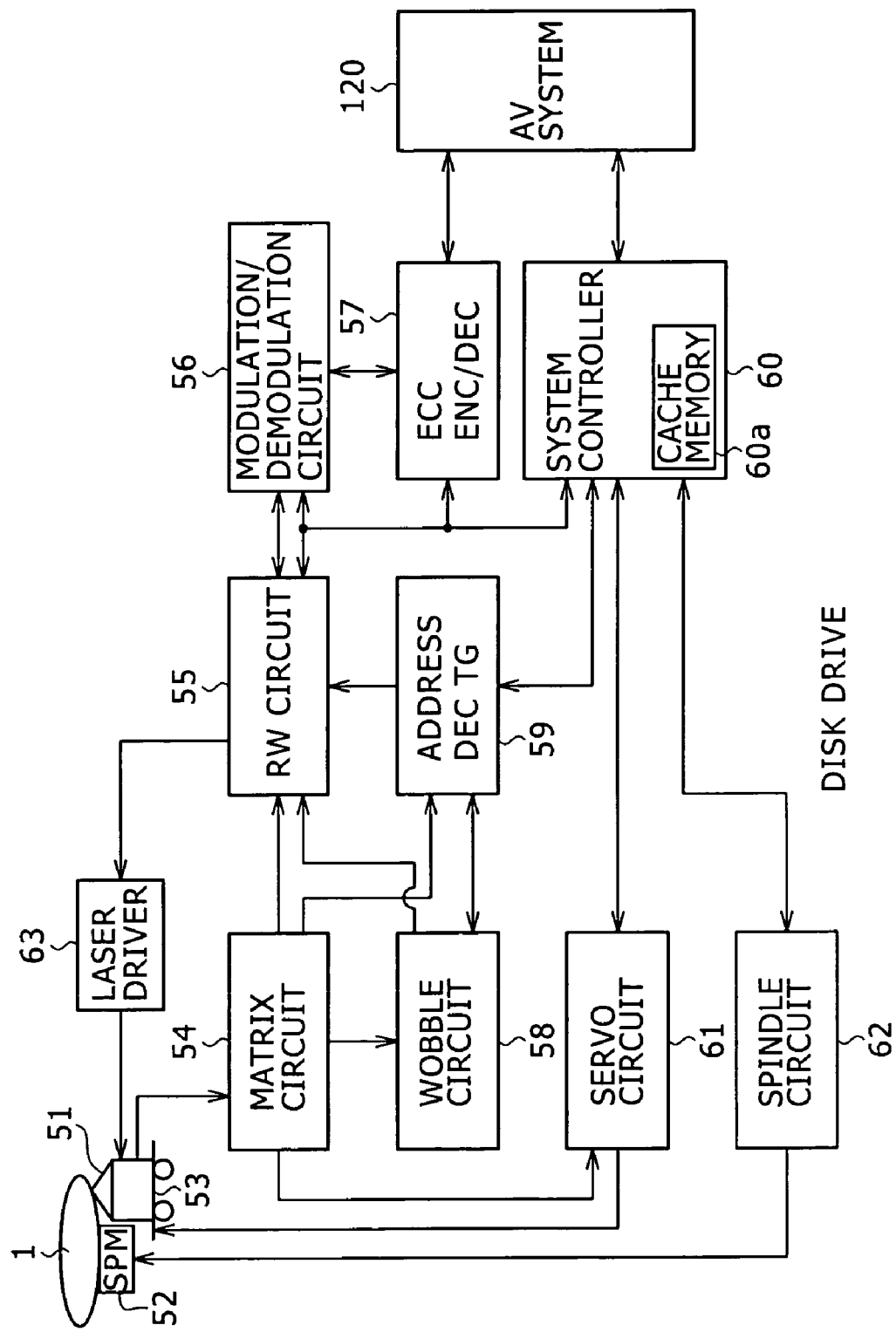
FIG. 18 is a block diagram showing a disk drive according to the embodiment.

FIG. 18 is a diagram showing the configuration of the disk drive.

A disk 1 is the write-once optical disk described above. The optical disk 1 is mounted on a turntable not shown in the figure. In a recording/reproduction processing, the turntable is driven into rotation at a CLV (constant linear velocity) by a spindle motor 52.

An optical pickup (optical head) 51 reads out ADIP addresses embedded on the optical disk 1 as a wobbling shape of a groove track and management/control information as information prerecorded on the optical disk 1.

At an initialization/formatting time or in a processing to record user data onto the optical disk 1, the optical pickup 51 records management/control information and user data onto a track in a write-once area. In a reproduction processing, on the other hand, the optical pickup 51 reads out data recorded on the optical disk 1.

The optical pickup 51 includes a laser diode, a photo detector, an objective lens and an optical system, which are not shown in the figure. The laser diode is a device serving as a source for generating a laser beam. The photo detector is a component for detecting a beam reflected by the optical disk 1. The objective lens is a component serving as an output terminal of the laser beam. The optical system is a component for radiating the laser beam to a recording face of the optical disk 1 by way of the objective lens and leading the reflected beam to the photo detector.

In the optical pickup 51, the objective lens is held by a biaxial mechanism in such a way that the mechanism is capable of moving the objective lens in tracking and focus directions.

In addition, the entire optical pickup 51 can be moved in the radial direction of the optical disk 1 by a thread mechanism 53.

The laser diode included in the optical pickup 51 is driven to emit a laser beam by a drive current generated by a laser driver 63 as a drive signal.

The photo detector employed in the optical pickup 51 detects information conveyed by a beam reflected by the optical disk 1, converts the detected information into an electrical signal proportional to the light intensity of the reflected beam and supplies the electrical signal to a matrix circuit 54.

The matrix circuit 54 has a current/voltage conversion circuit, which is used for converting a current output by the photo detector including a plurality of light-sensitive devices into a voltage, and a matrix processing/amplification circuit for carrying out matrix processing to generate necessary signals. The necessary signals include a high-frequency signal (or a reproduced-data signal) representing reproduced data as well as a focus error signal and a tracking error signal, which are used for servo control.

In addition, a push-pull signal is also generated as a signal related to wobbling of the groove. The signal related to wobbling of the groove is a signal for detecting the wobbling of the groove.

It is to be noted that the matrix circuit 54 may be physically integrated inside the optical pickup 51.

The reproduced-data signal output by the matrix circuit 54 is supplied to a reader/writer circuit 55. The focus error signal and the tracking error signal, which are also generated by the matrix circuit 54, are supplied to a servo circuit 61. The push-pull signal generated by the matrix circuit 54 is supplied to a wobble circuit 58.

The reader/writer circuit 55 is a circuit for carrying out processing such as a binary conversion process on the reproduced-data signal and a process to generate a reproduction clock signal by adopting a PLL technique to generate data read out by the optical pickup 51. The generated data is then supplied to a modulation/demodulation circuit 56.

The modulation/demodulation circuit 56 includes a functional member serving as a decoder in a reproduction process and a functional member serving as an encoder in a recording process.

In a reproduction process, the modulation/demodulation circuit 56 implements demodulation process for run-length limited code as decoding process on the basis of the reproduction clock signal.

An ECC encoder/decoder 57 is a component for carrying out an ECC encoding process to add error correction codes to data to be recorded onto the optical disk 1 and an ECC decoding process for correcting errors included in data reproduced from the optical disk 1.

At a reproduction time, data demodulated by the modulation/demodulation circuit 56 is stored in an internal memory to be subjected to error detection/correction processing and processing such as a de-interleave process to generate the eventual reproduced data.

The reproduced data obtained as a result of a decoding process carried out by the ECC encoder/decoder 57 is read out from the internal memory and transferred to an apparatus connected to the disk drive in accordance with a command given by a system controller 60; An example of the apparatus connected to the disk drive is an AV (Audio-Visual) system 120.

As described above, the push-pull signal output by the matrix circuit 54 as a signal related to the wobbling state of the groove is processed in the wobble circuit 58. The push-pull signal conveying ADIP information is demodulated in the wobble circuit 58 into a data stream composing ADIP addresses. The wobble circuit 58 then supplies the data stream to an address decoder 59.

The address decoder 59 decodes the data received thereby to generate addresses and then supplies the addresses to the system controller 60.

The address decoder 59 also generates a clock signal by carrying out a PLL process using the wobble signal supplied by the wobble circuit 58 and supplies the clock signal to other components for example as a recording-time encode clock signal.

The push-pull signal output by the matrix circuit 54 as a signal related to the wobbling state of the groove is a signal originated from the prerecorded information PIC. In the wobble circuit 58, the push-pull signal is subjected to a band-pass filter process before being supplied to the reader/writer circuit 55, which carries out a binary conversion process to generate a data bit stream. The data bit stream is then supplied to the ECC encoder/decoder 57 for carrying out ECC-decode and de-interleave processes to extract data representing the prerecorded information. The extracted prerecorded information is then supplied to the system controller 60.

On the basis of the read out prerecorded information, the system controller 60 is capable of carrying out processes such as processing to set a variety of processings and copy protect processing.

At a recording time, data to be recorded is received from the AV system 120. The data to be recorded is buffered in a memory employed in the ECC encoder/decoder 57.

In this case, the ECC encoder/decoder 57 carries out processes on the buffered data to be recorded. The processes include processing to add error correction codes, interleave processing and processing to add sub-codes.

The data completing the ECC encoding process is subjected to a demodulation process such as demodulation adopting an RLL (1-7) PP method in the modulation/demodulation circuit 56 before being supplied to the reader/writer circuit 55.

In these encoding processes carried out at a recording time, the clock signal generated from the wobble signal as described above is used as the encoding clock signal, which serves as a reference signal.

After completing these encoding processes, the data to be recorded is supplied to the reader/writer circuit 55 to be subjected to recording compensation processing such as fine adjustment of a recording power to produce a power value optimum for factors including characteristics of the recording layer, the spot shape of the laser beam and the recording linear speed as well as adjustment of the shape of the laser drive pulse. After completing the recording compensation processing, the data to be recorded is supplied to the laser driver 63 as laser drive pulses.

The laser driver 63 passes on the laser drive pulses to the laser diode employed in the optical pickup 51 to drive the generation of a laser beam from the diode. In this way, pits suitable for the recorded data are created on the optical disk 1.

It is to be noted that the laser driver 63 includes the so-called APC (Auto Power Control) circuit for controlling the laser output to a fixed value independent of ambient conditions such as the ambient temperature by monitoring the laser output power. A detector is provided in the optical pickup 51 to serve as a monitor for monitoring the laser output power. The system controller 60 gives a target value of the laser output power for each of recording and reproduction processes. The level of the laser output is controlled to the target value for the recording or reproduction process.

The servo circuit 61 generates a variety of servo drive signals from the focus error signal and the tracking error signal, which are received from the matrix circuit 54, to carry out servo processings. The servo drive signals include focus, tracking and thread servo drive signals.

To put it concretely, the focus and tracking drive signals are generated in accordance with the focus error signal and the tracking error signal respectively to drive respectively focus and tracking coils of the biaxial mechanism employed in the optical pickup 51. Thus, tracking and focus servo loops are created as loops including the optical pickup 51, the matrix circuit 54, the servo circuit 61 and the biaxial mechanism.

In addition, in accordance with a track jump command received from the system controller 60, the servo circuit 61 turns off the tracking servo loop and carries out a track jump processing by outputting a jump drive signal.

On top of that, the servo circuit 61 generates a thread drive signal on the basis of a thread error signal and an access execution control signal, which is received from the system controller 60, to drive the thread mechanism 53. The thread error signal is obtained as a low-frequency component of the tracking error signal. The thread mechanism 53 has a mechanism including a transmission gear, a thread motor and a main shaft for holding the optical pickup 51. The thread mechanism 53 drives the thread motor in accordance with the thread drive signal to slide the optical pickup 51 by a required distance. It is to be noted that the mechanism itself is not shown in the figure.

A spindle servo circuit 62 controls the spindle motor 52 to rotate at a CLV.

The spindle servo circuit 62 obtains a clock signal generated in a PLL process for the wobble signal as information on the present rotational speed of the spindle motor 52 and compares the present rotational speed with a predetermined CLV reference speed to generate a spindle error signal.

In addition, a reproduction clock signal generated at a data reproduction time by a PLL circuit employed in the reader/writer circuit 55 is used as the reference clock signal of a decoding process as well as the information on the present rotational speed of the spindle motor 52. Thus, by including this reproduction clock signal with the predetermined CLV reference speed, a spindle error signal can be generated.

Then, the spindle servo circuit 62 outputs the spindle drive signal, which is generated in accordance with the spindle error signal, to carry out the CLV rotation of the spindle motor 62.

In addition, the spindle servo circuit 62 also generates a spindle drive signal in accordance with a spindle kick/brake control signal received from the system controller 60 to carry out processings to start, stop, accelerate and decelerate the spindle motor 52.

A variety of processings carried out by the servo system and the recording/reproduction system as described above are controlled by the system controller 60 based on a microcomputer.

The system controller 60 carries out various kinds of processing in accordance with commands received from the AV system 120.

When a write instruction (or a command to write data) is received from the AV system 120, for example, the system controller 60 first of all moves the optical pickup 51 to an address into which the data is to be written. Then, the ECC encoder/decoder 57 and the modulation/demodulation circuit 56 carry out the encoding processes described above on the data received from the AV system 120. Examples of the data are video and audio data generated in accordance with a variety of methods such as MPEG2. Subsequently, as described above, the reader/writer circuit 55 supplies laser drive pulses representing the data to the laser driver 63 in order to actually record the data on the optical disk 1.

On the other hand, when a read command to read out data such as MPEG2 video data from the optical disk 1 is received from the AV system 120, for example, the system controller 60 first of all carries out a seek processing to move the optical pickup 51 to a target address at which the data is to be read out from the optical disk 1. That is to say, the system controller 60 outputs a seek command to the servo circuit 61 to drive the optical pickup 51 to make an access to a target address specified in the seek command.

Thereafter, necessary control of processings is executed to transfer data of a specified segment to the AV system 120. That is to say, the data is read out from the optical disk 1, processing such as the decoding and buffering processes is carried out in the reader/writer circuit 55, the modulation/demodulation circuit and the ECC encoder/decoder 57, and the requested data is transferred to the AV system 120.

It is to be noted that, in the processings to record data into the optical disk 1 and reproduce data from the optical disk 1, the system controller 60 is capable of controlling accesses to the optical disk 1 and the recording/reproduction processings by using ADIP addresses detected by the wobble circuit 58 and the address decoder 59.

In addition, at predetermined points of time such as the time the optical disk 1 is mounted on the disk drive, the system controller 60 reads out a unique ID from the BCA on the optical disk 1 in case the BCA exists on the optical disk 1 and prerecorded information (PIC) recorded on the optical disk 1 as a wobbling groove from the reproduction-only area.

In this case, control of seek processings is executed with the BCA and the prerecorded data zone PR set as targets of the seek processings. That is to say, commands are issued to the servo circuit 61 to make accesses by using the optical pickup 51 to the innermost-circumference side of the optical disk 1.

Later on, the optical pickup 51 is driven to carry out reproduction tracing to obtain a push-pull signal as information conveyed by a reflected beam. Then, decoding processes are carried out in the wobble circuit 58, reader/writer circuit 55 and ECC encoder/decoder 57 to generate BCA information and prerecorded information as reproduced data.

On the basis of the BCA information and the prerecorded information, which are read out from the optical disk 1 as described above, the system controller 60 carries out processing such as a process to set laser powers and a copy protect process.

In the configuration shown in FIG. 18, a cache memory 60*a* is employed in the system controller 60. The cache memory 60*a* is used for holding information such a TDDS, a TDFL and/or SRRI, which are read out from the TDMA recorded on the optical disk 1, so that the information can be updated without making an access to the optical disk 1.

When the optical disk 1 not finalized yet is mounted on the disk drive, for example, the system controller 60 controls components of the disk drive to read out a TDDS, a TDFL and/or SRRI from the TDMA recorded on the optical disk 1 and store them in the cache memory 60*a*.

Later on, when an alternate-address process is carried out to renew and/or write data or due to a detected defect, SRRI and/or TDFL stored in the cache memory 60*a* are updated.

Every time an alternate-address process is carried out to write or renew data in the optical disk 1 and the SRRI and the TDFL is updated, for example, a TDMS update unit can be incrementally cataloged in the TDMA or ATDMA recorded on the optical disk 1. By doing so, however, the TDMA recorded on the optical disk 1 will be used up at an early time.

In order to solve this problem, there is adopted a method whereby, when the LRA (Last Recorded Address) serving as an address of SRRI is updated after data is incrementally recorded, for example, the SRRI stored in the cache memory 60*a* is updated up to a certain number of times and, at a certain point of time after that, the updated SRRI stored in the cache memory 60*a* is recorded on the optical disk 1 by cataloging a TDMS update unit.

In addition, there is also a conceivable method whereby the SRRI stored in the cache memory 60*a* is updated as many times as required till typically the optical disk 1 is ejected from the disk drive and, as the optical disk 1 is ejected from the disk drive, for example, the most recent SRRI and/or TDFL stored in the cache memory 60*a* are transferred to the TDMA on the optical disk 1.

By the way, the typical configuration of the disk drive shown in FIG. 18 is the configuration of a disk drive connected to the AV system 120. However, the disk drive provided by the present invention can be connected to an apparatus such as a personal computer.

In addition, the disk drive may be designed into a configuration that cannot be connected to an apparatus. In this case, unlike the configuration shown in FIG. 18, the disk drive includes an operation unit and a display unit or an interface member for inputting and outputting data. That is to say, data is recorded onto a disk and reproduced from the optical disk 1 in accordance with an operation carried out by the user, and a terminal is required as a terminal for inputting and outputting the data.

Of course, other typical configurations are conceivable. For example, the disk drive can be designed as a recording-only apparatus or a reproduction-only apparatus.

5: Data Recording/Reproduction Processings without Alternate Areas

5-1: First Example of Data-Writing Processing

Figure 19:
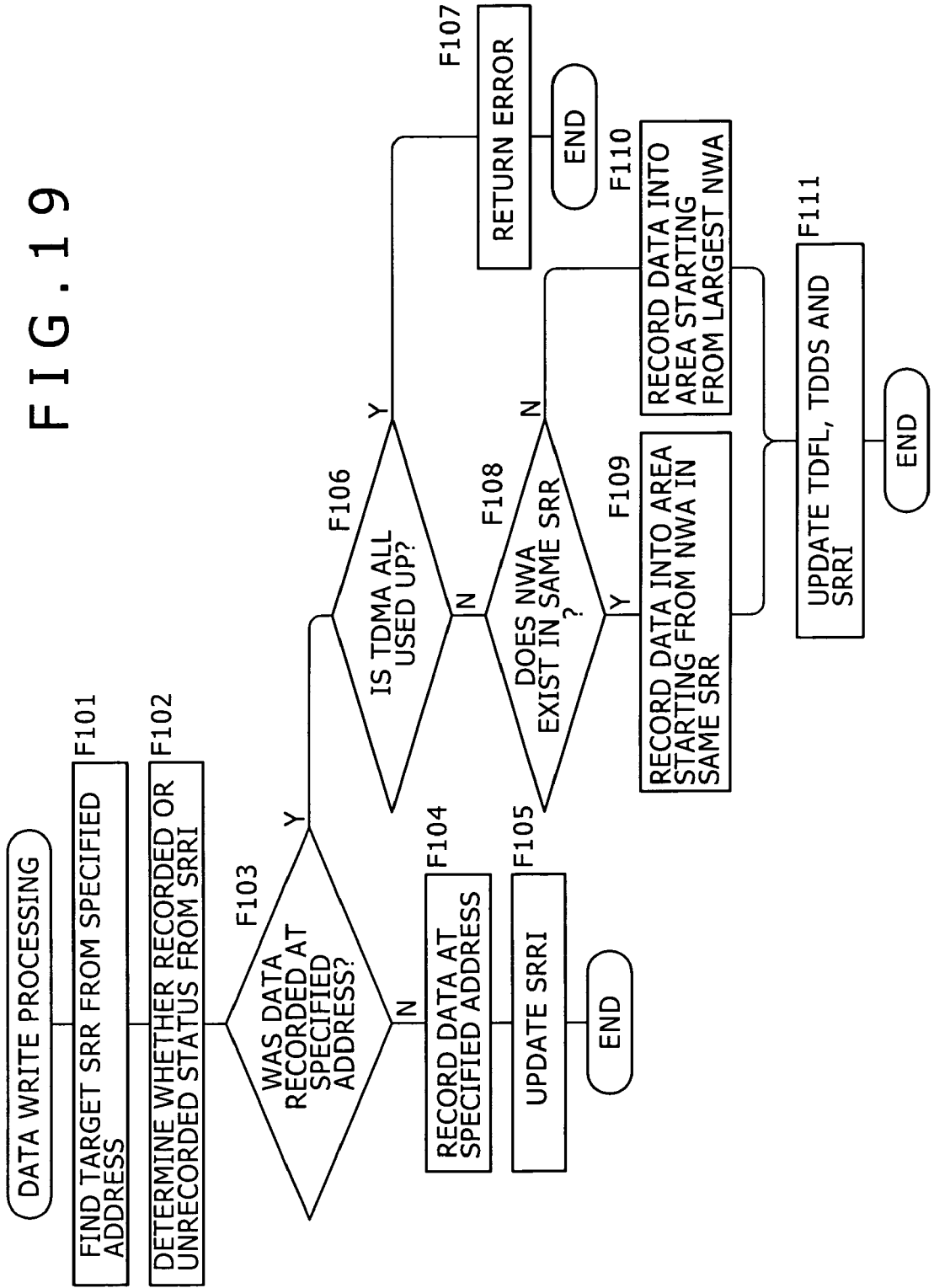
FIG. 19 shows a flowchart representing first typical processing to write data onto a disk with a format including no alternate areas in accordance with the embodiment.

By referring to flowcharts shown in FIG. 19, the following description explains processing carried out by the system controller 60 employed in the disk drive in a process to record data onto the optical disk 1 formatted to include no alternate areas as shown in FIG. 1 (b).

It is to be noted that, at the time the data-writing processing explained below is carried out, the optical disk 1 has already been mounted on the disk drive, and a TDDS, a TDFL as well as SRRI have been transferred from a TDMA on the optical disk 1 mounted on the disk drive to the cache memory 60a.

In addition, when a request for a write processing or a read processing is received from a host apparatus such as the AV system 120, the target address is specified in the request as a logical sector address (or an LSN). The disk drive carries out logical/physical address conversion processing to convert the logical sector address into a physical sector address (or a PSN).

It is to be noted that, in order to convert a logical sector address specified by a host into a physical sector address, it is necessary to add 'the physical address of the first sector in a user-data area' recorded in the TDDS to the logical sector address.

Data is recorded onto the optical disk 1 in cluster units.

Assume that a request to write data into address N (or a logical sector address N where N is a multiple of 32) has been received from a host apparatus such as the AV system 120 by the system controller 60.

In this case, the system controller 60 starts processing represented by the flowchart shown in FIG. 19. First of all, at steps F101 and F102, SRRI stored in the cache memory 60a or SRRI most recently updated in the cache memory 60a is referred to in order to produce a result of determination whether or not data has been recorded in a cluster at the specified address.

That is to say, in a process carried out at a step F101, SRR entries in the SRRI are examined to find an SRRI entry of an SRR including the specified address.

To put it concretely, first of all, the logical sector address N specified by the host apparatus is converted into a physical sector address N'. Then, the physical sector address N' is collated with addresses recorded in each SRR entry to acquire the SRR number assigned to the SRR entry with recorded addresses corresponding to the physical sector address N'.

Then, in a process carried out at the next step F102, the address specified in the request for a write processing is compared with the LRA of the SRR identified by the acquired number assigned to the SRR entry in order to generate a result of determination as to whether or not the address specified in the request for a write processing is an already recorded address in a process carried out at the next step F103. That is to say, the address specified in the request is compared with the LRA of the SRR of the SRR entry to generate a result of determination as to whether or not the physical sector address N' is smaller than the NWA of the SRR. If the result of the determination indicates that the physical sector address N' is smaller than the NWA of the SRR, the physical sector address N' is determined to be an already recorded address. As described earlier, the NWA of an SRR can be derived from the LRA of the SRR described by the SRR entry.

If the result of the determination indicates that the physical sector address N' equal to the NWA of the SRR, the physical sector address N' is determined to be not an already recorded address. Since the NWA of the SRR is a postscript-recording point, in this case, the flow of the processing goes on from the step F103 to a step F104 at which data is written into the physical sector address N'.

That is to say, in this case, the address specified in a write command to carry out a data-writing processing is not an already recorded address. Thus, the data-writing processing is carried out normally. If an error is generated in the data-writing processing due to an injury inflicted on the optical disk 1 or any other cause, however, alternate-address processing may be carried out instead.

First of all, in a process carried out at the step F104, the system controller 60 executes control to write data onto the optical disk 1. To put it concretely, the system controller 60 moves the pickup 51 to the specified address to make an access to the address and record the data to be written onto the optical disk 1 in accordance with the data write request at the address.

If the data-writing processing is completed normally, the processing goes on from the step F104 to a step F105 at which the SRRI stored in the cache memory 60a is updated to reflect the postscript recording of the data into the SRR. Then, if necessary, that is, if there is an opportunity to update the SRRI recorded on the optical disk 1, the SRRI recorded on the optical disk 1 is also updated. That is to say, a TDMS update unit is recorded on the optical disk 1.

Finally, the processing carried out for the write request is ended.

It is to be noted that if the physical sector address N' specified in the write request is greater than the NWA of the SRR, an illegal parameter error is transmitted to the apparatus making the write request. However, the flowchart shown in FIG. 19 does not shows the case in which the physical sector address N' specified in the write request is greater than the NWA of the SRR.

If the determination result produced in the process carried out at the step F103 indicates that the address specified in the request for a write processing is an already recorded address, the data to be written onto the optical disk 1 in accordance with the data write request cannot be written into the specified address. In this case, the flow of the processing goes on to a step F106.

First of all, in a process carried out at the step F106, the TDMA including the ATDMA is examined to produce a result of determination as to whether or not the TDMA (and the ATDMA) have been all used up for recording information. If there is no more valid and free area in the TDMA including the ATDMA, alternate-address management can no longer be executed. In this case, the flow of the processing goes on to a step F107 at which an error message is transmitted to the apparatus making the data write request in response to the request.

If there is still a valid and free area in the TDMA including the ATDMA, on the other hand, processes to renew data stored the optical disk 1 are carried out at a step F108 and subsequent steps.

First of all, in a process carried out at the step F108, the SRR is examined to produce a result of determination as to whether or not an NWA exists in the SRR. The examined SRR is the SRR found in the process carried out at the step F101, that is, the SRR including the alternate-object original address. As described above, an SRR including no NWA is an already closed SRR. That is to say, the SRR is examined to produce a result of determination as to whether or not the target SRR is a still open SRR. Such a result of determination can be produced by referring to information described in the SRRI header.

If the result of determination indicates that the target SRR is a still open SRR, the flow of the processing goes on to a step F109 at which the data to be written onto the optical disk 1 in accordance with the data write request is written into an area starting from the NWA of the SRR.

Then, the flow of the processing goes on to a step F111 at which a necessary update process is carried out.

That is to say, since the processing to write the data onto the optical disk 1 is an processing to renew data already recorded on the optical disk 1, alternate-address processing needs to be carried out for the renewal processing. Thus, a new DOW entry must be generated and cataloged on the TDFL. The new DOW entry includes the physical sector address N', which is indirectly specified in the data write request, as an alternate-object original address because the physical sector address N' is an already recorded address, and the NWA, which has been used as the target of the data-recording process carried out at the step F109, as an alternate-object replacement address.

In addition, since the data to be written onto the optical disk 1 in accordance with the data write request is written into an SRR, the SRR entry of the SRR must also be updated.

Furthermore, since the TDFL and the SRRI are updated, the TDDS needs to be updated.

Thus, in the process carried out at the step F111, first of all, the TDFL, SRRI and TDDS stored in the cache memory 60a are updated. Then, in accordance with the updating of the TDFL, the SRRI and the TDDS, a TDMS update unit is created and incrementally recorded in the TDMA (or the ATDMA) on the optical disk 1.

If the determination result produced at the step F108 indicates that the target SRR is an already closed SRR, on the other hand, the flow of the processing goes on to a step F110. Then, the data to be written onto the optical disk 1 in accordance with the data write request is written into an area starting from the largest one among the NWAs of open SRRs. That is to say, the data to be written onto the optical disk 1 in accordance with the data write request is written into an area starting from the NWA in the rearmost one among open SRRs existing in the user-data area. By the rearmost SRR, an SRR existing at the largest address among the open SRRs is implied.

As the data-recording process is completed, the flow of the processing goes on to a step F111 at which the same update processes as the ones described above are carried out. To put it concretely, first of all, the TDFL, SRRI and TDDS stored in the cache memory 60a are updated. Then, in accordance with the updating of the TDFL, the SRRI and the TDDS, a TDMS update unit is created and incrementally recorded in the TDMA (or the ATDMA) on the optical disk 1.

As described above, the flowchart shown in FIG. 19 represents alternate-address processing carried out in order to renew data in response to a request for processing to write data into an address, which happens to be an already recorded address. It is to be noted, however, that the alternate-address processing may also be carried out in the same way in order to renew data in response to a request for processing to write data into an address, which happens to be an address in a defective area.

Let us assume for example that, even if the address specified in the request for processing to write data onto the optical disk 1 is an address in an unrecorded cluster, which is a cluster without data recorded therein, the cluster is defective, making it impossible to write data therein correctly. In this case, the flow of the processing goes on from the step F103 to the step F106 to carry out the same alternate-address processing at the step F106 and the subsequent steps.

In the case of the alternate-address processing carried out for such a defective cluster, however, the TDFL is updated by cataloging a new DFL entry in the same way as a DOW entry through an incrementally recorded a TDMS update unit.

5-2: Second Example Of Data-Writing Processing

By the way, in a process carried at the step F109 of the flowchart shown in FIG. 19, alternate-address processing involving an area in the SRR including an address specified in the data-writing processing is carried out. Normally, such alternate-address processing does not raise a problem. As a matter of fact, the alternate-address processing may have a merit that a location physically close to the alternate-object original location can be selected as the alternate-object replacement location. Such an alternate-object replacement location provides a benefit in that a seek distance of a later processing to read out data from the alternate-object replacement location can be shortened. For some applications executed in the host apparatus such as the AV system 120, however, an alternate-object replacement location in the same SRR as the alternate-object replacement location may raise a problem in some cases.

First of all, this problem is explained as follows.

FIG. 20 is diagrams each showing open SRR#1 and SRR#2 and an processing to select an NWA in the same SRR as an alternate-object replacement address in order to avoid a defect and renew already recorded data.

In particular, FIG. 20 (a) shows a hatched portion in SRR #1 as a defect in this SRR. Let us assume that, at a certain point of time, address AD0 becomes an NWA, and the host apparatus makes a request for an processing to write data DTa into a cluster at address AD0. In this case, since the cluster starting from address AD0 is a defective cluster, alternate-address processing is carried out. That is to say, data DTa to be written into this defective cluster must be actually written into a cluster range existing in SRR #1 as a cluster range starting from address AD1 as shown in the figure. In this case, the cluster range existing in SRR #1 as a cluster range starting from address AD1 is referred to as the alternate-object replacement area of the alternate-address processing.

After data DTa is written into the cluster range as described above, the NWA is shifted to address AD2. Thus, the LRA (Last Recorded Address) recorded in the SRR entry for SRR #1 as the LRA of SRR #1 is updated.

The disk drive updates the SRRI as described above. In this case, however, some applications executed in the host apparatus may not acquire the most recent NWA. Thus, such an application may issue a write command without knowing that the NWA has been updated to address AD2. In addition, while a write command specifying address AD1 is waiting for a turn to be executed on a command queue in the disk drive, the NWA is updated and such a write command cannot be canceled. In this case, data may be written into an area starting from address AD1.

Let us assume for example that other data DTb is written onto the optical disk 1 after data DTa as shown in FIG. 20 (b). Incorrectly assuming that the present NWA is a result of shifting the NWA from address AD0 coinciding with the previous NWA by a distance corresponding to the size of data DTa to address AD1, the same application writing data DTa this time issues a write command to write other data DTb into clusters starting from address AD1. In this case, the disk drive carries out the processing represented by the flowchart shown in FIG. 19. Since data DTa has been actually written into the clusters starting from address AD1, however, the data-writing processing is carried out as a data renewal process. Thus, data DTb is written into clusters starting from address AD2, which is the true NWA. After the data renewal process, the NWA is updated again to address AD3 and a new DOW entry is generated.

Also in this case, however, the application executed in the host apparatus does not acquire the most recent NWA. Thus, again incorrectly assuming that the present NWA is a result of shifting the NWA from address AD1 coinciding with the previous NWA by a distance corresponding to the size of data DTb to address AD2, the same application this time issues a write command to write other data into clusters starting from address AD2. Thus, address AD2 is specified in the next data request.

Also in this case, the disk drive carries out the data-writing processing as a data renewal process, which requires alternate-address processing. In this alternate-address processing, the other data is written into clusters starting from address AD3, which is the true NWA and, after the data renewal process, a new DOW is generated.

That is to say, some applications may not acquire the most recent NWA before issuing a command to write data into the same SRR as previously written data. When such an application issues a data write command making a request for a data-writing processing, the disk drive actually carries out a data renewal processing in place of the requested data-writing processing, wastefully consuming an area for recording newly generated DOW entries.

Figure 21A:
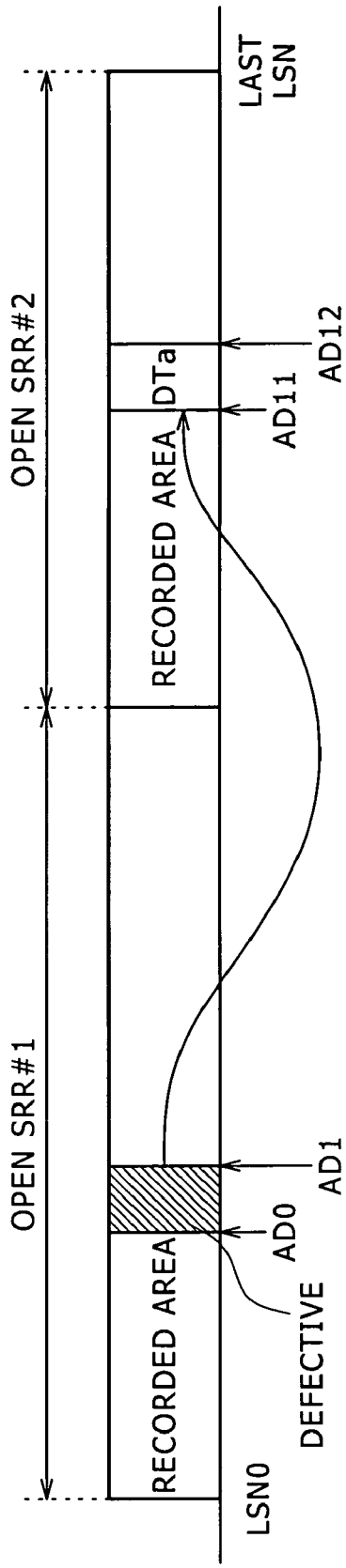
FIGS. 21A and 21B are explanatory diagrams showing a write operation causing no shifted NWAs.
Figure 21B:
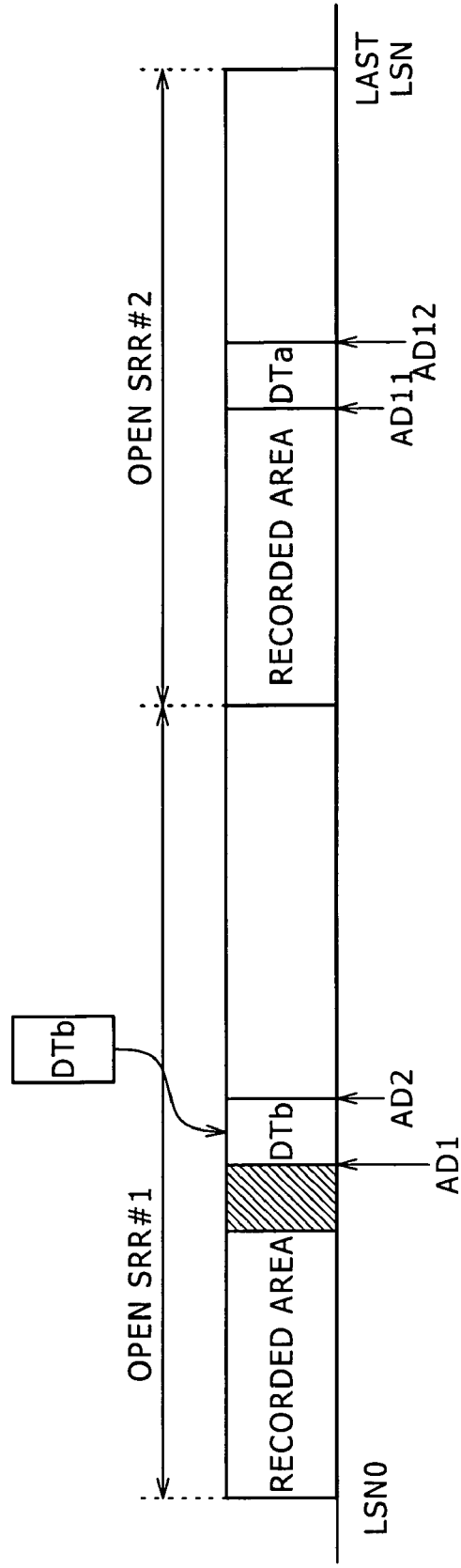
Figure 22:
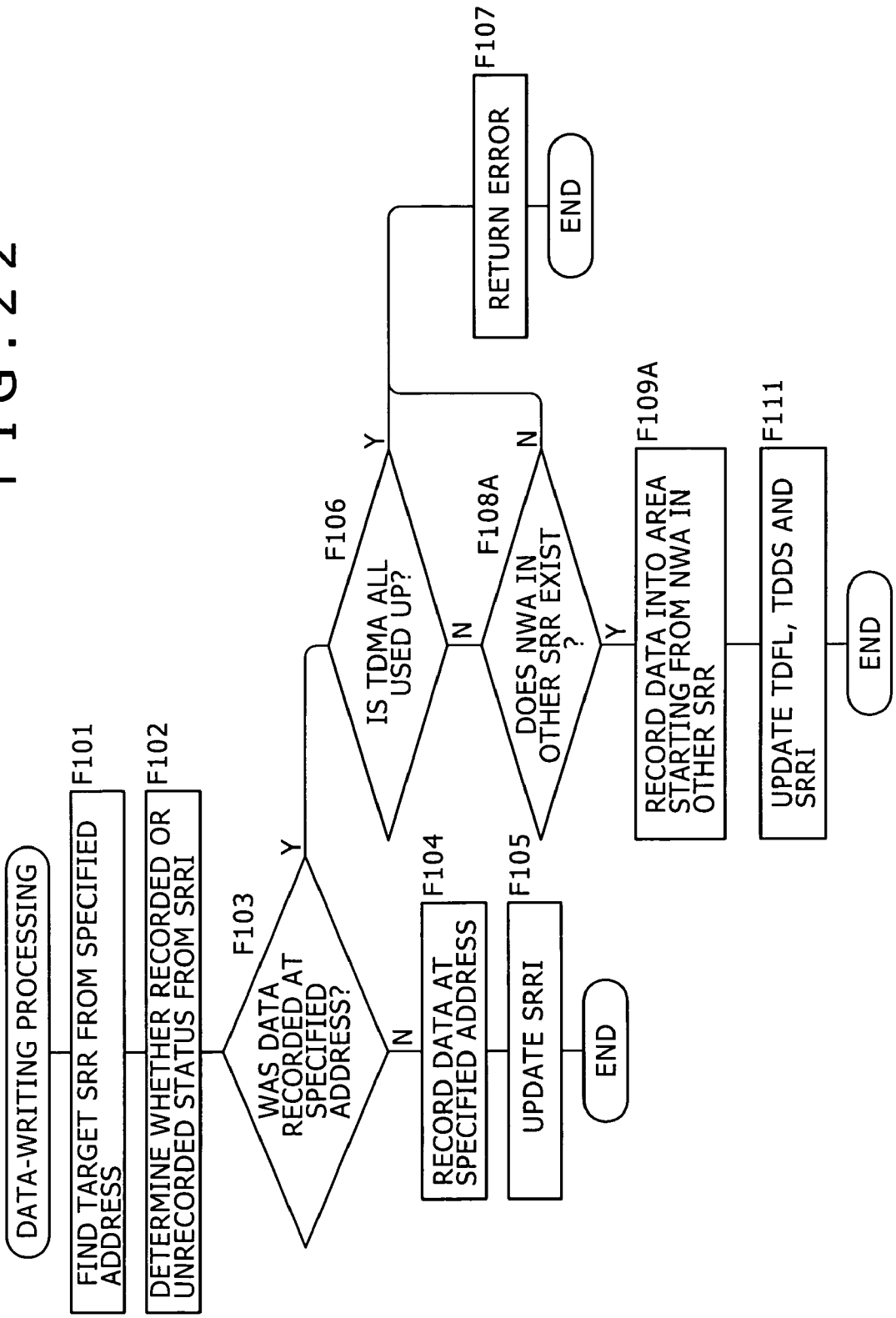
FIG. 22 shows a flowchart representing second typical processing to write data onto a disk with a format including no alternate areas in accordance with the embodiment.

By referring to FIGS. 21A and 21B and 22, the following description explains data-writing processing taking the situation described above into consideration.

FIG. 22 shows a flowchart representing data-writing processing carried out by the system controller 60. Since steps F101 to F107 are identical with those of the flowchart shown in FIG. 19, however, the descriptions of these steps are not repeated.

In the case of the data-writing processing represented by the flowchart shown in FIG. 22, if the address specified in the data write request is an already recorded address and a free area exists in the TDMA or the ATDMA, the flow of the processing goes on to a step F108A in order to carry out alternate-address processing. At this step, the SRRs are examined to produce a result of determination as to whether or not an NWA is included in an SRR different from the SRR including the address specified in the data write request.

It is to be noted that, normally, at least 2 SRRs are in open status. Thus, the determination result produced in the process carried out at the step F108A is hardly a denial. If the SRR including the address specified in the data write request is the only SRR put in open status, however, the determination result produced in the process carried out at the step F108A is a denial. In this case, the flow of the processing goes on to the step F107 at which an error message is transmitted to the application making the data write request before execution of the data-writing processing represented by this flowchart is ended.

If the result of determination confirms that an NWA is included in an SRR different from the SRR including the address specified in the data write request, on the other hand, the flow of the processing goes on to a step F109A at which the data intended in the data write request is written into the other SRR in an area starting from the NWA. That is to say, alternate-address processing using an area in the other SRR is carried out as a data renewal process. Then, at the next step F111, the TDFL and the TDDS are updated in accordance with the alternate-address processing. Subsequently, the SRRI for the contents of the SRR serving as an alternate-object replacement SRR is also updated as well.

In the data-writing processing represented by the flowchart shown in FIG. 22 for a data write request, the address specified in the data write request is an already recorded address and alternate-address processing is thus carried out to renew data already recorded at the address. It is to be noted that alternate-address processing can also be carried out in the same way because the address specified in the data write request is an address in a defective area. Let us assume for example that, even if the address specified in the request for processing to write data onto the optical disk 1 is an address in an unrecorded cluster, the cluster is defective, making it impossible to write data therein correctly. In this case, the flow of the processing goes on from the step F103 to the step F106 to carry out the same alternate-address processing using an area in the other SRR as an interface-object replacement area at the step F106 and the subsequent steps.

FIG. 21 is diagrams each showing the state of data write processings carried out in the data-writing processing described above. Much like FIG. 20, SRR #1 and SRR #2 are each an open SRR.

In FIG. 21A, let us assume that a defective cluster is detected in a hatched portion of SRR #1 and data DTa to be written into this defective cluster is thus subjected to alternate-address processing. If the NWA of another SRR is selected in the alternate-address processing as shown in FIG. 22, as shown in FIG. 21A, data DTa will be written for example at address AD11, which is the NWA of SRR #2 serving as the other SRR. Thus, in the alternate-address processing, data DTa is stored in a cluster range starting at address AD11 and the NWA of SRR #2 is updated to address AD12. Namely, the LRA recorded in an SRR entry for SRR #2 as the LRA of SRR #2 is updated.

In this case, on the other hand, the application correctly assumes that the NWA in SRR #1 has not been updated. If an application makes a request for a processing to write data DTb after DTa onto the optical disk 1 without acquiring the most recent NWA, the application specifies address AD1, which is assumed to be the most recent NWA of SRR #1. Thus, data DTb is written normally in an area starting from AD1 and the NWA of SRR #1 is updated to address AD2.

That is to say, the application does not incorrectly assume an NWA as is the case with the example explained earlier by referring to FIG. 20. It is thus possible to solve the problem caused by generation of unnecessary DOW entries.

It is to be noted that, in this case, the NWA of SRR #2 may be updated without being known by the application. If alternate-address processing is carried out by writing data into an SRR other than the SRR serving as the original target of the data write request, basically, the application correctly infers information on the target SRR in advance. This is because the processing to update the NWA of other SRR #2 does not affect the correct inference carried out by the application as inference of the information on target SRR #1.

5-3: Data-Reading Processing

Figure 23:
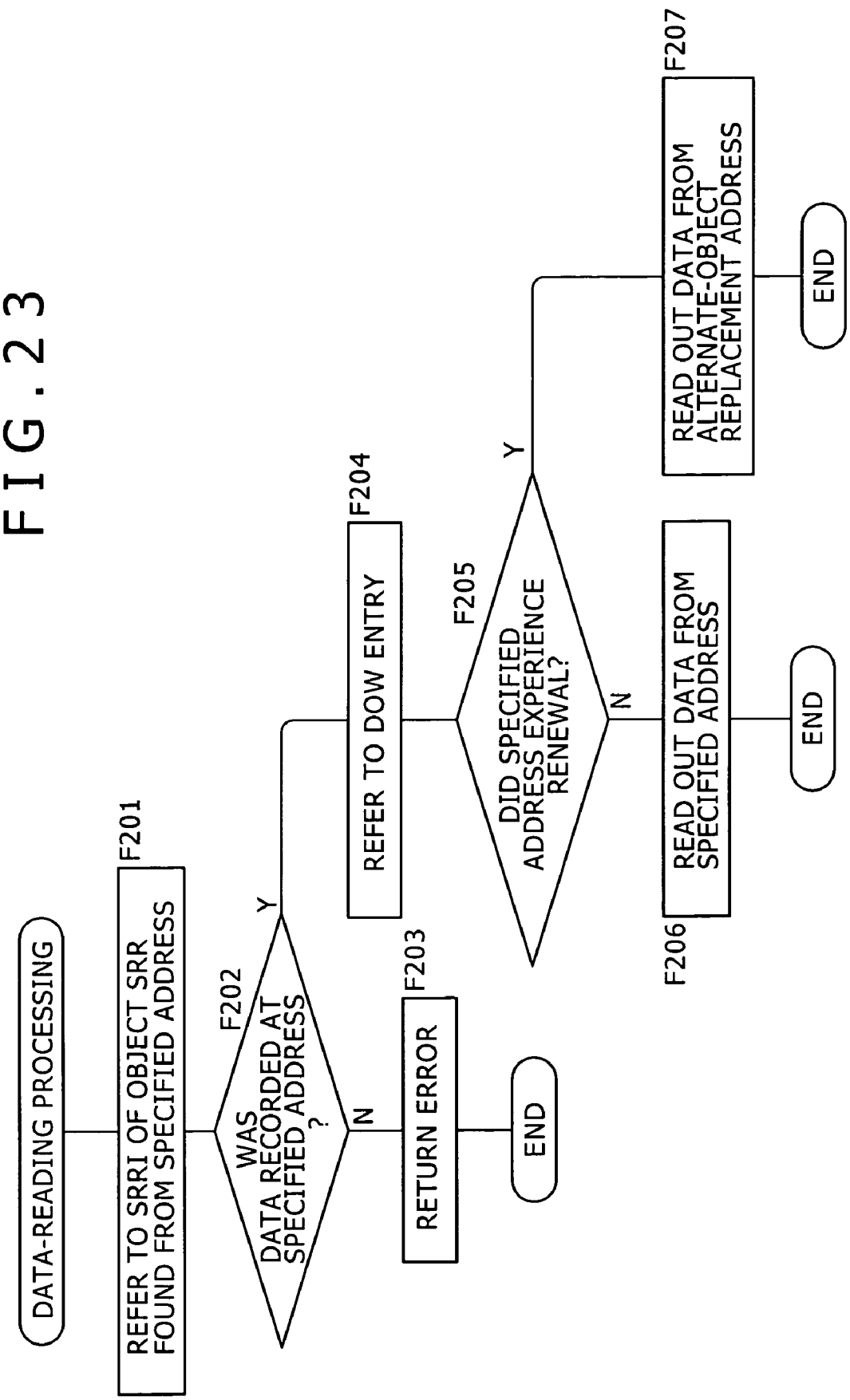
FIG. 23 shows a flowchart representing processing to read out data from a disk provided by the embodiment.

Next, by referring to the flowchart shown in FIG. 23, the following description explains processing carried out by the system controller 60 to reproduce data from the optical disk 1 mounted on the disk drive.

Let us assume that the system controller 60 receives a request for a processing to read out data from an address, which is specified in the request as a logical sector address N, from a host apparatus such as the AV system 120.

At such a request, the system controller 60 starts the processing represented by the flowchart shown in FIG. 23.

As shown in the figure, the flowchart begins with a step F201 at which the system controller 60 refers to the SRRI of the SRR including the logical sector address N specified in the request in order to produce a result of determination as to whether or not the specified address is an already recorded address in a process carried out at the next step F202. To put it concretely, first of all, the logical sector address N specified by the host apparatus is converted into a physical sector address N'. The physical sector address N' can be found in the address conversion by adding the start physical sector address recorded in the TDDS as the start physical sector address of the user-data area to the logical sector address N. Then, from the physical sector address N', an SRR number and an SRR entry identified by the number are acquired. The SRR entry reveals whether or not data has been recorded at the physical sector address N'.

If no data has been recorded at the specified address, the flow of the processing goes on from the step F202 to a step F203 at which an error message is transmitted to the host apparatus to notify the host apparatus that the specified address is an incorrect address.

If data has been recorded at the specified address, on the other hand, the flow of the processing goes on from the step F202 to a step F204 at which the TDFL is searched for a DOW or DFL entry including the specified address as an alternate-object original address in order to produce a result of determination in a process carried out at the next step F205 as a result of determination as to whether or not the specified address is an address completing alternate-address processing.

If the determination result produced in the process carried out at the next step F205 indicates that the specified address is not an address completing alternate-address processing as evidenced by the fact that no DOW and DFL entries include the physical sector address N' as an alternate-object original address, the flow of the processing goes on from the step F205 to a step F206 at which data is read out from the specified address and transferred to the host apparatus such as the AV system 120. Then, the execution of the processing represented by this flowchart is ended.

Thus, data is read out from the user-data area in normal reproduction processing.

If the determination result produced in the process carried out at the next step F205 indicates that the specified address is an address completing alternate-address processing as evidenced by the fact that a DOW or DFL entry includes the physical sector address N' as an alternate-object original address, on the other hand, the flow of the processing goes on from the step F205 to a step F207 at which data is read out from an alternate-object replacement address included in the DOW or DFL entry and transferred to the host apparatus such as the AV system 120. Then, the execution of the processing represented by this flowchart is ended.

Thus, even in the case of a data read request made after data has been renewed as a request for reproduction of the renewed data, by carrying out the processing described above, the most recent data can be reproduced properly and transferred to the host apparatus.

5-4: ATDMA-Checking Processing

Figure 24:
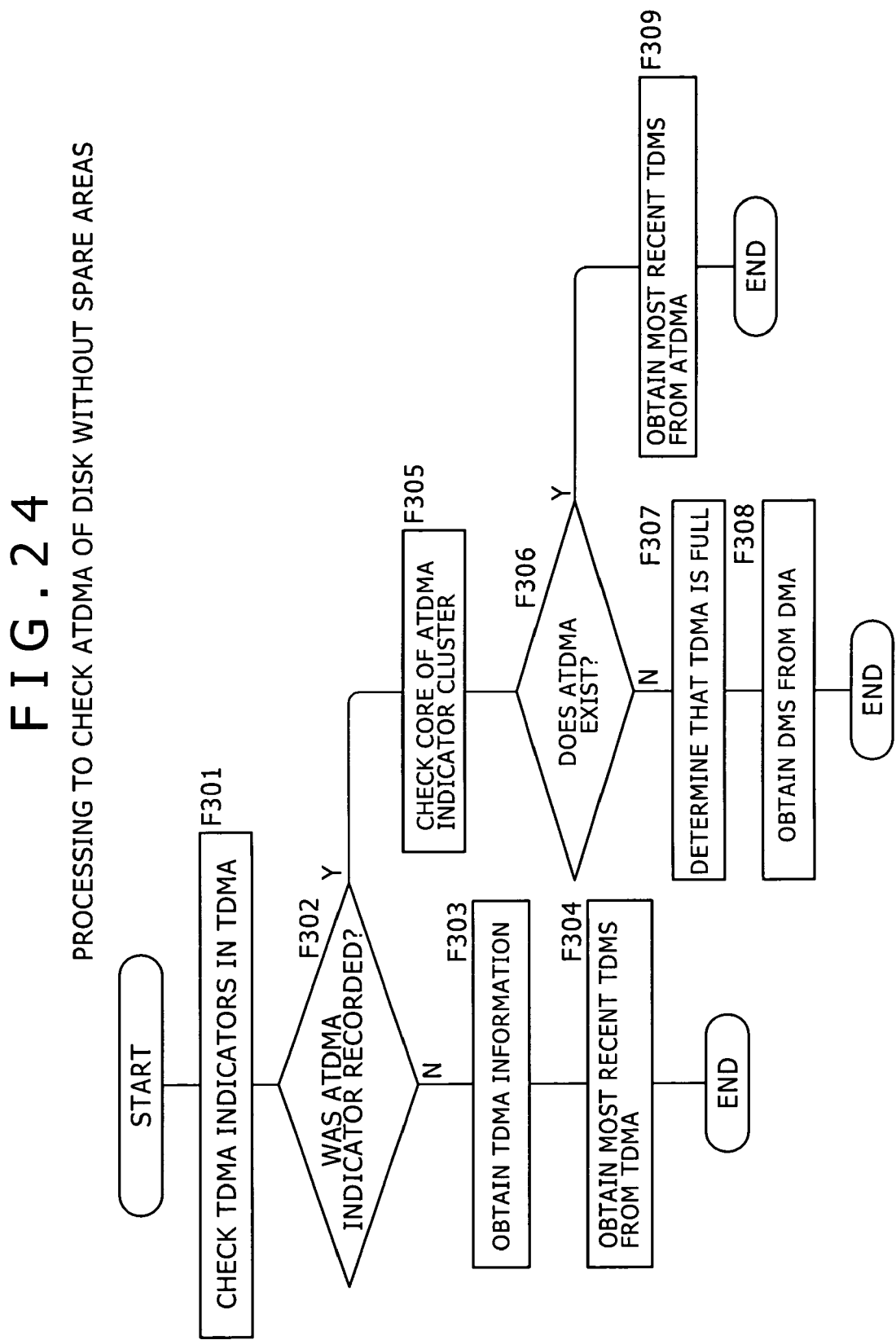
FIG. 24 shows a flowchart representing disk check processing provided by the embodiment.

By referring to a flowchart shown in FIG. 24, the following description explains processing, which is carried out by the system controller 60 to check the existence of the ATDMA when an optical disk 1 having the format shown in FIG. 16 is mounted on the disk driver.

Let us assume that the optical disk 1 having the format including an ATDMA and no alternate area as shown in FIG. 16 has been mounted on the disk drive.

The flowchart shown in FIG. 24 begins with a step F301 at which the system controller 60 reproduces TDMA indicators of the TDMA included in the format shown in FIG. 16 from the optical disk 1 mounted on the disk drive in order to produce a result of determination as to whether or not cluster CL1 contains the ATDMA indicator in a process carried out at the next step F302.

If cluster CL1 does not contain the ATDMA indicator, the flow of the processing goes on from the step F302 to a step F303 at which TDMA information is read from cluster CL2 in order to acquire information on the ATDMA of the optical disk 1 from the TDMA information. The information on the ATDMA is the start position and size of the ATDMA. Then, at the next step F304, the most recent TDMS is obtained from the TDMA.

That is to say, cluster CL1 not containing the ATDMA indicator yet indicates that the most recent TDMS exists in the TDMA and no data has been recorded in the ATDMA yet. Thus, the most recent TDMS is read out from the TDMA. A TDDS, SRRI and TDFL obtained from the most recent TDMS are transferred to the cache memory 60a so that the TDDS, the SRRI and the TDFL can be read out from the cache memory 60a in subsequent recording and reproduction processings.

It is to be noted that a recording/reproduction apparatus may not be capable of reading the TDMA information from cluster CL2. In this case, the existence of the ATDMA cannot be recognized. However, the start position of the ATDMA has a value greater than the value of the last logical address recorded in the TDDS as the last logical address of the user-data area (or the last LSN of the user-data area). In addition, there is no change in relation between a logical address and the physical address corresponding to the logical address and no processings are carried out to read out and write data from and into this portion. Thus, the recording/reproduction compatibility is sustained.

The optical disk 1 may be mounted on a recording/reproduction apparatus not capable of recognizing the ATDMA. In this case, when the TDMA has been updated to its end, the recording/reproduction apparatus is no longer capable of updating the TDMA and hence conceivably carries out processing to close the optical disk 1, that is, processing to inhibit further write processings.

If the determination result produced in the process carried out at the step F302 indicates that an ATDMA indicator has been recorded in cluster CL1, on the other hand, the flow of the processing goes on to a step F305 at which the system controller 60 recognizes the core of the ATDMA indicator cluster.

Then, the flow of the processing goes on to a step F306 at which the system controller 60 produces a result of determination as to whether or not the ATDMA exists. If the result of the determination indicates that the ATDMA exists, the flow of the processing goes on to a step F309 at which the size of the TDMA in the OSA (outer space area) or the size of the OSA is acquired to obtain the size of the ATDMA. The size of the TDMA in the OSA and the size of the OSA have been mentioned before in explanation of the TDMA information shown FIG. 17. Then, the start address of the ATDMA is found from the LAA (Last ADIP Address of data zone). Subsequently, the most recent TDMS is acquired from the ATDMA.

That is to say, the ATDMA indicator recorded in cluster CL1 indicates that the most recent TDMS exists in the ATDMA so that the most recent TDMS can be acquired from the ATDMA. A TDDS, SRRI and TDFL obtained from the most recent TDMS are transferred to the cache memory 60a so that the TDDS, the SRRI and the TDFL can be read out from the cache memory 60a in subsequent recording and reproduction processings.

It is to be noted that some recording/reproduction apparatus may detect parameter mismatching between the value of the ATDMA indicator recorded in cluster CL1 and the most recent TDMS, hence conceivably prohibiting data write processings. Even in the case of such recording/reproduction apparatus, however, minimum recording/reproduction compatibility is yet sustained.

If the determination result produced in the process carried out at the step F306 indicates that the ATDMA exists as evidenced by the ATDMA indicator recorded in cluster CL1 but the size of the ATDMA has not been set and if all information has already been recorded in the DMA too, the flow of the processing goes on to a step F307 at which the entire area of the TDMA on the optical disk 1 is determined to have been used up for recording information. That is to say, the optical disk 1 is determined to have completed a finalization process. For this reason, in a process carried out at the next step F308, the most recent DMS including a DDS, SRRI and a DFL is acquired from the DMA and transferred to the cache memory 60a so that the DDS, the SRRI and the DFL can be read out from the cache memory 60a in subsequent recording and reproduction processings.

6: Data Recording/Reproduction Processing Involving Alternate Areas 6-1: First Example of Data-Writing Processing Next, by referring to a flowchart shown in FIG. 25, the following description explains data-writing processing carried out by the embodiment for an optical disk 1 having a format including alternate areas as shown in FIG. 1 (a).

It is to be noted that, also in this case, at a point of time the data-writing processing described below is about to be carried out, the optical disk 1 has been mounted on the disk drive and a TDDS, a TDFL and SRRI have been copied from the TDMA recorded on the optical disk 1 to the cache memory 60a.

In addition, when the disk drive receives a data write request and/or a data read request from a host apparatus such as the AV system 120, the disk drive converts a logical sector address (LSN) specified in the request as the address of a target of the data write and/or read processings into a physical sector address (PSN) prior to the data write and/or read processings, and the data write and/or read processings are carried out in cluster units in the same way as an optical disk 1 with the format including no alternate areas as described earlier.

Let us assume that the system controller 60 employed in the disk drive receives a data write request specifying an address N (or a logical sector address N where N is a multiple of 32) as the address of a target of a data write processing from a host apparatus such as the AV system 120.

Figure 25:
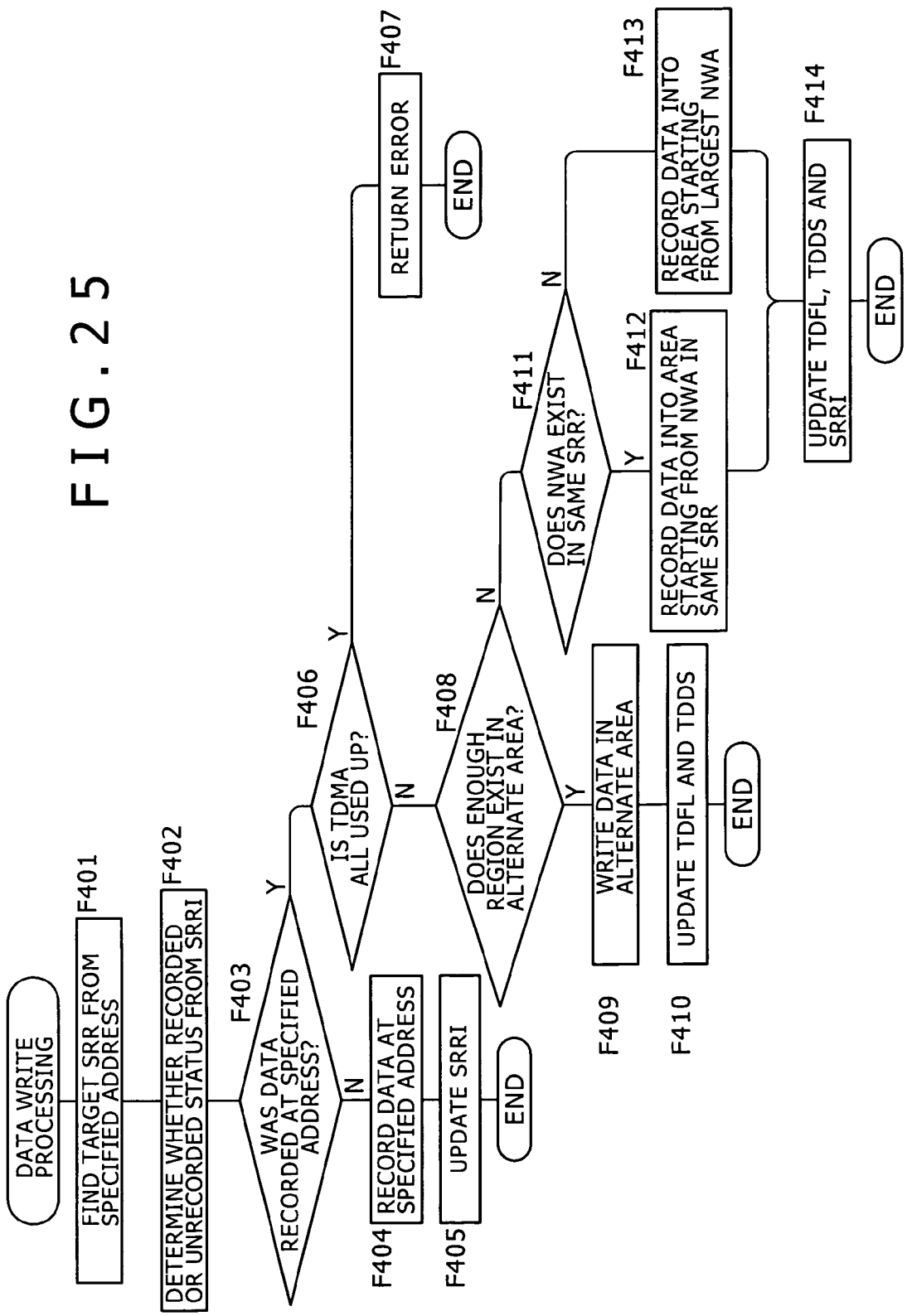
FIG. 25 shows a flowchart representing first typical processing to write data onto a disk with a format including alternate areas in accordance with the embodiment.

In this case, the system controller 60 starts the data-writing processing represented by the flowchart shown in FIG. 25. As shown in the figure, the flowchart begins with a step F401 at which the most recently updated SRRI is read out from the cache memory 60a. Then, in a process carried out at the next step F402, the SRRI is examined to produce a result of determination as to whether the specified address is an already recorded address or an unrecorded address, that is, whether or not data has been recorded in a cluster at the specified address. An already recorded address is an address at which data has already recorded and an unrecorded address is an address at which no data has already recorded.

That is to say, in the process carried out at the step F401, the SRRI is searched for the SRR entry of an SRR including the specified address and, in the process carried out at the next step F402, the result of the search is used to produce a result of determination as to whether or not the SRRI has the SRR entry of an SRR including the specified address.

To put it concretely, first of all, in the process carried out at the step F401, the logical sector address N specified by the host apparatus is converted into a physical sector address N'. Then, the physical sector address N' is collated with addresses described in the SRR entries to acquire an SRR number and an SRR entry identified by the number as an SRR entry corresponding to the physical sector address N'.

Then, in the process carried out at the next step F402, the physical sector address N' corresponding to the logical sector address N specified in the data write request is compared with the LRA included in the acquired SRR entry of the corresponding SRR. The SRR entry indicates whether or not data has been recorded at the physical sector address N' corresponding to the logical sector address N specified in the data write request. That is to say, a physical sector address N' smaller than the NWA of the SRR indicates that data has been recorded at the physical sector address N' corresponding to the logical sector address N specified in the data write request. The NWA can be found from the LRA recorded in the SRR entry.

If the physical sector address N' corresponding to the logical sector address N specified in the data write request is equal to the NWA indicating a postscript-recording point, the physical sector address N' indicates that no data has been recorded at the physical sector address N'. In this case, the flow of the processing goes on from the step F403 to a step F404 at which data is written into the physical sector address N'.

That is to say, in this case, the address specified in a write command to carry out a data-writing processing is not an already recorded address. Thus, the data-writing processing is carried out normally. If an error is generated in the data-writing processing due to an injury inflicted on the optical disk 1 or any other cause, however, alternate-address processing may be carried out instead.

First of all, in a process carried out at the step F404, the system controller 60 executes control to write data onto the optical disk 1 for the specified address. To put it concretely, the system controller 60 moves the pickup 51 to the specified address to make an access to the address and record the data, which is to be written on the optical disk 1, at the address.

If the data-writing processing is completed normally, the processing goes on from the step F404 to a step F405 at which the SRRI stored in the cache memory 60a is updated to reflect the postscript recording of the data into the SRR. Then, if necessary, that is, if there is an opportunity to update the SRRI recorded on the optical disk 1, the SRRI recorded on the optical disk 1 is also updated. That is to say, a TDMS update unit is recorded on the optical disk 1.

Finally, the processing carried out for the write request is ended.

It is to be noted that, if the physical sector address N' specified in the write request is greater than the NWA of the SRR, an illegal parameter error is transmitted to the apparatus making the write request. However, the flowchart shown in FIG. 25 does not show the case in which the physical sector address N' specified in the write request is greater than the NWA of the SRR.

If the determination result produced in the process carried out at the step F403 indicates that the address specified in the request for a write processing is an already recorded address, the data to be written onto the optical disk 1 in accordance with the data write request cannot be written into the specified address. In this case, the flow of the processing goes on to a step F406.

First of all, in a process carried out at the step F406, the TDMA including the ATDMA is examined to produce a result of determination as to whether or not the TDMA (and the ATDMA) have been all used up for recording information. If there is no more valid and free area in the TDMA including the ATDMA, alternate-address management can no longer be executed. In this case, the flow of the processing goes on to a step F407 at which an error message is transmitted to the apparatus making the data write request in response to the request.

If there is still a valid and free area in the TDMA including the ATDMA, on the other hand, the flow of the processing goes on to a step F408 to produce a result of determination as to whether or not there is an alternate area, that is, a sufficient free area included in the ISA or the OSA as an area large enough for carrying out alternate-address processing.

Such a result of determination can be produced by referring to the TDDS that is valid at the present time. As explained earlier by referring to FIG. 8, the 4 bytes at byte positions 1,216 to 1,219 of the TDDS are used for recording the address of the next available sector in the ISA whereas the 4 bytes at byte positions 1,220 to 1,223 of the TDDS are used for recording the address of the next available sector in the OSA. From the recorded addresses, it is possible to determine the states of available areas in the ISA and the OSA. As an alternative, the spare area full flag recorded at byte position 52 of the TDDS can also be referenced to produce such a result of determination. As explained earlier by referring to the DDS shown in FIG. 4, the spare area full flag is used to indicate that the ISA and the OSA have been used up entirely. That is to say, at a point of time all alternate areas are used up, the spare area full flag is set.

If the determination result produced in a process carried out at the step F408 indicates that there is a sufficient free area included in the ISA or the OSA as an area large enough for carrying out alternate-address processing, the flow of the processing goes on to a step F409.

In this case, the data to be written onto the optical disk 1 in accordance with the data write request can be recorded by carrying out alternate-address processing taking an area starting from the next recording address in the ISA or the OSA as an alternate-object replacement area.

Then, the flow of the processing goes on to a step F410 at which necessary updating processes are carried out.

That is to say, since the data-writing processing is carried out as a data renewal process, the data to be written onto the optical disk 1 in accordance with the data write request is recorded by performing alternate-address processing as described above. Thus, a new DOW entry must be cataloged on the TDFL. To be more specific, it is necessary to generate a DOW entry describing the physical sector address N' corresponding to the logical sector address specified in the data write request as the alternate-object original address and the address of an area included in the ISA or the OSA as an actual target area of the data write processing carried out at the step F409 as the alternate-object replacement address. The physical sector address N' serving as the alternate-object original address of the DOW entry is thus an address at which previous data has been recorded.

As described above, the TDFL is updated by cataloging a new DOW entry thereon. In addition, since the TDFL is updated, the TDDS is also updated.

That is to say, in the process carried out at the step F410, first of all, the TDFL and TDDS stored in the cache memory 60a are updated. Then, a TDMS update unit according to the updating of the TDFL and the TDDS is generated and incrementally recorded in the TDMA or ATDMA on the optical disk 1.

If the determination result produced in a process carried out at the step F408 indicates that there is no sufficient free area included in the ISA or the OSA as an area large enough for carrying out alternate-address processing, on the other hand, alternate-address processing using the user-data area is carried out.

In this case, the flow of the processing goes on to a step F411 to produce a result of determination as to whether or not the target SRR includes an NWA. The target SRR is the SRR found in the process carried out at the step F401 or the SRR including the alternate-object original address mentioned above. That is to say, at this step, the system controller 60 refers to information in the SRRI header in order to produce a result of determination as to whether or not the target SRR is open or closed.

If the result of the determination indicates that the target SRR is open, the flow of the processing goes on to a step F412 at which the data to be written onto the optical disk 1 in accordance with the data write request is recorded into an area starting from the NWA. Then, the flow of the processing goes on to a step F414 at which required updating processes are carried out.

In this case, alternate-address processing is carried out by using an area in the target SRR. Thus, the TDFL is updated by adding a DOW entry thereto and the SRRI is updated by updating an SRR entry. Then, the TDDS is also updated accordingly. That is to say, in the process carried out at the step F414, first of all, the TDFL, SRRI and TDDS stored in the cache memory 60a are updated. Then, a TDMS update unit according to the updating of the TDFL, the SRRI and the TDDS is generated and incrementally recorded in the TDMA or ATDMA on the optical disk 1.

If the determination result produced in a process carried out at the step F411 indicates that the target SRR is closed, on the other hand, the flow of the processing goes on to a step F413. At this step, the data to be written onto the optical disk 1 in accordance with the data write request is recorded into an area starting from the largest NWA among the NWAs of open SRRs.

As the process to record the data is completed, the flow of the processing goes on to a step F414 at which the required updating processes described above are carried out. That is to say, in the process carried out at the step F414, first of all, the TDFL, SRRI and TDDS stored in the cache memory 60a are updated. Then, a TDMS update unit according to the updating of the TDFL, the SRRI and the TDDS is generated and incrementally recorded in the TDMA or ATDMA on the optical disk 1.

As described above, the flowchart shown in FIG. 25 represents alternate-address processing carried out in order to renew data in response to a request for processing to write data into an address, which happens to be an already recorded address. It is to be noted, however, that the alternate-address processing may also be carried out in the same way in order to renew data in response to a request for processing to write data into an address, which happens to be an address in a defective area.

Let us assume for example that, even if the address specified in the request for processing to write data onto the optical disk 1 is an address in an unrecorded cluster, the cluster is defective, making it impossible to write data therein correctly. In this case, the flow of the processing goes on from the step F403 to the step F406 to carry out the same alternate-address processing at the step F406 and the subsequent steps.

In the case of the alternate-address processing carried out for such a defective cluster, however, the TDFL is updated by cataloging a new DFL entry in the same way as a DOW entry through an incrementally recorded a TDMS update unit.

6-2: Second Example of Data-Writing Processing

Figure 26:
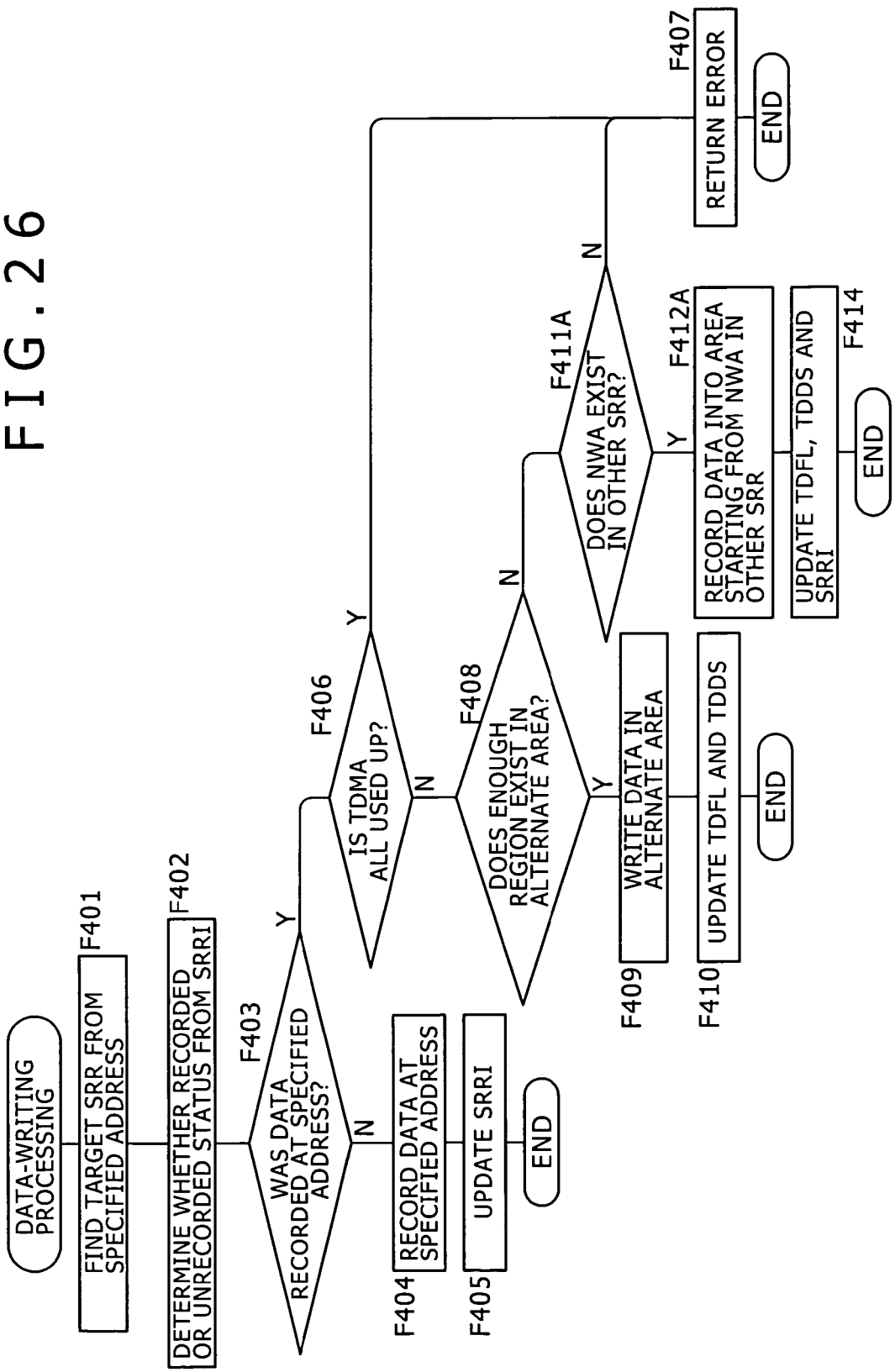
FIG. 26 shows a flowchart representing second typical processing to write data onto a disk with a format including alternate areas in accordance with the embodiment.

Next, other typical data-writing processing is explained by referring to a flowchart shown in FIG. 26. Much like the data-writing processing explained earlier by referring to the flowchart shown in FIG. 22, this other typical data-writing processing solves the problem caused by the fact that the application does not acquire an NWA before making a request for a processing to record data onto the optical disk 1.

FIG. 26 shows a flowchart representing data-writing processing carried out by the system controller 60. Since steps F401 to F410 are identical with those of the flowchart shown in FIG. 25, however, the descriptions of these steps are not repeated.

In the case of the data-writing processing represented by the flowchart shown in FIG. 26, if the address specified in the data write request is an already recorded address, a free area exists in the TDMA or the ATDMA and there is no free area in the ISA or the OSA, the flow of the processing goes on to a step F411A in order to carry out alternate-address processing using the user-data area. At this step, the SRRs are examined to produce a result of determination as to whether or not an NWA is included in an SRR different from the SRR including the address specified in the data write request.

It is to be noted that, normally, at least two SRRs are in open status. Thus, the determination result produced in the process carried out at the step F411A is hardly a denial. If the SRR including the address specified in the data write request is the only SRR put in open status, however, the determination result produced in the process carried out at the step F411A is a denial. In this case, the flow of the processing goes on to the step F407 at which an error message is transmitted to the application making the data write request before execution of the data-writing processing represented by this flowchart is ended.

If the result of determination confirms that an NWA is included in an SRR different from the SRR including the address specified in the data write request, the flow of the processing goes on to a step F412A at which the data to be recorded onto the optical disk 1 in accordance with the data write request is written into the other SRR in an area starting from the NWA. That is to say, alternate-address processing using an area in the other SRR is carried out as a data renewal process. Then, at the next step F414, the TDFL and the TDDS are updated in accordance with the alternate-address processing. Subsequently, the SRRI for the contents of the SRR serving as an alternate-object replacement SRR is also updated as well.

In the write data processing represented by the flowchart shown in FIG. 26 for a data write request, the address specified in the data write request is an already recorded address and alternate-address processing is thus carried out to renew data already recorded at the address. It is to be noted that alternate-address processing can also be carried out in the same way for a case in which the address specified in the data write request is an address in a defective area. Let us assume for example that, even if the address specified in the request for processing to write data onto the optical disk 1 is an address in an unrecorded cluster, the cluster is defective, making it impossible to write data therein correctly. In this case, the flow of the processing goes on from the step F403 to the step F406 to carry out the same alternate-address processing using the ISA or the OSA or, if there is no more free area in the ISA or the OSA, the same alternate-address processing using an area in the other SRR as an interface-object replacement area at the step F406 and the subsequent steps.

When alternate-address processing using an area in an SRR as an interface-object replacement area is carried out because the ISA and the OSA are all consumed by such data-writing processing, the processings explained earlier by referring to. FIG. 21 are performed. It is thus possible to solve the problem of wastefully generating unnecessary DOW entries due to an incorrect assumption made by the application as an assumption of the NWA as explained earlier by referring to FIG. 20.

6-3: Data-Reading Processing

Data-reading processing for a case in which the format of the optical disk 1 includes alternate-object replacement areas in the ISA and the OSA is the same as that represented by the flowchart shown in FIG. 23.

7: Effects of the Embodiment

As described above, the embodiment implements an alternate-address function to record data on a disk with a format not including alternate areas. In the case of an optical disk with a format including alternate areas, the alternate-address function to record data on the optical disk can be implemented with a high degree of efficiency.

That is to say, in order to extend the defect alternate-address function and the data renewal function in a write-once disk and a recording/reproduction apparatus, the functions are implemented as follows.

The format of a DOW entry used as alternate-address information in a data renewal processing is approximately the same as the format of a DFL entry used as alternate-address information in a defect alternate-address processing.

Both the DOW and DFL entries used as alternate-address information in a data renewal processing and a defect alternate-address processing respectively are recorded on the TDFL as pieces of information coexisting on the TDFL for storing management information of the defect alternate-address processing.

As alternate-object replacement areas of a defect alternate-address processing and a data renewal processing, it is possible to use not only a defect alternate area on the optical disk 1, but also a track (or an SRR) existing in the user-data area as a track (or an SRR) including an NWA selectable as a post-script-recording point.

By extending the defect alternate-address function and the data renewal function as described above, a data renewal processing and a defect alternate-address processing can be carried out even if alternate areas do not exist.

In addition, in the case of a format including alternate areas, a data renewal processing and a defect alternate-address processing can be carried out even if the storage capacity of the alternate areas decreases to a value not sufficient for storing data anymore.

On top of that, if the optical disk 1 according to an embodiment is mounted on an apparatus with the data renewal function not extended, the apparatus interprets a DOW entry used as alternate-address information in a data renewal processing as a DFL entry used as alternate-address information in a defect alternate-address processing, and reads data at an alternate-object replacement area specified in the alternate-address information. That is to say, since the conventional request processing is carried out, the reproduction compatibility is sustained in an apparatus with the data renewal function not extended even if the optical disk 1 completing execution of the alternate-address function for data renewals is mounted on the apparatus.

Furthermore, an NWA existing in an SRR as a postscript-recording point can be selected as an alternate-object replacement address for a data renewal processing and a defect alternate-address processing.

By selecting an NWA, which exists in an SRR as a postscript-recording point, as an alternate-object replacement address in place of an address in an alternate area in the ISA or the OSA, the following merits can be obtained.

In the first place, with a recording processing carried out by using a general file system, in considering processings to record a file on the disk and renew management information of the file, the seek distance of the pickup can be shortened to a value small enough for compensating for the alternate-address processing to move the pickup to the alternate-object replacement area. As an alternative, the management information of the file can be recorded into an area following the data. Thus, the recording performance can be improved.

In this case, a rearmost postscript-recording point selected as an alternate-object replacement address is considered to be an effective alternate-object replacement address. Such a rearmost postscript-recording point is selected as an alternate-object replacement address in a process carried out at the step F110 of the flowchart shown in FIG. 19 or the step F413 of the flowchart shown in FIG. 25.

In the second place, in a processing to read out a block from an alternate-object replacement address due to a defect detected in a recording processing, the reproduction performance is improved because of a short seek distance of the pickup. In this case, a postscript-recording point selected as an alternate-object replacement address in the same SRR as the alternate-object original address is considered to be an effective alternate-object replacement address. Such a postscript-recording point in the same SRR as the alternate-object original address is selected as an alternate-object replacement address in a process carried out at the step F109 of the flowchart shown in FIG. 19 or the step F412 of the flowchart shown in FIG. 25.

In addition, if a postscript-recording point existing in an SRR other than the SRR including the alternate-object original address as the NWA of the other SRR is selected as the alternate-object replacement address, it is possible to get rid of a problem of needlessly adding DOW entries due to generation of consecutive unnecessary data renewals initiated by the application in a certain circumstance. A postscript-recording point existing in an SRR other than the SRR including the alternate-object original address as the NWA of the other SRR is selected as the alternate-object replacement address in the data-writing processing represented by the flowchart shown in FIG. 22 or 26.

It is to be noted that, if the data-writing processing represented by the flowchart shown in FIG. 22 or 26 is carried out, it is appropriate to actually record the data under the following condition:

For an application running on the host apparatus, at least two open SRRs are allocated on the optical disk 1, and the postscript-recording point of an SRR other than the SRR having a defect area or experiencing a renewal of data is selected as the alternate-object replacement address for the defect or the address of the data being renewed.

In addition, in the case of the format not allocating an alternate area, it is no longer necessary to estimate the size of a suitable alternate area in advance in the application or the like. The fact that it is no longer necessary to allocate an alternate area implies efficient utilization of the user-data area.

On top of that, even in the case of the format allocating alternate areas, a region in the user-data area can be selected as an alternate area as soon as all the allocated alternate areas are used up. Thus, it is no longer necessary to estimate the size of a suitable alternate area in advance in the application. The fact that it is no longer necessary to estimate the size of an appropriate alternate area implies that it is not necessary to allocate an excessively large alternate area so that the data zone can be utilized with a high degree of efficiency.

Furthermore, in the case of the embodiment, in order for the disk drive or the recording/reproduction apparatus to produce a result of determination as to whether an address on the optical disk 1 is an address in an already recorded area or an unrecorded area, the disk drive or the recording/reproduction apparatus uses SRRI (Sequential Recording Range Information) provided for managing already recorded addresses or unrecorded addresses in the postscript-recording method. An already recorded area is an area in which data has already been recorded whereas an unrecorded area is an area in which no data has already been recorded. In general, track information such as the SRRI includes three elements, i.e., the start address, end address and NWA (new writable address or postscript-recording) point of the SRR.

In the postscript-recording method using an SRR (or a track), it is necessary to record data always in an area starting from the NWA serving as the postscript-recording point of the SRR. This is because an area existing between the start address of the SRR and an address immediately preceding the postscript-recording point of the SRR is determined to be an area in which data has already been recorded while an area between the postscript-recording point and end address of the SRR is determined to be an area in which no data has already been recorded. Thus, in the case of an optical disk 1 containing data recorded thereon by adoption of the postscript-recording method, the disk drive is capable of producing a result of determination as to whether an address specified in a write or read command is an already recorded or unrecorded address by acquiring information on all SRRs existing on the optical disk 1.

On top of that, in order to improve reliability of alternate-address management information, it is necessary to increase the number of times to update the alternate-address management information. If the size of the TDMA used as an area for updating the alternate-address management information is only 2,048 clusters, allocation of a larger area allowing alternate-address management information to be updated is demanded.

It is to be noted that the format shown in FIG. 1 (a) introduces a configuration allowing a portion of the alternate area to be set as an ATDMA (Additional Temporary Defect Management Area) at an initialization time. However, since this method assumes allocation of an alternate area referred to as the OSA as a precondition, this method cannot be applied to an optical disk 1 having no alternate areas as shown in FIG. 1 (b).

Thus, in the case of a format including no alternate areas as shown in FIG. 1 (b), as a method of allocating an area for managing various kinds of optical-disk information on the optical disk 1, there is adopted a technique allowing an ATDMA, which is a management area independent of the alternate areas, to be allocated at the position in the rearmost portion of the user-data area.

In the case of a write-once disk of the blue-ray type, a special format command is executed to create an optical disk including no alternate areas.

Since format parameters of this special command do not include one specifying an ordinary alternate area, the optical disk is formatted by specifying a maximum storage capacity covering all assigned addresses. By explicitly specifying a value smaller a little bit than the maximum storage capacity as a storage capacity, however, the functions of the disk drive can be extended so as to provide a capability of generating a region with no addresses assigned thereto at the end of the user-data area.

That is to say, in the case of this embodiment, this region is used as a spare alternate-address management area referred to as the ATDMA.

In addition, at the same time, the disk drive is also provided with a function to add an extension referred to as a TDMA indicator to the beginning of the TDMA and record information on the ATDMA and other information in the TDMA indicator.

The TDMA indicator has a function executed by the disk drive with a high degree of efficiency to find out a location used to record the most recent TDMS. The disk drive always refers to this TDMA indicator in processing of a check disk shown in FIG. 24 to acquire the information on the ATDMA at a check-disk time. Thus, the disk drive is capable of handling the ATDMA for a case in which no alternate area exists.

As is obvious from the above description, even in the case of a format providing no alternate areas and even in the case of a format providing alternate areas, this embodiment is capable of sustaining recording and reproduction compatibility without substantially changing the physical format and physical layout of the write-once disk and without limiting the functions.

In addition, the data write function can be implemented in a write-once disk including no alternate areas by sustaining recording and reproduction compatibility with the conventional write-once disk, the RAM-type disk and the ROM-type disk as it is.

Thus, the file system generally provided for typically the RAM-type disk and the ROM-type disk can also be used for an optical disk of the write-once type without the need to modify the hardware and the physical format.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. A data-recording method for recording write data onto a recording medium having a write-once recording area that allows data to be recorded therein only once and includes: a main data area, which data is to be recorded into and to be reproduced from; and an alternate-address management information area used for incrementally recording alternate-address management information in order to update already recorded alternate-address management information used for managing alternate-address processing carried out on said write-once recording area, said data-recording method capable of recording said write data onto said recording medium without providing a pre-allocated alternate area in said write-once recording area in advance comprising:

carrying out alternate-address processing to set a write-target area, which is identified by an address specified in a data write request as a partial area included in said write-once recording area, as an alternate-object original area, and set an alternate area selected among partial areas existing in said main data area as an alternate-object replacement area in case data has already been recorded in said write-target area;

recording said write data, which is to be recorded in accordance with said data write request, into said alternate-object replacement area; and updating said alternate-address management information so as to include information in said alternate-address management information as information showing said alternate-address processing, wherein said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and wherein, at said carrying out alternate-address processing, an alternate-object replacement area in said main data area is selected by using said plurality of sequential recording range information and by determining whether the sequential recording ranges are open based on whether the sequential recording range information includes a NWA, and wherein, at said carrying out alternate-address processing, an alternate-object replacement area in said main data area is selected by using respective NWA information included in respective of each of said sequential recording range information if the respective sequential recording range is determined to be open, and data is then written starting at the NWA of the determined to be open sequential recording range.

2. The data-recording method according to claim 1, wherein, in case said write-target area in said write-once recording area is a defective area:

at said carrying out alternate-address processing, defective-area alternate-address processing is carried out to set said defective write-target area as an alternate-object original area, and set an alternate area selected among partial areas existing in said main data area as an alternate-object replacement area; and at said updating said alternate-address management information, said alternate-address management information is updated to include information showing said defective-area alternate-address processing.

3. The data-recording method according to claim 1, wherein, at said carrying out alternate-address processing, an alternate-object replacement area in said main data area is selected on the basis of said last recorded address information on a last recorded address existing in a sequential recording range including said alternative-object original area involved in said alternate-address processing.

4. The data-recording method according to claim 1, wherein, at said carrying out alternate-address processing, an alternate-object replacement area in said main data area is selected on the basis of specific last recorded address information representing a largest address among pieces of last recorded address information existing in a sequential recording range or a plurality of sequential recording ranges.

5. The data-recording method according to claim 1, wherein, at said carrying out alternate-address processing, an alternate-object replacement area in said main data area is selected on the basis of said last recorded address information on a last recorded address existing in a sequential recording range other than a sequential recording range including said alternative-object original area involved in said alternate-address processing.

6. The data-recording method according to claim 1, said data-recording method further comprising setting an additional alternate-address management information area, which is used for incrementally recording said alternate-address management information, in said main data area.

7. A data-recording apparatus for recording write data onto a recording medium having a write-once recording area that allows data to be recorded therein only once and includes: a main data area, which data is to be recorded into and to be reproduced from; and an alternate-address management information area used for incrementally recording alternate-address management information in order to update already recorded alternate-address management information used for managing alternate-address processing carried out on said write-once recording area, said data-recording apparatus comprising:
a data-writing section for writing said written data onto said recording medium;
an address verification section for producing a result of determination as to whether or not data has been recorded at an address specified in a data write request to write said write data into said main data area;
an information determination section for producing a result of determination as to whether or not said alternate-address management information can be updated; and
a control section for:
controlling said data-writing section to record said write data at an address specified in a data write request if said address verification section produces a determination result indicating that no data has been recorded at said address; and
carrying out alternate-address processing to set a write-target area, which is identified by an address specified in a data write request as a partial area included in said write-once recording area, as an alternate-object original area, and set an alternate area selected among partial areas existing in said main data area as an alternate-object replacement area, controlling said data-writing section to record said write data, which is to be recorded in accordance with said data write request, into said alternate-object replacement area, and updating said alternate-address management information so as to include information in said alternate-address management information as information showing said alternate-address processing if said address verification section produces a determination result indicating that data has been recorded at said address and said information determination section produces a determination result indicating that said alternate-address management information can be updated, wherein, said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and said control section selects an alternate-object replacement area for said alternate-address processing in said main data area by using said plurality of sequential recording range information and by determining whether the sequential recording ranges are open based on whether the sequential recording range information includes a NWA, and wherein said control section selects an alternate-object replacement area for said alternate-address processing in said main data area by using respective NWA information included in respective of each of said sequential recording range information if the respective sequential recording range is determined to be open, and data is then written starting at the NWA of the determined to be open sequential recording range.

8. The data-recording apparatus according to claim 7, wherein, in case said write-target area in said write-once recording area is a defective area, said control section carries out defective-area alternate-address processing to set said defective write-target area as an alternate-object original area, and set an alternate area selected among partial areas existing in said main data area as an alternate-object replacement area; and updates said alternate-address management information to include information showing said defective-area alternate-address processing.

9. The data-recording apparatus according to claim 7, wherein said control section selects an alternate-object replacement area for said alternate-address processing in said main data area on the basis of said last recorded address information on a last recorded address existing in a sequential recording range including said alternative-object original area involved in said alternate-address processing.

10. The data-recording apparatus according to claim 7, wherein said control section selects an alternate-object replacement area for said alternate-address processing in said main data area on the basis of specific last recorded address information representing a largest address among pieces of last recorded address information existing in a sequential recording range or a plurality of sequential recording ranges.

11. The data-recording apparatus according to claim 7, wherein said control section selects an alternate-object replacement area for said alternate-address processing in said main data area on the basis of said last recorded address information on a last recorded address existing in a sequential recording range other than a sequential recording range including said alternative-object original area involved in said alternate-address processing.

12. The data-recording apparatus according to claim 7, wherein said control section sets an additional alternate-address management information area, which is used for incrementally recording said alternate-address management information, in said main data area.

13. A data-recording method for recording write data onto a recording medium having a write-once recording area that allows data to be recorded therein only once and includes: a main data area, which data is to be recorded into and to be reproduced from; and an alternate-address management information area used for incrementally recording alternate-address management information in order to update already recorded alternate-address management information used for managing alternate-address processing carried out on said write-once recording area, said data-recording method comprising:

setting an alternate area in said write-once recording area;

carrying out first alternate-address processing to set a write-target area, which is identified by an address specified in a data write request as a partial area included in said write-once recording area, as an alternate-object original area, and set a partial area selected among partial areas existing in said alternate area as an alternate-object replacement area if data has already been recorded in said write-target area and said selected partial area is usable for said first alternate-address processing;

carrying out second alternate-address processing to set a write-target area, which is identified by an address specified in a data write request as a portion included in said write-once recording area, as an alternate-object original area, and set a partial area selected among partial areas existing in said main data area as an alternate-object replacement area if data has already been recorded in said write-target area and no area usable for said second alternate-address processing exists in said alternate area;

recording said write data, which is to be recorded in accordance with said data write request, into said alternate-object replacement area; and updating said alternate-address management information so as to include information in said alternate-address management information as information showing said first or second alternate-address processing, wherein said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and wherein, at said carrying out said second alternate-address processing, an alternate-object replacement area in said main data area is selected by using said plurality of sequential recording range information and by determining whether the sequential recording ranges are open based on whether the sequential recording range information includes a NWA, wherein, at said carrying out said second alternate-address processing, an alternate-object replacement area in said main data area is selected by using respective NWA information included in respective of each of said sequential recording range information if the respective sequential recording range is determined to be open, and data is then written starting at the NWA of the determined to be open sequential recording range.

14. The data-recording method according to claim 13, wherein, in case said write-target area in said write-once recording area is a defective area:

at said carrying out said first alternate-address processing, first defective-area alternate-address processing is carried out to set said defective write-target area as an alternate-object original area, and set a partial area selected among partial areas existing in said alternate area as an alternate-object replacement area; and at said carrying out said second alternate-address processing, second defective-area alternate-address processing is carried out to set said defective write-target area as an alternate-object original area, and set a partial area selected among partial areas existing in said main data area as an alternate-object replacement area.

15. The data-recording method according to claim 13, wherein, at said carrying out said second alternate-address processing, an alternate-object replacement area in said main data area is selected on the basis of said last recorded address information on a last recorded address existing in a sequential recording range including said alternative-object original area involved in said second alternate-address processing.

16. The data-recording method according to claim 13, wherein, at said carrying out said second alternate-address processing, an alternate-object replacement area in said main data area is selected on the basis of specific last recorded address information representing a largest address among pieces of last recorded address information existing in a sequential recording range or a plurality of sequential recording ranges.

17. The data-recording method according to claim 13, wherein, at said carrying out said second alternate-address processing, an alternate-object replacement area in said main data area is selected on the basis of said last recorded address information on a last recorded address existing in a sequential recording range other than a sequential recording range including said alternative-object original area involved in said second alternate-address processing.

18. The data-recording method according to claim 13, said data-recording method further comprising the setting an additional alternate-address management information area, which is used for incrementally recording said alternate-address management information, in said alternate area.

19. A data-recording apparatus for recording write data onto a recording medium having a write-once recording area that allows data to be recorded therein only once and includes: a main data area, which data is to be recorded into and to be reproduced from; an alternate area; and an alternate-address management information area used for incrementally recording alternate-address management information in order to update already recorded alternate-address management information used for managing alternate-address processing carried out on said write-once recording area, said data-recording apparatus comprising:

a data-writing section for writing said write data onto said recording medium;

an address verification section for producing a result of determination as to whether or not data has been recorded at an address specified in a data write request to write said write data into said main data area;

an information determination section for producing a result of determination as to whether or not said alternate-address management information can be updated as well as a result of determination as to whether or not an area usable for alternate-address processing exists in said alternate area; and a control section for:

controlling said data-writing section to record said write data at an address specified in a data write request if said address verification section produces a determination result indicating that no data has been recorded at said address;

carrying out alternate-address processing to set a write-target area, which is identified by an address specified in a data write request as a partial area included in said write-once recording area, as an alternate-object original area, and set a partial area selected among partial areas existing in said alternate area as an alternate-object replacement area, controlling said data-writing section to record said write data, which is to be recorded in accordance with said data write request, into said alternate-object replacement area and updating said alternate-address management information so as to include information in said alternate-address management information as information showing said alternate-address processing if said address verification section produces a determination result indicating that data has been recorded at said address and said information determination section produces a determination result indicating that said alternate-address management information can be updated as well as a result of determination indicating that an area usable for alternate-address processing exists in said alternate area; and carrying out alternate-address processing to set a write-target area, which is identified by an address specified in a data write request as a partial area included in said write-once recording area, as an alternate-object original area, and set a partial area selected among partial areas existing in said main data area as an alternate-object replacement area, controlling said data-writing section to record said write data, which is to be recorded in accordance with said data write request, into said alternate-object replacement area and updating said alternate-address management information so as to include information in said alternate-address management information as information showing said alternate-address processing if said address verification section produces a determination result indicating that data has been recorded at said address and said information determination section produces a determination result indicating that said alternate-address management information can be updated as well as a result of determination indicating that no area usable for alternate-address processing exists in said alternate area, wherein said alternate-address management information includes a plurality of sequential recording range information (SRRI) respective plurality of on a sequential recording ranges (SRR) of main data recorded in said main data area, and the sequential recording range information includes, recorded in a header of the sequential recording range information, a next writable address (NWA) if a respective sequential recording range is still open and can have data written thereto, and said control section selects an alternate-object replacement area in said main data area in said defective-area alternate-address processing by using said plurality of sequential recording range information and by determining whether the sequential recording ranges are open based on whether the sequential recording range information includes a NWA, and wherein said control section selects an alternate-object replacement area in said main data area in said defective-area alternate-address processing by using respective NWA information included respective of each of in said sequential recording range information if the respective sequential recording range is determined to be open, and data is then written starting at the NWA of the determined to be open sequential recording range.

20. The data-recording apparatus according to claim 19, wherein, in case said write-target area in said write-once recording area is a defective area, said control section carries out defective-area alternate-address processing to set said defective write-target area as an alternate-object original area and set a partial area selected among partial areas existing in said alternate area as an alternate-object replacement area, updating said alternate-address management information to include information showing said defective-area alternate-address processing if said information determination section produces a determination result indicating that said alternate-address management information can be updated as well as a determination result indicating that an area usable for said defective-area alternate-address processing exists in said alternate area; and carries out defective-area alternate-address processing to set said defective write-target area as an alternate-object original area and set a partial area selected among partial areas existing in said main data area as an alternate-object replacement area, updating said alternate-address management information to include information showing said defective-area alternate-address processing if said information determination section produces a determination result indicating that said alternate-address management information can be updated as well as a determination result indicating that no area usable for said defective-area alternate-address processing exists in said alternate area.

21. The data-recording apparatus according to claim 19, wherein said control section selects an alternate-object replacement area in said main data area in said defective-area alternate-address processing on the basis of said last recorded address information on a last recorded address existing in a sequential recording range including said alternative-object original area involved in said defective-area alternate-address processing.

22. The data-recording apparatus according to claim 19, wherein said control section selects an alternate-object replacement area in said main data area in said defective-area alternate-address processing on the basis of specific last recorded address information representing a largest address among pieces of last recorded address information on postscript-recording points existing in a sequential recording range or a plurality of sequential recording ranges.

23. The data-recording apparatus according to claim 19, wherein said control section selects an alternate-object replacement area in said main data area in said defective-area alternate-address processing on the basis of said last recorded address information on a last recorded address existing in a sequential recording range other than a sequential recording range including said alternative-object original area involved in said defective-area alternate-address processing.

24. The data-recording apparatus according to claim 19, wherein said control section sets an additional alternate-address management information area, which is used for incrementally recording said alternate-address management information, in said main data area in said defective-area alternate-address processing.

25. A data reproduction method for reproducing data from a recording medium having a write-once recording area that allows data to be recorded therein only once and includes: a main data area, which data is to be recorded into and to be reproduced from; and an alternate-address management information area used for incrementally recording alternate-address management information in order to update already recorded alternate-address management information used for managing alternate-address processing carried out on said write-once recording area, said alternate-address management information includes sequential recording range information on a sequential recording range of main data recorded in said main data area, said data reproduction method comprising:
producing a result of recording-status determination as to whether or not data has been recorded at an address specified in a data read request by reference to said sequential recording range information when receiving said data read request to read out said data from said main data area;
producing a result of alternate-status determination as to whether or not said address specified in said data read request is managed as an alternate-object original address by using said alternate-address management information due to the fact that said address has been specified in a previous data write request if said result of said recording-status determination indicates that said data has been recorded at said address;
reading out said data from said address specified in said data read request if said result of said alternate-status determination indicates that said address is not managed as an alternate-object original address by using said alternate-address management information; and
reading out said data from an alternate-object replacement address managed as a substitute for said alternate-object original address by using said alternate-address management information if said result of said alternate-status determination indicates that said address specified in said data read request is managed as said alternate-object original address by using said alternate-address management information,
wherein said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and wherein an alternate-object replacement area in said main data area is selected by using said sequential recording range information and by determining whether the sequential recording ranges are open based on whether the sequential recording range information includes a NWA, and
wherein an alternate-object replacement area in said main data area is selected by using respective NWA information included in respective of each of said sequential recording range information if the respective sequential recording range is determined to be open, and data is then written starting at the NWA of the determined to be open sequential recording range.

26. A data reproduction apparatus for reproducing data from a recording medium having a write-once recording area that allows data to be recorded therein only once and includes:
a main data area, which data is to be recorded into and to be reproduced from; and an alternate-address management information area used for incrementally recording alternate-address management information in order to update already recorded alternate-address management information used for managing alternate-address processing carried out on said write-once recording area, said alternate-address management information includes sequential recording range information on a sequential recording range of main data recorded in said main data area,
said data reproduction apparatus comprising:
a data reading section for reading data from said recording medium;
a first address verification section for producing a result of recording-status determination as to whether or not data has been recorded at an address, which is specified in a data read request to reproduce said data from said main data area, with reference to said alternate-address management information;
a second address verification section for producing a result of alternate-status determination as to whether or not an address specified in a data read request to reproduce said data from said main data area is managed by using said alternate-address management information as an alternate-object original address due to the fact that said address has been specified in a previous data write request; and
a control section for controlling said data reading section to reproduce said data from an alternate-object replacement address managed by using said alternate-address management information as a substitute for said alternate-object original address if said first address verification section produces said result of said recording-status determination as a result indicating that said data has been recorded at said address, and said second address verification section produces said result of said alternate-status determination as a result indicating that said address is an address managed by using said alternate-address management information as said alternate-object original address; and said address if said first address verification section produces said result of said recording-status determination as a result indicating that said data has been recorded at said address, and said second address verification section produces said result of said alternate-status determination as a result indicating that said address is not an address managed by using said alternate-address management information as said alternate-object original address,
wherein, said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and said control section selects an alternate-object replacement area for said alternate-address processing in said main data area by using said plurality of sequential recording range information and by determining whether the sequential recording ranges are open based on whether the sequential recording range information includes a NWA, and
wherein said control section selects an alternate-object replacement area for said alternate-address processing in said main data area by using respective NWA information included in respective of each of said sequential recording range information if the respective sequential recording range is determined to be open, and data is then written starting at the NWA of the determined to be open sequential recording range.

27. A recording medium having a write-once recording area that allows data to be recorded therein only once and comprises:
a main data area, which data is to be recorded into and to be reproduced from; and
an alternate-address management information area used for incrementally recording alternate-address management information in order to update already recorded alternate-address management information used for managing alternate-address processing carried out on said write-once recording area, wherein no specified area is formed for an alternate-address processing, wherein, said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and an alternate-object replacement area is selected for said alternate-address processing in said main data area by using said sequential recording range information and by determining whether the sequential recording ranges are open based on whether the sequential recording range information includes a NWA, and wherein said alternate-object replacement area is selected for said alternate-address processing in said main data area by using respective NWA information included in respective of each of said sequential recording range information if the respective sequential recording range is determined to be open, and data is then written starting at the NWA of the determined to be open sequential recording range.

28. The recording medium according to claim 27, wherein said main data area includes an additional alternate-address management information area used for incrementally recording said alternate-address management information.

29. A recording medium having a write-once recording area that allows data to be recorded therein only once and comprises:

a main data area, which data is to be recorded into and to be reproduced from;

an alternate-address management information area used for incrementally recording alternate-address management information in order to update already recorded alternate-address management information used for managing alternate-address processing carried out on said write-once recording area; and an alternate area, wherein said main data area and said alternate area are each used as an area for said alternate-address processing, wherein, said alternate-address management information includes a plurality of sequential recording range information (SRRI) on a respective plurality of sequential recording ranges (SRR) of main data recorded in said main data area, and the sequential recording range information includes, recorded in a header of the sequential recording range information, a next writable address (NWA) if a respective sequential recording range is still open and can have data written thereto, and said an alternate-object replacement area is selected for said alternate-address processing in said main data area by using said plurality of sequential recording range information and by determining whether the sequential recording ranges are open based on whether the sequential recording range information includes a NWA, and wherein said alternate-object replacement area is selected for said alternate-address processing in said main data area by using respective NWA information included in respective of each of said sequential recording range information if the respective sequential recording range is determined to be open, and data is then written starting at the NWA of the determined to be open sequential recording range.

30. The recording medium according to claim 29, wherein said main alternate area includes an additional alternate-address management information area used for incrementally recording said alternate-address management information.

* * * * *